(12) United States Patent
Garcia et al.

(10) Patent No.: US 7,137,327 B2
(45) Date of Patent: Nov. 21, 2006

(54) RIVING KNIFE ASSEMBLY FOR A DUAL BEVEL TABLE SAW

(75) Inventors: Jaime E. Garcia, Jackson, TN (US); Jeffrey D. Weston, Jackson, TN (US); Craig A. Carroll, Milan, TN (US)

(73) Assignee: Black & Decker Inc., Newark, DE (US)

(*) Notice: Subject to any disclaimer, the term of this patent is extended or adjusted under 35 U.S.C. 154(b) by 213 days.

(21) Appl. No.: 10/996,193

(22) Filed: Nov. 23, 2004

(65) Prior Publication Data

US 2005/0188806 A1    Sep. 1, 2005

Related U.S. Application Data

(63) Continuation-in-part of application No. 10/968,849, filed on Oct. 19, 2004, which is a continuation-in-part of application No. 10/698,993, filed on Oct. 31, 2003, now abandoned.

(60) Provisional application No. 60/492,095, filed on Jul. 31, 2003, provisional application No. 60/422,793, filed on Oct. 31, 2002.

(51) Int. Cl.
   *B27G 19/08* (2006.01)
(52) U.S. Cl. .................... 83/102.1; 83/477.2
(58) Field of Classification Search ............... 83/102.1, 83/477.2, 471.1, 471.2, 471.3, 477.1, 473, 83/477, 490, 491, 581, 582, 860; 144/286.1, 144/286.5, 287; 451/454, 455; 409/134
See application file for complete search history.

(56) References Cited

U.S. PATENT DOCUMENTS

| | | | |
|---|---|---|---|
| 299,619 A | 6/1884 | Carson | |
| 408,790 A | 8/1889 | Butler | |
| 411,925 A | 10/1889 | Linderman | |
| 714,098 A | 11/1902 | Caldwell | |
| 1,244,187 A | * 10/1917 | Frisbie | ........................ 83/860 |
| 1,476,238 A | 12/1923 | Bump | |
| 1,804,764 A | 5/1931 | Grant | |
| 2,109,976 A | 3/1938 | Pierce, Jr. | .................... 177/311 |

(Continued)

FOREIGN PATENT DOCUMENTS

CN    2378150    5/2000

(Continued)

OTHER PUBLICATIONS

"Product Picks from the National Hardware Show"; Fall Homes 1992; Sep. 23, 1992; 2 pages.

(Continued)

*Primary Examiner*—Kenneth E. Peterson
*Assistant Examiner*—Phong Nguyen
(74) *Attorney, Agent, or Firm*—Adan Ayala

(57) ABSTRACT

An embodiment of the present invention is directed to a riving knife assembly for a dual bevel table saw, comprising: a first armature configured for coupling with a beveling member; a second armature adjustably and rotatably coupled with the first armature; a first mounting member coupled with the second armature; a first riving bracket coupled with the second armature and configured for adjustably coupling with a bearing retaining nut of a dual arbor assembly; a second riving bracket coupled with the first mounting member and configured for adjustably coupling with the inside of a first bore of a first height bracket; a quick release handle disposed upon the first mounting member; an eccentric shaft coupled with the quick release handle; and a riving knife configured with an engaging assembly for engaging with a locking pin or a guard assembly or a kickback finger system.

25 Claims, 40 Drawing Sheets

U.S. PATENT DOCUMENTS

| | | | | |
|---|---|---|---|---|
| 2,121,069 A | | 6/1938 | Collins | 143/36 |
| 2,146,906 A | | 2/1939 | Moller | 77/5 |
| 2,299,262 A | | 10/1942 | Uremovich | 143/36 |
| 2,307,820 A | | 1/1943 | Butters | 143/168 |
| 2,357,194 A | | 8/1944 | Hazelton et al. | 164/47 |
| 2,407,845 A | | 9/1946 | Nemeyer | 116/124 |
| 2,465,000 A | | 3/1949 | Turner | 143/132 |
| 2,488,947 A | | 11/1949 | Vavrik | 143/43 |
| 2,518,684 A | | 8/1950 | Harris | 143/45 |
| 2,557,029 A | | 6/1951 | Griffin | 88/39 |
| 2,806,492 A | | 9/1957 | Becker | 143/168 |
| 2,850,054 A | | 9/1958 | Eschenburg | 143/36 |
| 2,852,047 A | * | 9/1958 | Odlum et al. | 83/473 |
| 2,855,679 A | | 10/1958 | Gibble | 33/46 |
| 3,005,477 A | | 10/1961 | Sherwen | 143/47 |
| 3,011,529 A | | 12/1961 | Copp | 143/36 |
| 3,013,592 A | | 12/1961 | Ambrosio et al. | 143/36 |
| 3,124,178 A | | 3/1964 | Packard | 143/36 |
| 3,179,458 A | | 4/1965 | Sconzo | 292/341.15 |
| 3,344,819 A | | 10/1967 | Mitchell | 143/36 |
| 3,572,937 A | | 3/1971 | Baldwin | 356/110 |
| 3,597,091 A | | 8/1971 | Bowker | 356/106 |
| 3,635,108 A | | 1/1972 | Prince | 82/1 |
| 3,713,746 A | | 1/1973 | Luthy | 408/8 |
| 3,728,027 A | | 4/1973 | Watanabe | 356/13 |
| 3,780,777 A | | 12/1973 | Davies | 144/3 N |
| 3,837,757 A | | 9/1974 | Levine | 408/14 |
| 3,854,836 A | | 12/1974 | Weissman | 408/14 |
| 3,891,039 A | | 6/1975 | Lagerstrom | 175/40 |
| 3,970,359 A | | 7/1976 | Starkweather | 350/7 |
| 3,972,582 A | | 8/1976 | Oosaka et al. | 350/7 |
| 3,976,384 A | | 8/1976 | Matthews et al. | 356/200 |
| 4,046,985 A | | 9/1977 | Gates | 219/121 L |
| 4,078,869 A | | 3/1978 | Honeycutt | 408/16 |
| 4,184,394 A | | 1/1980 | Gjerde | 83/477.1 |
| 4,255,056 A | | 3/1981 | Peterson | 356/401 |
| 4,257,297 A | | 3/1981 | Nidbella | 83/471.3 |
| 4,319,403 A | | 3/1982 | Stearns | 33/185 R |
| 4,338,723 A | | 7/1982 | Benjamin | 33/174 L |
| 4,383,373 A | | 5/1983 | Couturier | 33/286 |
| 4,386,532 A | | 6/1983 | Benjamin | 73/862.04 |
| 4,413,662 A | | 11/1983 | Gregoire et al. | 144/356 |
| 4,418,597 A | * | 12/1983 | Krusemark et al. | 83/478 |
| 4,438,567 A | | 3/1984 | Raiha | 33/286 |
| 4,447,956 A | | 5/1984 | Chung | 33/172 D |
| 4,450,627 A | | 5/1984 | Morimoto | 30/391 |
| 4,468,992 A | | 9/1984 | McGeehee | 83/56 |
| 4,469,318 A | | 9/1984 | Slavic | 269/91 |
| 4,469,931 A | | 9/1984 | Macken | 219/121 LG |
| 4,503,740 A | | 3/1985 | Brand et al. | 83/521 |
| 4,534,093 A | | 8/1985 | Jahnke et al. | 29/26 A |
| 4,566,202 A | | 1/1986 | Hamar | 33/286 |
| 4,581,808 A | | 4/1986 | Lawson et al. | 29/558 |
| 4,589,208 A | | 5/1986 | Iwasaki et al. | 30/376 |
| 4,598,481 A | | 7/1986 | Donahue | 33/288 |
| 4,607,555 A | | 8/1986 | Erhard | 83/471.2 |
| 4,615,247 A | * | 10/1986 | Berkeley | 83/102.1 |
| 4,625,604 A | * | 12/1986 | Handler et al. | 83/102.1 |
| 4,651,732 A | | 3/1987 | Frederick | 128/303 R |
| 4,676,130 A | | 6/1987 | Nutt | 83/155 |
| 4,723,911 A | | 2/1988 | Kurtz | 433/27 |
| 4,725,933 A | | 2/1988 | Houk, deceased | 362/287 |
| 4,775,205 A | | 10/1988 | Muramatsu | 350/6.8 |
| 4,803,976 A | | 2/1989 | Frigg et al. | 128/92 |
| 4,805,500 A | | 2/1989 | Saito et al. | 83/277 |
| 4,817,839 A | | 4/1989 | Weissman | 225/2 |
| 4,820,911 A | | 4/1989 | Arackellian et al. | 235/467 |
| 4,833,782 A | | 5/1989 | Smith | 30/392 |
| 4,836,671 A | | 6/1989 | Bautista | 356/1 |
| 4,885,965 A | | 12/1989 | Veissman | 83/100 |
| 4,885,967 A | | 12/1989 | Bell et al. | 83/520 |
| 4,887,193 A | | 12/1989 | Dieckmann | 362/89 |
| 4,934,233 A | | 6/1990 | Brundage et al. | 83/397 |
| 4,945,797 A | | 8/1990 | Hahn | 83/75.5 |
| 4,964,449 A | | 10/1990 | Conners | 144/286 R |
| 4,976,019 A | | 12/1990 | Kitamura | 29/26 A |
| 4,978,246 A | | 12/1990 | Quenzi et al. | 404/84 |
| 5,013,317 A | | 5/1991 | Cole et al. | 606/96 |
| 5,031,203 A | | 7/1991 | Trecha | 378/205 |
| 5,038,481 A | | 8/1991 | Smith | 30/392 |
| 5,052,112 A | | 10/1991 | MacDonald | 33/263 |
| 5,148,232 A | | 9/1992 | Duey et al. | 356/152 |
| 5,159,864 A | | 11/1992 | Wedemeyer et al. | 83/13 |
| 5,159,869 A | | 11/1992 | Tagliaferri | 83/862 |
| 5,161,922 A | | 11/1992 | Malloy | 408/14 |
| 5,203,650 A | | 4/1993 | McCourtney | 408/1 R |
| 5,207,007 A | | 5/1993 | Cucinotta et al. | 33/640 |
| 5,212,720 A | | 5/1993 | Landi et al. | 378/206 |
| 5,267,129 A | | 11/1993 | Anderson | 362/96 |
| 5,283,808 A | | 2/1994 | Cramer et al. | 378/206 |
| 5,285,708 A | | 2/1994 | Bosten et al. | 83/520 |
| 5,316,014 A | | 5/1994 | Livingston | 128/754 |
| 5,320,111 A | | 6/1994 | Livingston | 128/754 |
| 5,357,834 A | | 10/1994 | Ito et al. | 83/471.3 |
| 5,365,822 A | | 11/1994 | Stapleton et al. | 83/745 |
| 5,375,495 A | | 12/1994 | Bosten et al. | 83/520 |
| 5,387,969 A | | 2/1995 | Marantette | 356/4.5 |
| 5,426,687 A | | 6/1995 | Goodall et al. | 378/206 |
| 5,439,328 A | | 8/1995 | Haggerty et al. | 408/1 R |
| 5,446,635 A | | 8/1995 | Jehn | 362/259 |
| 5,461,790 A | | 10/1995 | Olstowski | 30/391 |
| 5,481,466 A | | 1/1996 | Carey | 364/474.09 |
| 5,488,781 A | | 2/1996 | Van Der Horst | 33/617 |
| 5,495,784 A | | 3/1996 | Chen | 83/471.2 |
| 5,522,683 A | | 6/1996 | Kakimoto et al. | 408/13 |
| 5,529,441 A | | 6/1996 | Kosmowski et al. | 408/1 R |
| 5,546,840 A | | 8/1996 | Supe-Dienes | 83/478 |
| 5,579,102 A | | 11/1996 | Pratt et al. | 356/3.12 |
| 5,593,606 A | | 1/1997 | Owen et al. | 219/121.71 |
| 5,644,616 A | | 7/1997 | Landi et al. | 378/206 |
| 5,661,775 A | | 8/1997 | Cramer et al. | 378/206 |
| 5,662,017 A | | 9/1997 | Mellon | 83/169 |
| 5,667,345 A | | 9/1997 | Wiklund | 408/1 R |
| 5,675,899 A | | 10/1997 | Webb | 30/390 |
| 5,720,213 A | * | 2/1998 | Sberveglieri | 83/471.3 |
| 5,741,096 A | | 4/1998 | Olds | 408/1 R |
| 5,777,562 A | | 7/1998 | Hoffman | 340/870.07 |
| 5,782,842 A | | 7/1998 | Kloess et al. | 606/130 |
| 5,784,792 A | | 7/1998 | Smith | 33/227 |
| 5,797,670 A | | 8/1998 | Snoke et al. | 362/119 |
| 5,819,625 A | | 10/1998 | Sberveglieri | 83/471.3 |
| 5,835,517 A | | 11/1998 | Jayaraman et al. | 372/50 |
| 5,835,519 A | | 11/1998 | Tsukamoto et al. | 372/55 |
| 5,862,727 A | | 1/1999 | Kelly | 83/13 |
| 5,911,482 A | | 6/1999 | Campbell et al. | 30/390 |
| 5,918,523 A | | 7/1999 | Cutter | 83/520 |
| 5,943,931 A | | 8/1999 | Stumpf et al. | 83/468.2 |
| 5,943,932 A | | 8/1999 | Sberveglieri | 83/471.3 |
| 5,949,810 A | | 9/1999 | Star et al. | 372/108 |
| 5,968,383 A | | 10/1999 | Yamazaki et al. | 219/121.75 |
| 5,979,523 A | | 11/1999 | Puzio et al. | 144/286.5 |
| 5,995,230 A | | 11/1999 | Madlener et al. | 356/375 |
| 5,996,460 A | | 12/1999 | Waite | 83/520 |
| 6,023,071 A | | 2/2000 | Ogura et al. | 250/586 |
| 6,035,757 A | | 3/2000 | Caluori et al. | 83/520 |
| 6,076,445 A | | 6/2000 | Kenyon et al. | 83/477.2 |
| 6,131,629 A | * | 10/2000 | Puzio et al. | 144/252.1 |
| 6,137,577 A | | 10/2000 | Woodworth | 356/376 |
| 6,152,372 A | | 11/2000 | Colley et al. | 235/472.01 |
| 6,209,597 B1 | | 4/2001 | Calcote | 144/326 |
| 6,223,794 B1 | | 5/2001 | Jones | 144/135.2 |
| 6,239,913 B1 | | 5/2001 | Tanaka | 359/619 |
| 6,263,584 B1 | | 7/2001 | Owens | 33/640 |
| 6,283,002 B1 | | 9/2001 | Chiang | 83/477.1 |

| | | | |
|---|---|---|---|
| 6,301,997 B1 | 10/2001 | Welte | 81/54 |
| 6,328,505 B1 | 12/2001 | Gibble | 408/16 |
| 6,375,395 B1 | 4/2002 | Heintzeman | 408/16 |
| 6,405,624 B1 * | 6/2002 | Sutton | 83/102.1 |
| 6,413,022 B1 | 7/2002 | Sarh | 408/76 |
| 6,418,829 B1 * | 7/2002 | Pilchowski | 83/397 |
| 6,419,426 B1 | 7/2002 | Chalupa et al. | 408/1 R |
| 6,460,768 B1 | 10/2002 | Ring et al. | 235/462.43 |
| D465,165 S | 11/2002 | Doyle et al. | D10/65 |
| 6,493,955 B1 | 12/2002 | Moretti | 33/451 |
| 6,494,590 B1 | 12/2002 | Paganini et al. | 362/119 |
| 6,530,303 B1 | 3/2003 | Parks et al. | 83/473 |
| 6,536,536 B1 | 3/2003 | Gass et al. | 173/2 |
| 6,546,835 B1 | 4/2003 | Wang | 83/477.1 |
| 6,550,118 B1 | 4/2003 | Smith et al. | 29/26 A |
| 6,565,227 B1 | 5/2003 | Davis | 362/119 |
| 6,584,695 B1 | 7/2003 | Chang | 30/391 |
| 6,587,184 B1 | 7/2003 | Würsch et al. | 356/4.01 |
| 6,593,587 B1 | 7/2003 | Pease | 250/559.19 |
| 6,621,565 B1 | 9/2003 | Pratt et al. | 356/141.4 |
| 6,644,156 B1 | 11/2003 | Villacis | 83/425 |
| 6,647,868 B1 | 11/2003 | Chen | 100/99 |
| 6,662,457 B1 | 12/2003 | Dameron | 33/286 |
| 6,684,750 B1 | 2/2004 | Yu | 83/473 |
| 6,688,203 B1 | 2/2004 | Chen | 83/520 |
| 6,736,042 B1 | 5/2004 | Behne et al. | 83/440.2 |
| 6,736,044 B1 | 5/2004 | Chang | 83/473 |
| 6,739,042 B1 | 5/2004 | Thorum | 29/832 |
| 6,763,597 B1 | 7/2004 | Lysen | 33/286 |
| 2001/0028025 A1 | 10/2001 | Pease | 250/208.1 |
| 2001/0029819 A1 | 10/2001 | Okuchi | 83/13 |
| 2001/0034951 A1 | 11/2001 | Sears | 33/640 |
| 2001/0049988 A1 | 12/2001 | Ushiwata et al. | 83/520 |
| 2002/0000148 A1 | 1/2002 | Brun | 83/520 |
| 2002/0054491 A1 | 5/2002 | Casas | 362/119 |
| 2002/0059871 A1 | 5/2002 | Chen | 100/35 |
| 2002/0131267 A1 | 9/2002 | Van Osenbruggen | 362/109 |
| 2002/0146295 A1 | 10/2002 | Schaer et al. | 408/16 |
| 2002/0164217 A1 | 11/2002 | Peterson | 408/1 R |
| 2002/0170404 A1 | 11/2002 | Peot et al. | 83/478 |
| 2003/0000355 A1 | 1/2003 | Butler et al. | 83/13 |
| 2003/0010173 A1 | 1/2003 | Hayden | 83/520 |
| 2003/0027353 A1 | 2/2003 | Bright et al. | 436/173 |
| 2003/0029050 A1 | 2/2003 | Fung et al. | 33/626 |
| 2003/0101857 A1 | 6/2003 | Chuang | 83/477.1 |
| 2003/0150312 A1 | 8/2003 | Chang | 83/473 |
| 2003/0197138 A1 | 10/2003 | Pease et al. | 250/559.19 |
| 2003/0200851 A1 | 10/2003 | Yu | 83/471.3 |
| 2003/0209678 A1 | 11/2003 | Pease | 250/559.19 |
| 2003/0233921 A1 | 12/2003 | Garcia et al. | 83/520 |
| 2004/0032587 A1 | 2/2004 | Garcia et al. | 356/399 |

FOREIGN PATENT DOCUMENTS

| | | |
|---|---|---|
| CN | 2508922 | 9/2002 |
| CN | 2528568 | 1/2003 |
| CN | 2546122 | 4/2003 |
| DE | 2838968 | 3/1980 |
| DE | 3324428 | 1/1984 |
| DE | 3333428 | 4/1985 |
| DE | 3918070 | 12/1990 |
| DE | 4435573 | 4/1996 |
| DE | 19819332 | 11/1998 |
| DE | 19907880 | 8/2000 |
| DE | 10037532 | 2/2001 |
| EP | 0366039 | 5/1990 |
| EP | 054745 | 3/1991 |
| JP | 55125954 | 9/1980 |
| JP | 61061705 | 3/1986 |
| JP | 61131246 | 6/1986 |
| JP | 61159312 | 7/1986 |
| JP | 62166914 | 7/1987 |
| JP | 62274738 | 11/1987 |
| JP | 63162143 | 7/1988 |
| JP | 08197381 | 8/1996 |
| JP | 10-109253 | 4/1998 |
| JP | 11-170203 | 6/1999 |
| JP | 200-225603 | 8/2000 |
| JP | 2000-225602 | 8/2000 |
| JP | 2000-317901 | 11/2000 |
| JP | 2001-150401 | 6/2001 |
| JP | 2001-157951 | 6/2001 |
| JP | 2001-158003 | 6/2001 |
| JP | 2001-300818 | 10/2001 |
| JP | 2001-300902 | 10/2001 |
| JP | 2001-347501 | 12/2001 |
| TW | 537083 | 12/1990 |
| TW | 517615 | 5/1991 |
| TW | 411888 | 11/2000 |

OTHER PUBLICATIONS

"Delta, Building Trades and Home Shop Machinery"; Catalog published in Jan. 1993; (see generally pp. 5-25). 84 pages.

Craftsman Operator's Manual, "Laser Compound Miter Saw with Retractable Laser Trac® System, Model No. 137.212540," Part No. 137212540001; Sears, Roebuck and Co., Hoffman Estates, IL 60179; www.sears.com/craftsman; © Sears, Roebuck and Co.; 34 pages.

"Hitachi Model C 10FSH and C 10FSB Slide Compound Saw, Safety Instructions and Instruction Manual," issued by Hitachi Koki Co., Ltd., Shinagawa Intercity Tower A, 15-1, Konan 2-chome, Minato-ku, Tokyo 108-6020, Japan; pp. 1-30, 88 ,90, and 92; 33 pages.

* cited by examiner

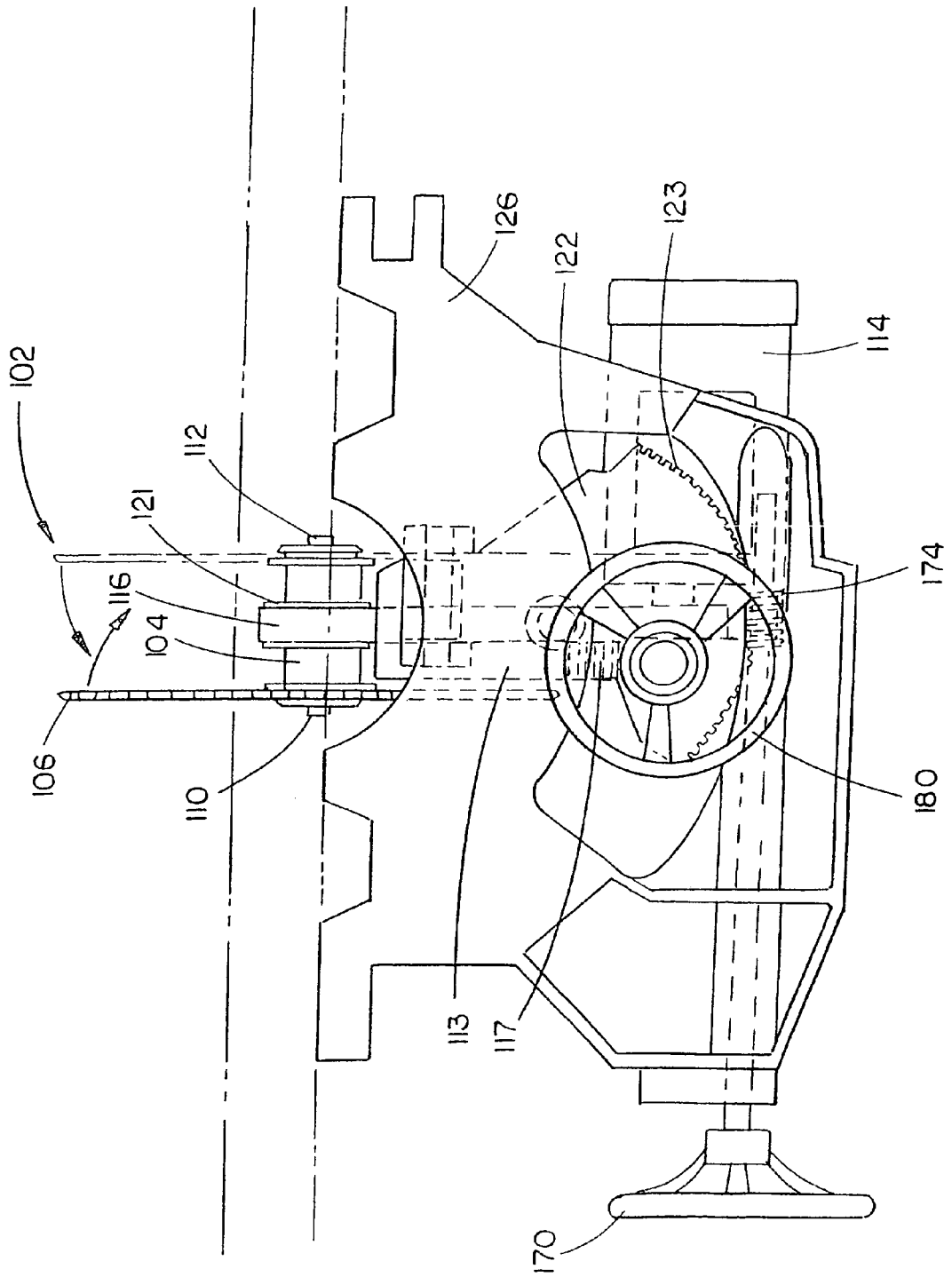
FIG. IC

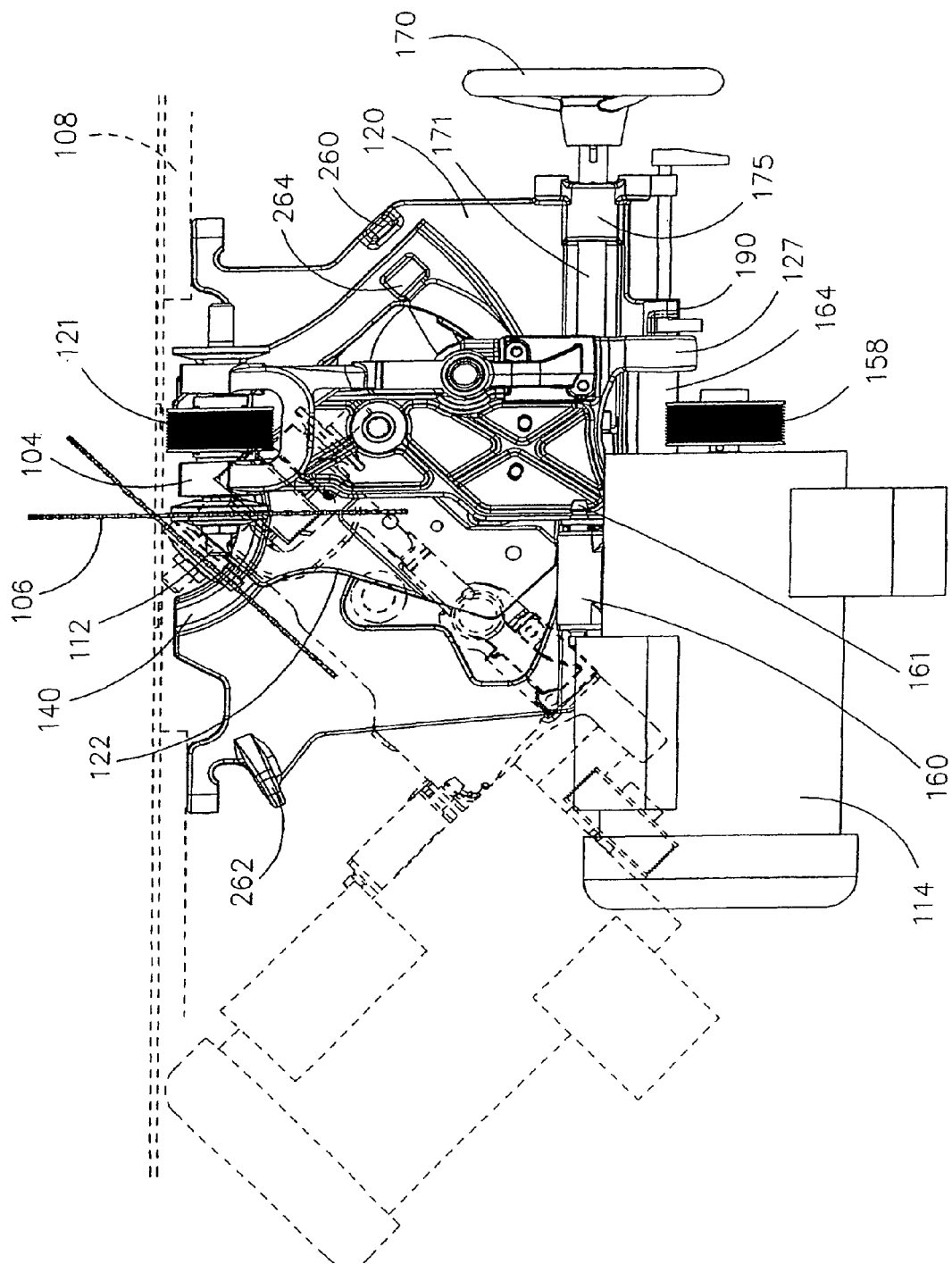

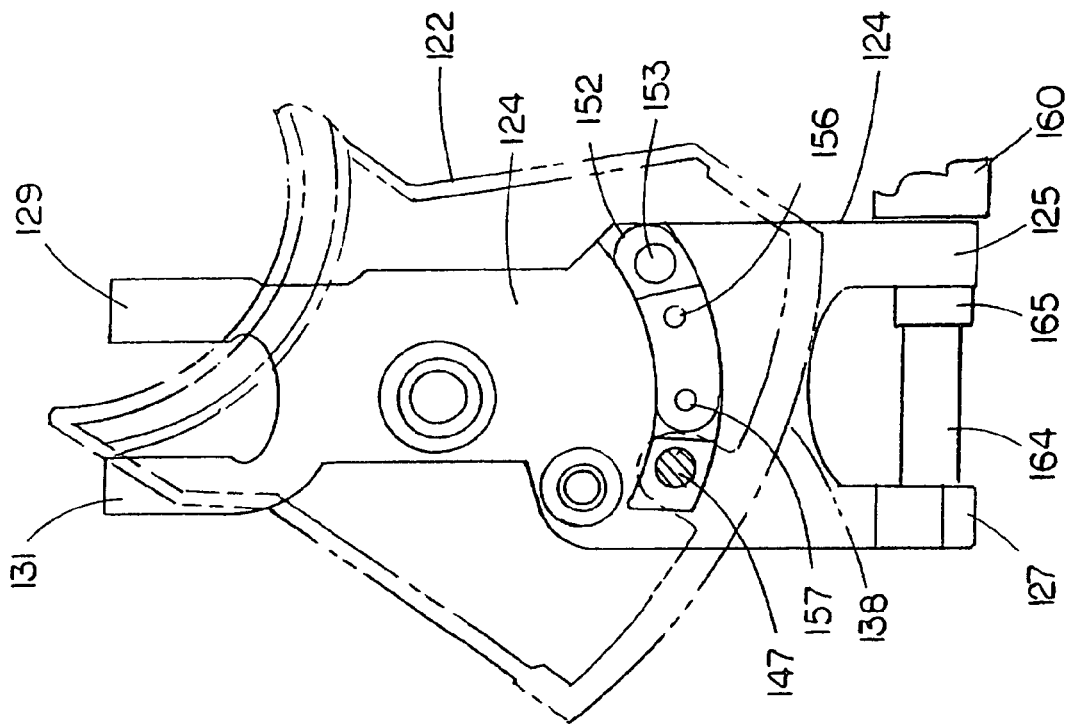
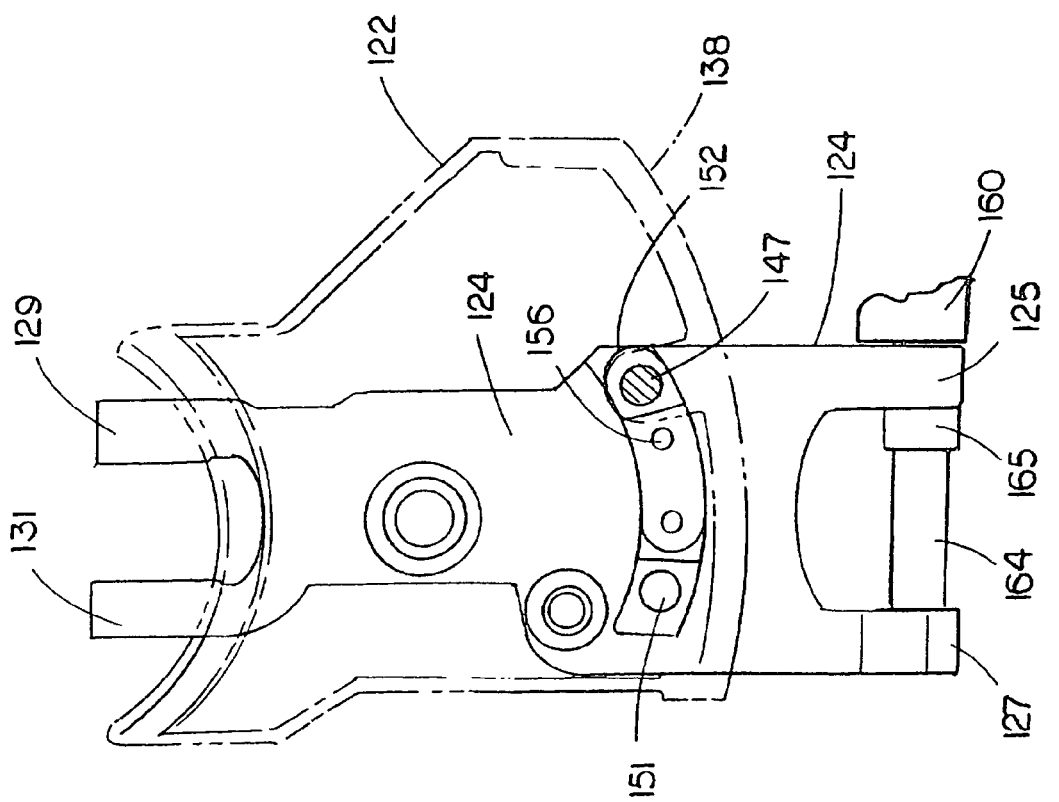
FIG. 9D
FIG. 9C

RIVING KNIFE ASSEMBLY FOR A DUAL BEVEL TABLE SAW

CROSS REFERENCE TO RELATED APPLICATIONS

The present application is a continuation-in-part of U.S. application Ser. No. 10/968,849 filed on Oct. 19, 2004, which was a continuation-in-part of U.S. application Ser. No. 10/698,993 filed on Oct. 31, 2003 now abandoned which claimed priority under 35 U.S.C. § 119(e) to U.S. Provisional Application Ser. No. 60/492,095, filed on Jul. 31, 2003 and U.S. Provisional Application Ser. No. 60/422,793, filed on Oct. 31, 2002. The U.S. application Ser. Nos. 10/968,849, 10/698,993, 60/492,095, and 60/422,793 are herein incorporated by reference in their entireties.

FIELD OF THE INVENTION

The present invention generally relates to the field of table saws, and particularly to a riving knife assembly for implementation with a dual bevel table saw having a bevel assembly capable of bi-directional beveling or angling of a saw blade.

BACKGROUND

Saw blades beveling is an advantageous capability to be included with power saw assemblies, such as table saw assemblies which include a saw assembly comprising a saw blade, extending through a planar surface (table), coupled with a motor by a mounting assembly. Beveling assemblies, provide the operator of a table saw with the ability to adjust the angular presentation of the saw blade relative to the planar surface of the table. Unfortunately, many beveling assemblies included with table saw assemblies, and the like, are limited in the capabilities they may provide to the operator.

A typical limitation of many beveling assemblies is the enablement of beveling in a single tilt orientation. For instance, a beveling assembly may provide the operator with the ability to adjust the angular presentation of the saw blade relative to the planar surface of the table in a right tilt orientation or a left tilt orientation. Other beveling assemblies have limited beveling capabilities resulting from unwanted contact between the component features of the saw assembly or beveling assembly and other structural impediments of the table saw assembly, such as the unwanted contact between the motor, which drives the saw blade of the table saw assembly, and the underside of the planar surface of the table or structural support features of the table saw assembly. Additionally, unwanted contact may result from contact between the mounting assembly of the saw blade and the table. For instance, when the blade is beveled, the mounting assembly may contact the underside of the table because of the mounting assembly's proximate location to the table.

Unfortunately, attempts to resolve these problems have resulted in assemblies which may require a user to accept limited capabilities. For example, unwanted contact is decreased, but only by limiting the depth of cut capabilities of the saw blade of the table saw assembly. Therefore, it would be desirable to provide a table saw assembly which enables the saw blade with bi-directional beveling capabilities (right and left tilt orientation) without reducing the capabilities of the saw blade due to factors, such as unwanted structural impedance.

Additional limitations may be a result of design limitations. For instance, the assembly, which couples the saw blade with the motor of the table saw, typically, statically fixes the position of the motor relative to the saw blade. Such a situation may result in decreased performance of the saw assembly during beveling due to changes in tolerances resulting from changes in the positions of these features due to beveling.

Therefore, it would be desirable to provide a beveling assembly which increased the ability of the component features of the table saw assembly to remain near optimal tolerances during the beveling of the saw blade. Another design limitation is the typical arbor assembly is enabled as a single axle, which may be limited to coupling with the saw blade to impart angular momentum on a single end of the axle. This may result in the beveling assembly enabled with the single axle arbor assembly limiting its capabilities to a single tilt orientation, as described previously. Still further, this may result in increased time spent attempting to properly re-align the single axle arbor assembly when transitioning between beveling in a first tilt orientation to beveling in a second tilt orientation, such as from right to left. This may significantly decrease productivity accomplished through use of the table saw employing such a single axle arbor assembly. Further, due to such drastic re-positioning required by the single axle arbor assembly there may be an increase in tolerance misalignments resulting in increases in non-production time spent by the power tool. Therefore, it would be desirable to provide an arbor assembly which decreased time spent re-aligning the arbor assembly and increased the ease of employing the saw blade on the arbor assembly for beveling in both tilt orientations.

Further, it is common practice in the field of power tools, particularly arbor assemblies for table saws, to take steps to "true" the assembly after it has been assembled. This truing may assist in increasing the productivity and life span of the power tool by assisting in reducing wear to the component features of the power tool. Steps, such as machining the flange may true the arbor assembly and may decrease the amount of "wobble" introduced into the saw blade during operation of the table saw. Unfortunately, after the truing of the arbor assembly is complete the parts of the arbor assembly, such as the bearing for example, may wear out due to use, requiring replacement. It is known to allow for the operator to disassemble the arbor assembly in order to replace the bearing. This often requires removal of the flange in order to access the bearing. It is typically the case that when the operator re-assembles the arbor assembly the flange and possibly other component features are no longer in the trued position, as originally provided by the manufacturer. Thus, "wobble" may be introduced into the spinning blade of the table saw. Therefore, it would be further desirable to provide an arbor assembly which assists the operator in maintaining its trued position even after replacement of component features of the arbor assembly.

Therefore, it would be further desirable to provide an arbor assembly which assists the operator in maintaining its trued position even after replacement of component features of the arbor assembly.

SUMMARY OF INVENTION

Accordingly, the present invention is directed to a dual bevel table saw including a saw blade operationally coupled with a bi-directional beveling assembly for promoting ease of use while maximizing the functional capability of the saw. Thus, the saw blade is enabled to provide a full depth of cut capability even when disposed at various angles relative to a support surface (table) of the dual bevel table saw. Further, the beveling assembly, regardless of the direction of angular adjustment of the saw blade, enables the positioning of a motor, coupled with the saw blade, in a manner promoting the full range of angular adjustment of the saw blade, with the motor free from contacting with other components of the table saw, such as the underside of the table or other components. Thus, the present invention promotes the angular adjustment of the saw blade through positioning capabilities of the motor.

Another object of the present invention is to prevent contact between a mounting assembly, that operationally couples the saw blade with the table saw, and the table or other structural components of the table saw. It is a further object of the present invention to provide a table saw assembly capable of maintaining an appropriate tension on an apparatus for transferring the driving force of the motor to the saw blade for imparting angular momentum to the saw blade.

It is a still further object of the present invention to provide a mounting assembly, for promoting bi-directional angular adjustment capabilities of the beveling assembly by enabling the re-positioning of the saw blade. It may be further seen, in the present invention, that other components, such as the table or support structure(s), may include additional features which promote the ease of use and functional capabilities of the dual bevel table saw. For example, the table may include a throat assembly, operationally engaged by the saw blade, which advantageously enables the re-positioning of the saw blade to promote the angular adjustment capabilities of the present invention.

Additionally, the present invention is further directed to providing features which enable the dual bevel table saw with multiple functionalities. The functionalities may include measurement systems, dust collection systems, non contact power tool control systems, and the like, which in operational concert with the bi-directional beveling assembly providing significant advantage.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1C is a side elevation view illustrating the dual bevel table saw assembly further indicating the right and left bevel adjustment capabilities enabled by the present invention;

FIG. 2A is a back-side view of a beveling assembly in both the zero and forty five degree left tilt position in accordance with the exemplary embodiments of the present invention;

FIGS. 9A, 9B, 9C, and 9D are expanded exploded views of the beveling assembly;

DESCRIPTION OF THE INVENTION

Figure 1A:
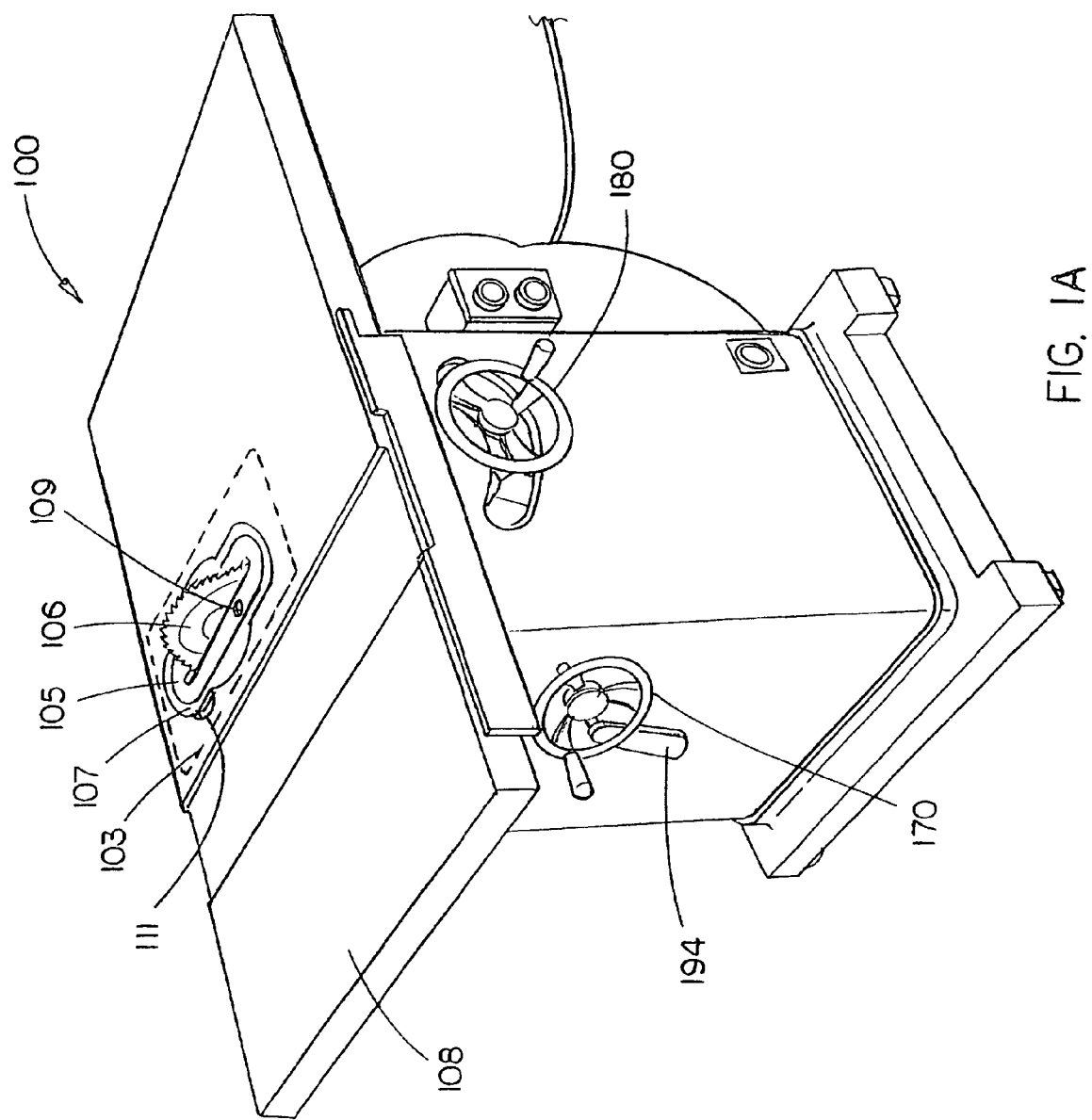
FIG. 1A is a perspective view illustrating a dual bevel table saw assembly in accordance with an exemplary embodiment of the present invention.
Figure 1B:
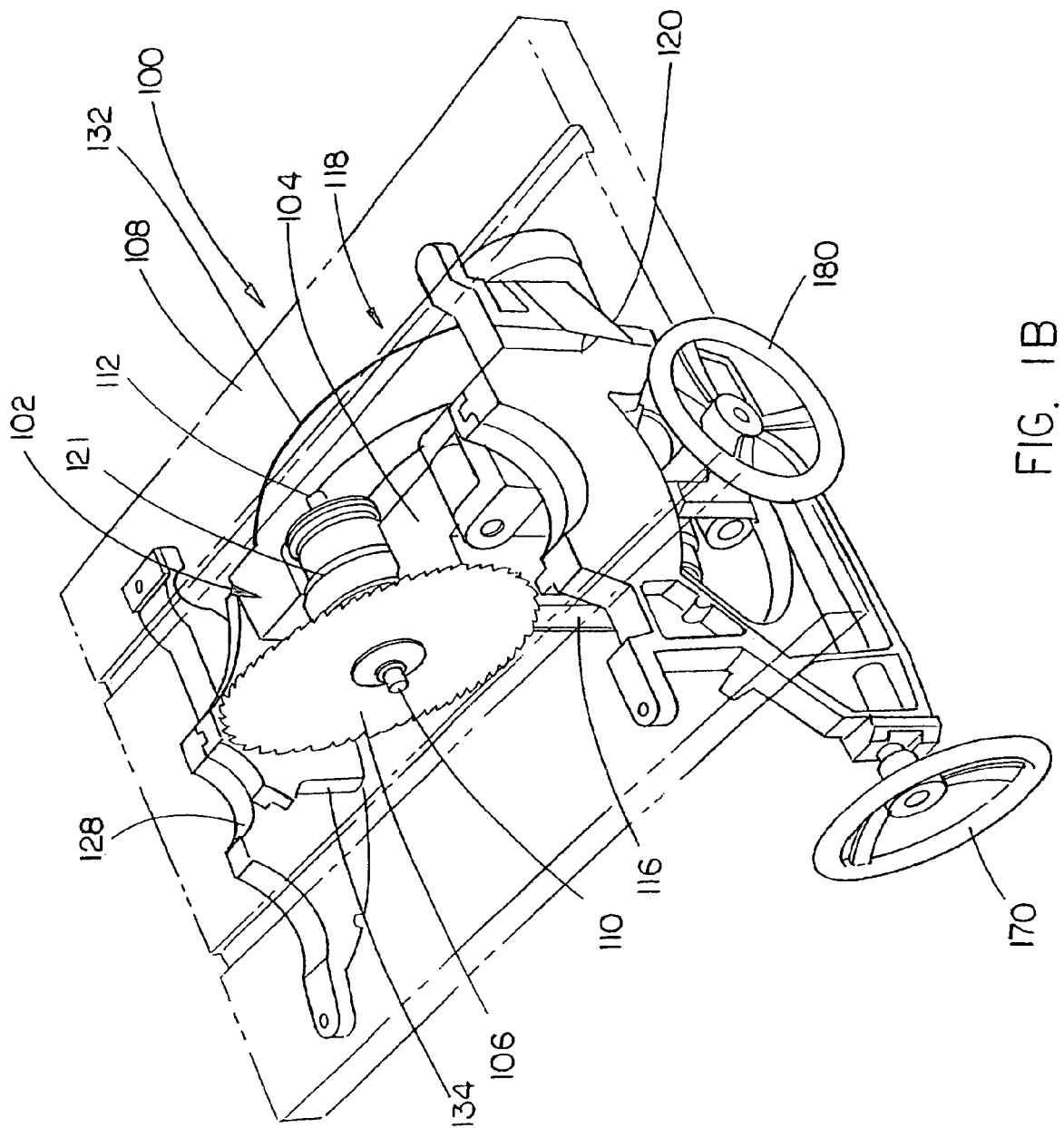
FIG. 1B is an expanded perspective view of a saw assembly of the dual bevel table saw assembly.
Figure 1D:
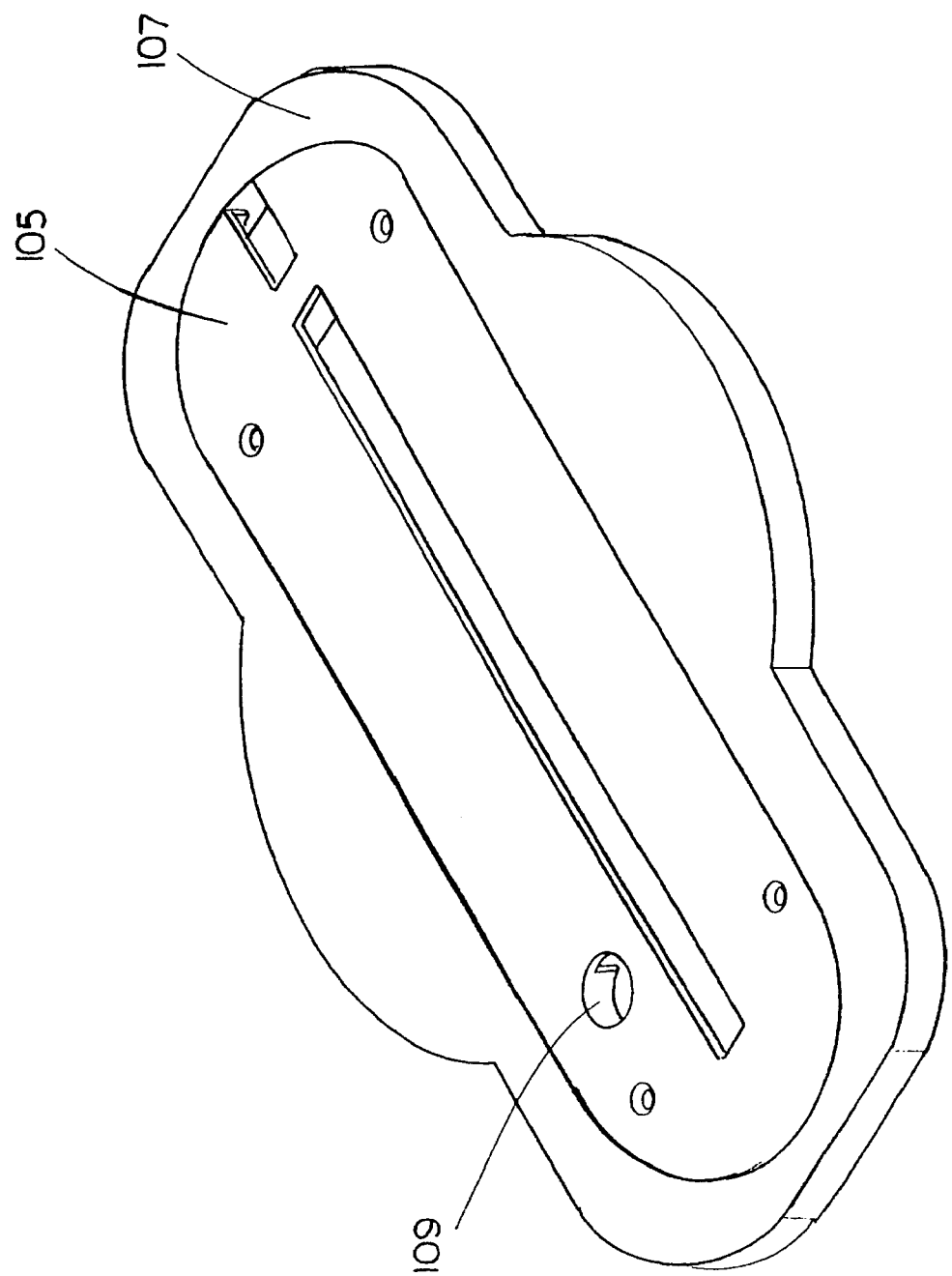
FIG. 1D illustrates a throat plate assembly in accordance with an exemplary embodiment of the present invention.
Figure 2B:
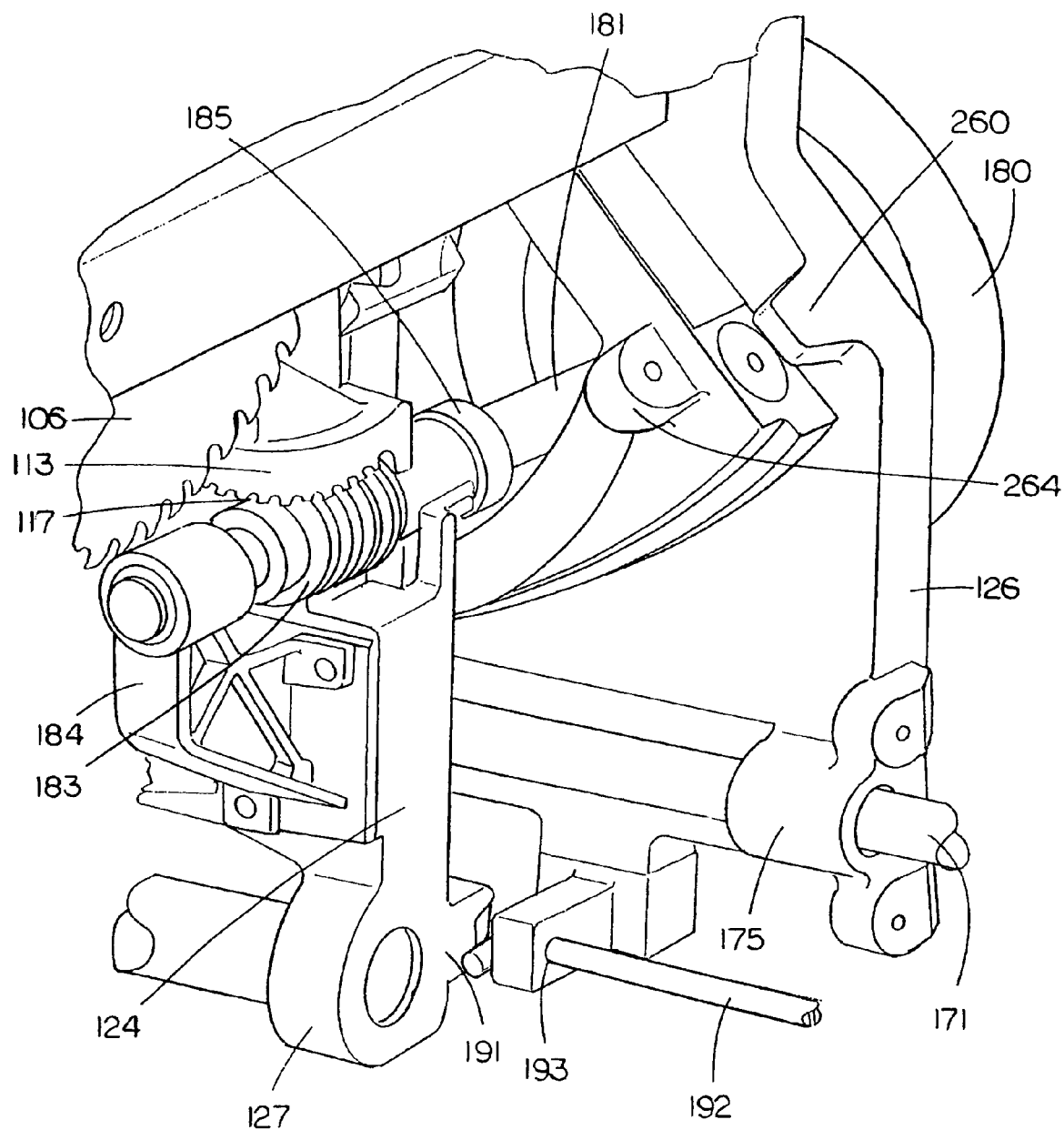
FIG. 2B is an expanded perspective view illustrating the back-side view of the beveling assembly shown in FIG. 2A.
Figure 3:
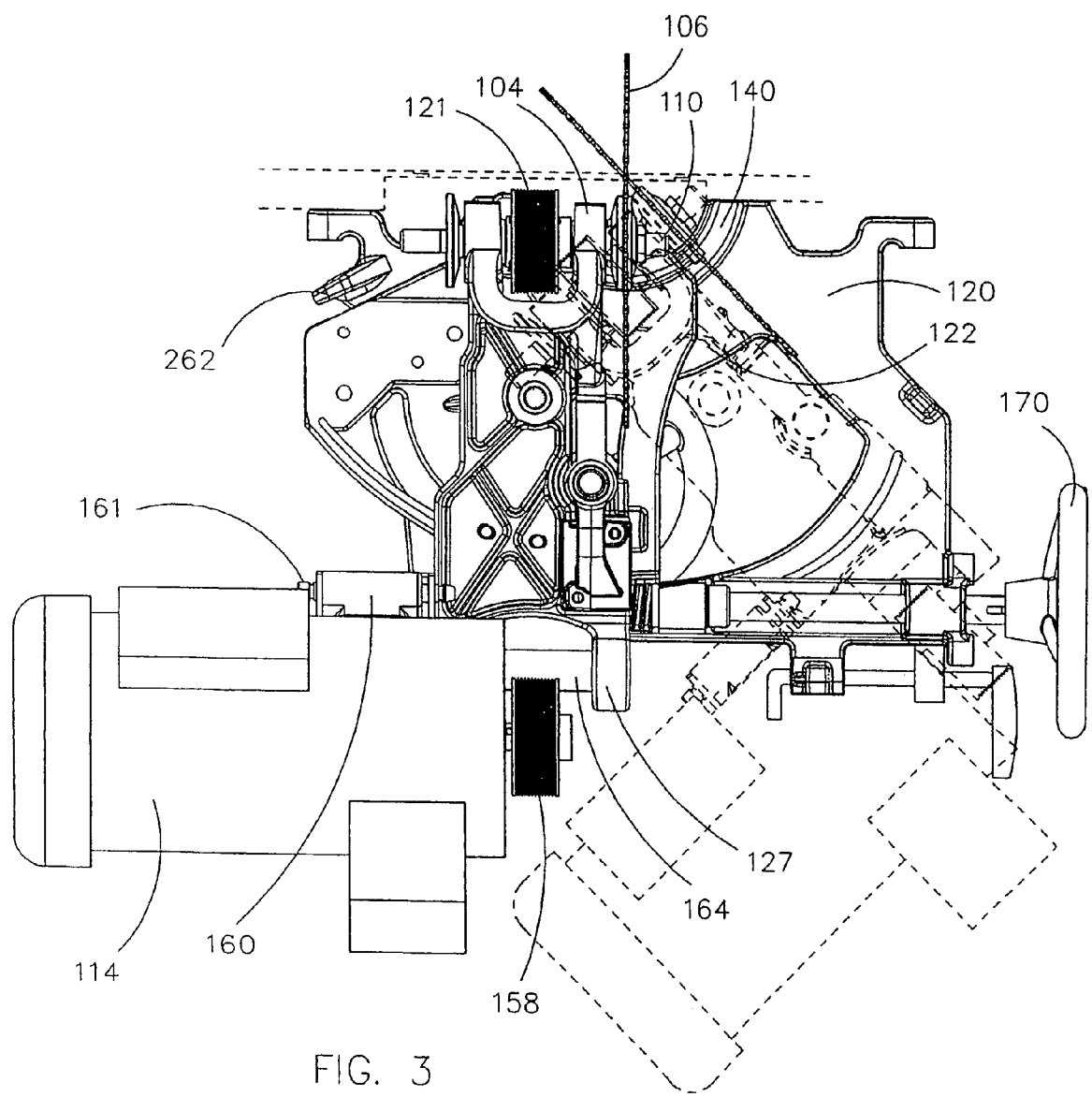
FIG. 3 is a back-side view of the beveling assembly in both the zero and forty five degree right tilt position in accordance with the exemplary embodiments of the present invention.
Figure 4A:
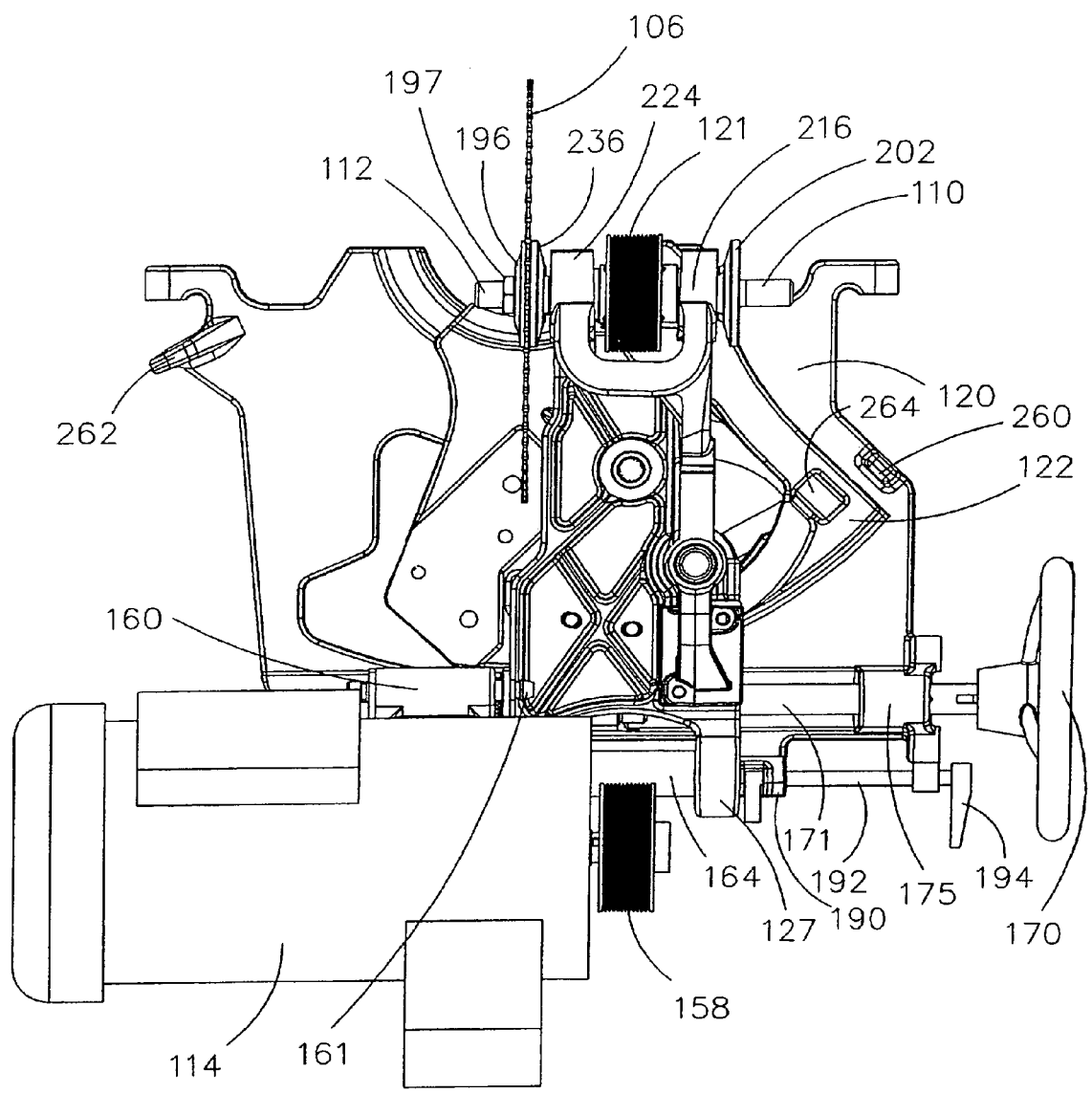
FIG. 4A is a back-side view of the beveling assembly in the zero degree left tilt position in accordance with the exemplary embodiments of the present invention.
Figure 4B:
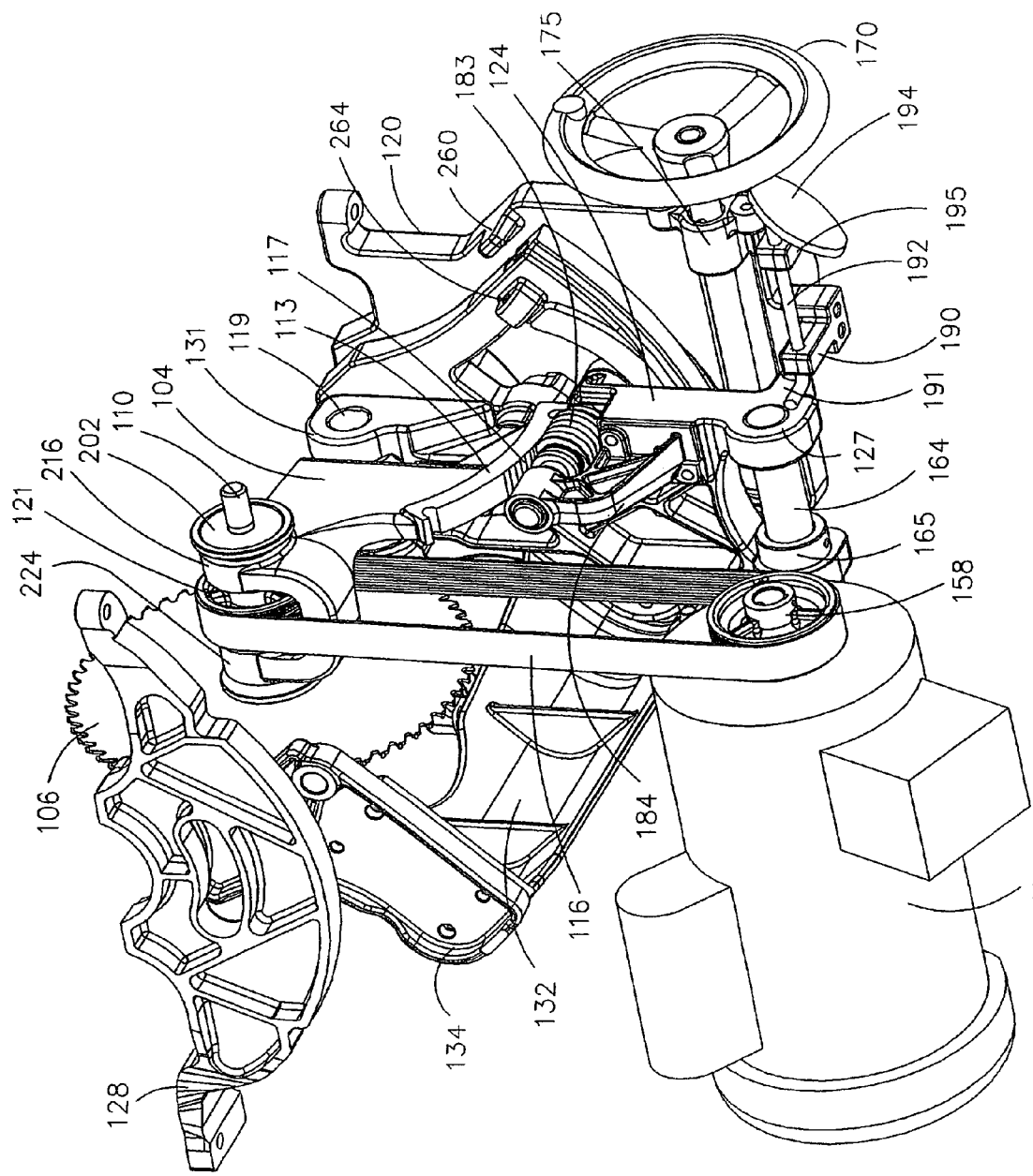
FIG. 4B is a back-side isometric view of the beveling assembly in the zero degree left tilt position in accordance with the exemplary embodiments of the present invention.
Figure 4C:
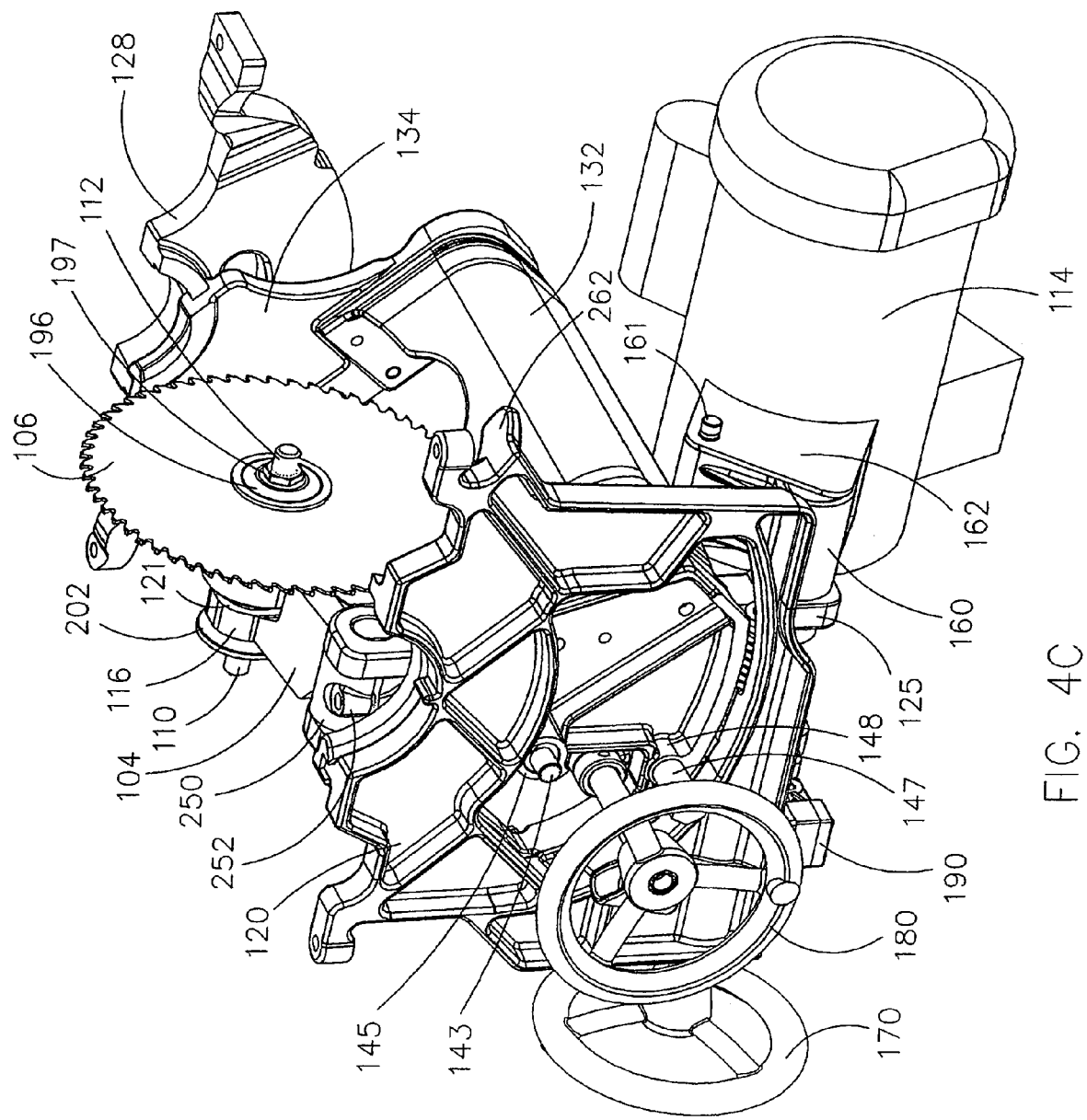
FIG. 4C is a front-side isometric view of the beveling assembly in the zero degree left tilt position in accordance with the exemplary embodiments of the present invention.

Reference will now be made in detail to the presently preferred embodiments of the invention, examples of which are illustrated in the accompanying drawings.

Referring now to FIGS. 1 through 11, a dual bevel table saw 100 in accordance with exemplary embodiments of the present invention are described. The dual bevel table saw 100 includes a circular saw blade 106 operationally coupled with a motor 114, via an arbor assembly 102. In the present embodiment, the arbor assembly 102 is a dual sided arbor assembly for receiving a saw blade on either a first end or second end. The arbor assembly 102 includes an arbor bracket 104 for supporting an associated blade 106 which may be extended through a table 108. The dual bevel table saw 100 further includes a bevel assembly 118 for adjustably beveling the arbor assembly 102 to establish a plurality of angular settings of the saw blade 106. The circular saw blade 106 may extend through a throat plate assembly 103 which, in the preferred embodiment, comprises an inner throat plate 105 and an outer throat plate 107. The inner throat plate 105 may include an aperture or recess 109 to allow a user to remove the inner throat plate 105 to adjust the saw configuration. The outer throat plate 107 may include an aperture or recess for the removal of the outer throat plate 107 as well. As will be described infra, the ability to remove and replace the inner and outer throat plate 105 and 107 further allows convenient access to the arbor assembly 102 such as when changing blades or the like. Alternatively, the throat plate assembly 103 may comprise a single throat plate. It is further contemplated that the throat plate assembly 103 may be composed of various materials, such as metal, plastic, wood, composite, and the like.

The arbor assembly 102 is a dual sided arbor assembly. As shown from the perspective of FIGS. 1A, 1B, 1C and the exploded view of FIG. 11B, an arbor shaft 200 comprises a first (left-side) end 110 and a second (right-side) end 112. In preferred embodiments both the first and second ends are at least partially threaded for engagement by nut 197 for securing an removable outer flange 196 for securing the saw blade 106 upon either end.

Figure 11A:
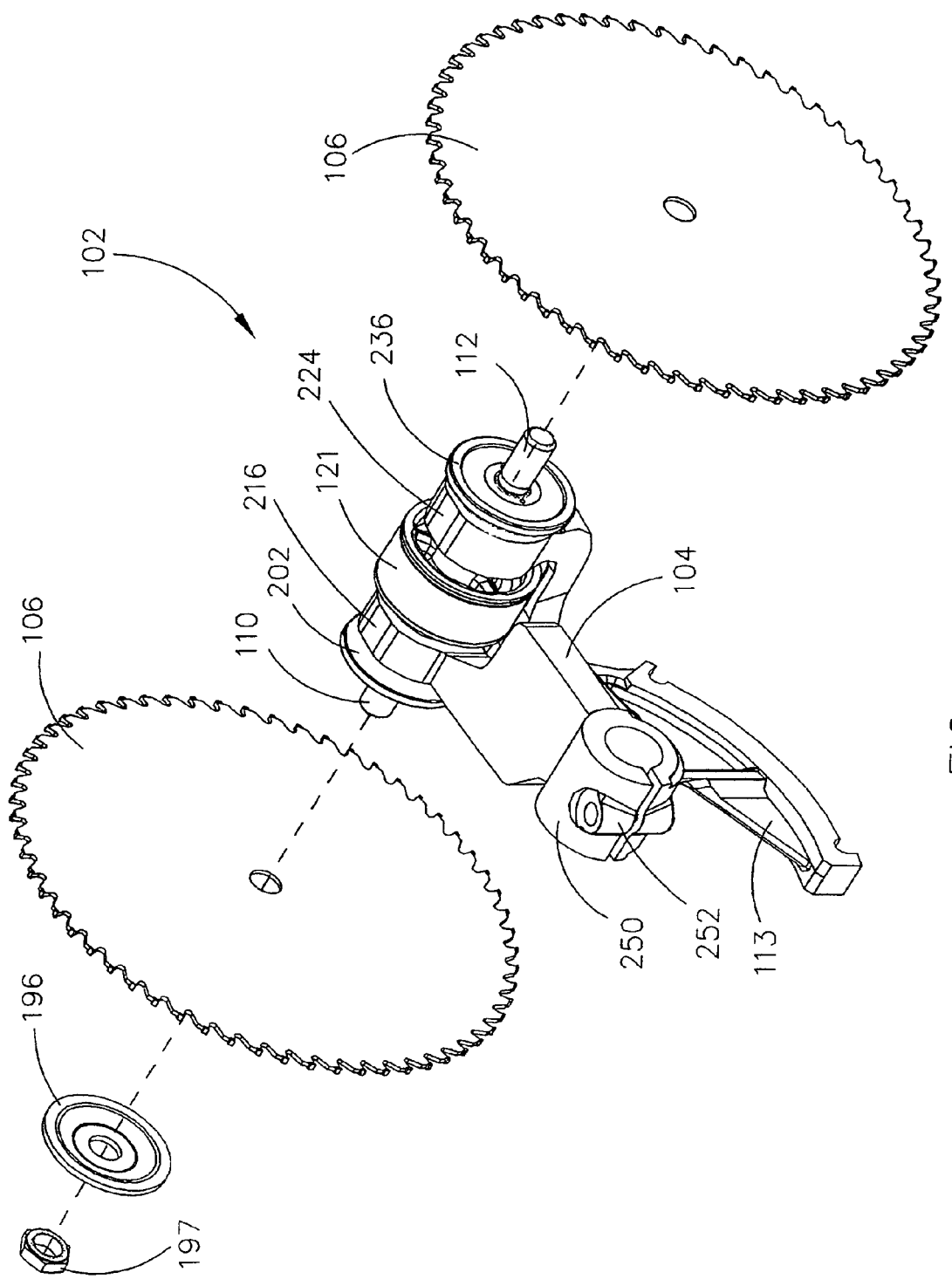
FIG. 11A is an exploded view illustrating the coupling of a saw blade with the dual sided arbor assembly.
Figure 11B:
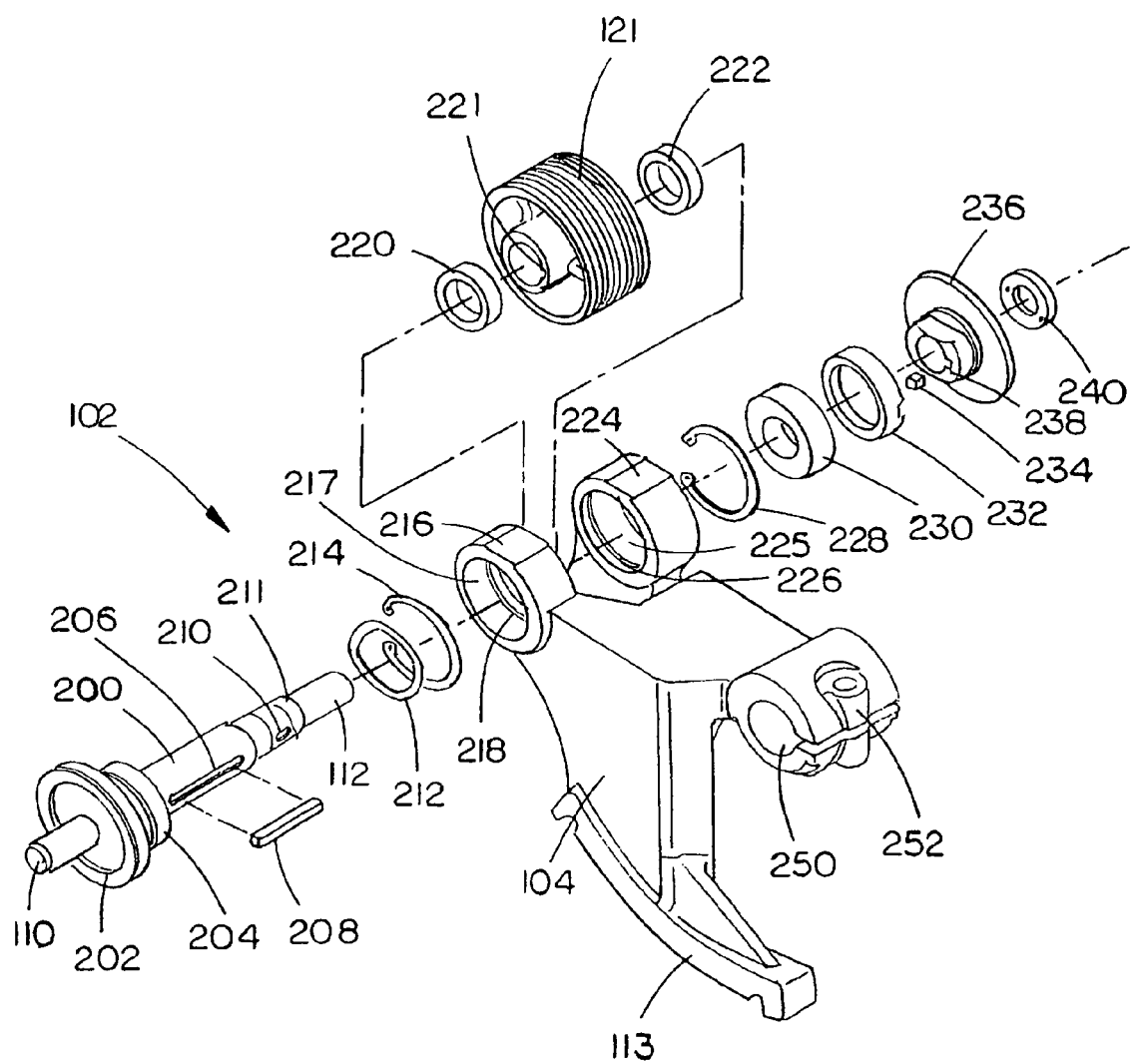
FIG. 11B is an exploded view illustrating the dual sided arbor assembly in accordance with an exemplary embodiment of the present invention.
Figure 11C:
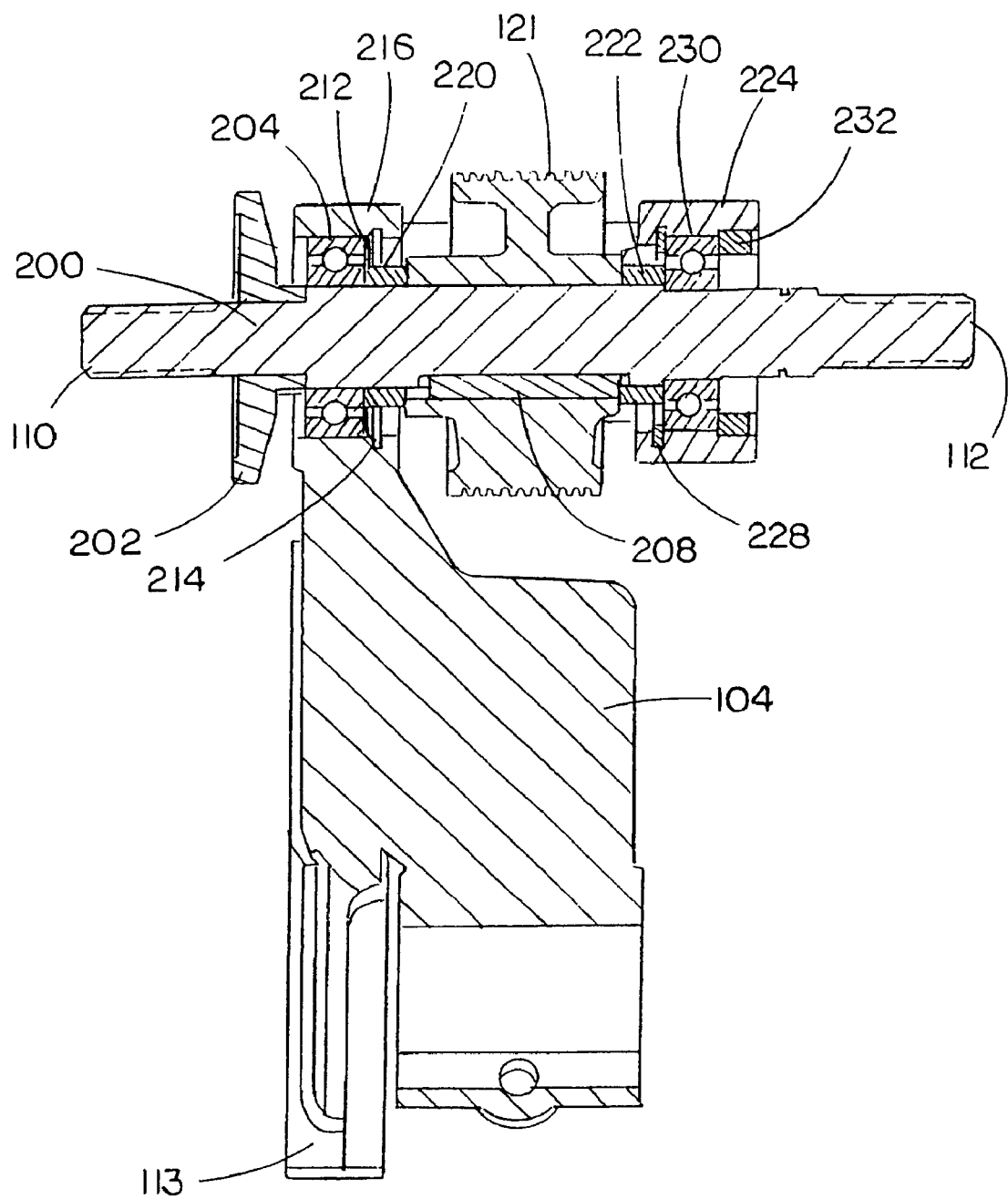
FIG. 11C is a cross-section side elevation view illustrating the dual sided arbor assembly.

Referring to FIGS. 11A, 11B and 11C in the present embodiment, an arbor assembly 102 includes an arbor shaft 200 including a first flange 202 and a first bearing 204. The arbor shaft 200 further includes a recess or a first key receiver 206 for receiving a first key 208. The first key 208, when at least partially engaged within the first key receiver 206, couples with a corresponding recess 221 included in an arbor pulley 121 to interconnect the arbor shaft 200 to the arbor pulley 121, such that rotation of the pulley causes the arbor 200 to rotate. The arbor shaft may further include a second key receiver 210. The second key receiver 210 is located proximally to the second end 112 of the arbor shaft 200. The arbor shaft 200 may be alternately configured to provide similar functionality as provided by the key assemblies described above. For example, the arbor shaft 200 may include one or more stops, such as tabs, disposed along the shaft 200. Alternatively, the arbor shaft 200 may include one or more biased assemblies which engage with the other components of the dual arbor assembly 102. Various other configurations, as contemplated by those of ordinary skill in the art, may be employed without departing from the scope and spirit of the present invention.

Referring to FIG. 11A and 11B, an arbor bracket 104 includes a first height bracket 216 with an aperture 217 having a first retaining groove 218 extending circumferentially within the aperture 217. It is contemplated that the aperture 217 may be at least partially threaded for engagement with various components as will be described below. A first retaining ring 214 may be disposed in the first retaining groove 218. Additionally, the retaining ring may snap fit about a corresponding groove in the arbor 200. During assembly, the first retaining ring 214 may be compressed and slid into the first retaining groove 218. Upon releasing the first retaining ring 214 may engage with the first retaining groove 218 and may substantially surround a corresponding groove on the arbor shaft 200 or merely permit the arbor shaft to extend through the center aperture of the ring 214. A wave washer 212 engages with the first retaining ring 214 and the bearing 204 when assembled within the aperture 217. The wave washer may bias against the first retaining ring and the bearing to insure proper alignment. Disposed between the first height bracket 216 and a second height bracket 224 is a first pulley spacer 220, the arbor pulley 121, and a second pulley spacer 222. When assembled, the first and second pulley spacers surround the arbor shaft 200 and engage into the first and second height brackets, respectively. Thus, the first pulley spacer may be disposed against the first retaining ring 214 mounted within the first retaining groove 218, so as to laterally align the pulley along an axis extending through the arbor shaft.

With continued reference to FIGS. 11A and 11B, the second pulley spacer 222 engages against a second retaining ring 228. The second retaining ring 228 is operationally disposed in a second retaining groove 226 within an aperture 225 of the second height bracket 224. It is contemplated that the first and second height brackets may have a first and second bores co-axially aligned so as to form a shoulder, respectively, inside the apertures. These shoulders may provide similar functionality as the retaining rings thus. It is further contemplated that the first and second height brackets may be configured as multi-piece brackets. The multiple pieces may be secured together through various fastening and/or hinge assemblies to provide the first and second bores for the operational engagement of the arbor shaft 200. Furthermore, the second bracket aperture 225 may be at least partially threaded for engagement with various components. The second pulley spacer 222 engagement against the second retaining ring 228 is on the opposite side of the second retaining ring 228 engagement with a second bearing 230. The second bore 225 of the second height bracket 224 also includes a threaded section which is for engagement with a bearing retaining nut 232. When assembled the bearing retaining nut 232 secures the position of the second bearing 230 within the second bore 225 of the second height bracket 224. A second key 234 engages with the second key receiver 210 disposed on the arbor shaft 200, and a second flange key receiver 238 included on a second flange 236. Alternatively, a pin or the like may be utilized to couple the bearing retaining nut 230 or the like to the arbor. The second flange 236, when assembled, is secured in its position through use of a flange retaining nut 240 which is internally threaded to engage with the threading of the arbor shaft 200 adjacent the second end 112.

The second key 234 may enable a user to service the assembly without adversely impacting the configuration of the assembly 102. Service may include replacing the bearings 230 and 204 which may require the removal of the second flange 236. The second key 234 may act as an alignment mechanism whereby the position of the second flange 236 is maintained, relative to the arbor shaft 200, when the arbor assembly is re-assembled. Thus, the second key 234 may minimize unwanted side effects, such as "wobble" in a spinning blade (the blade spinning out of planarity), after servicing the arbor assembly.

Figure 5A:
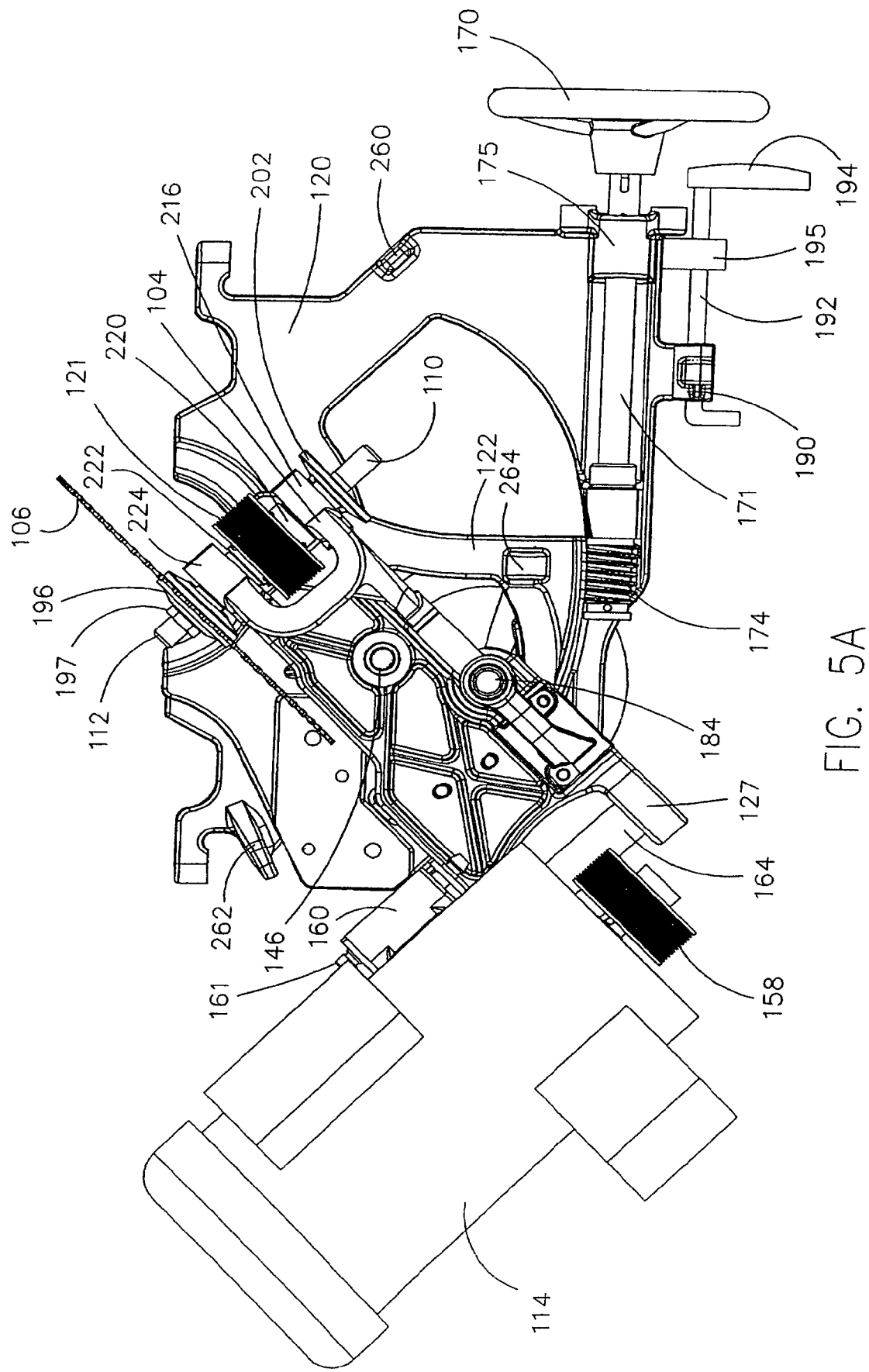
FIG. 5A is a back-side view of the beveling assembly in the forty five degree left tilt position in accordance with the exemplary embodiments of the present invention.
Figure 5B:
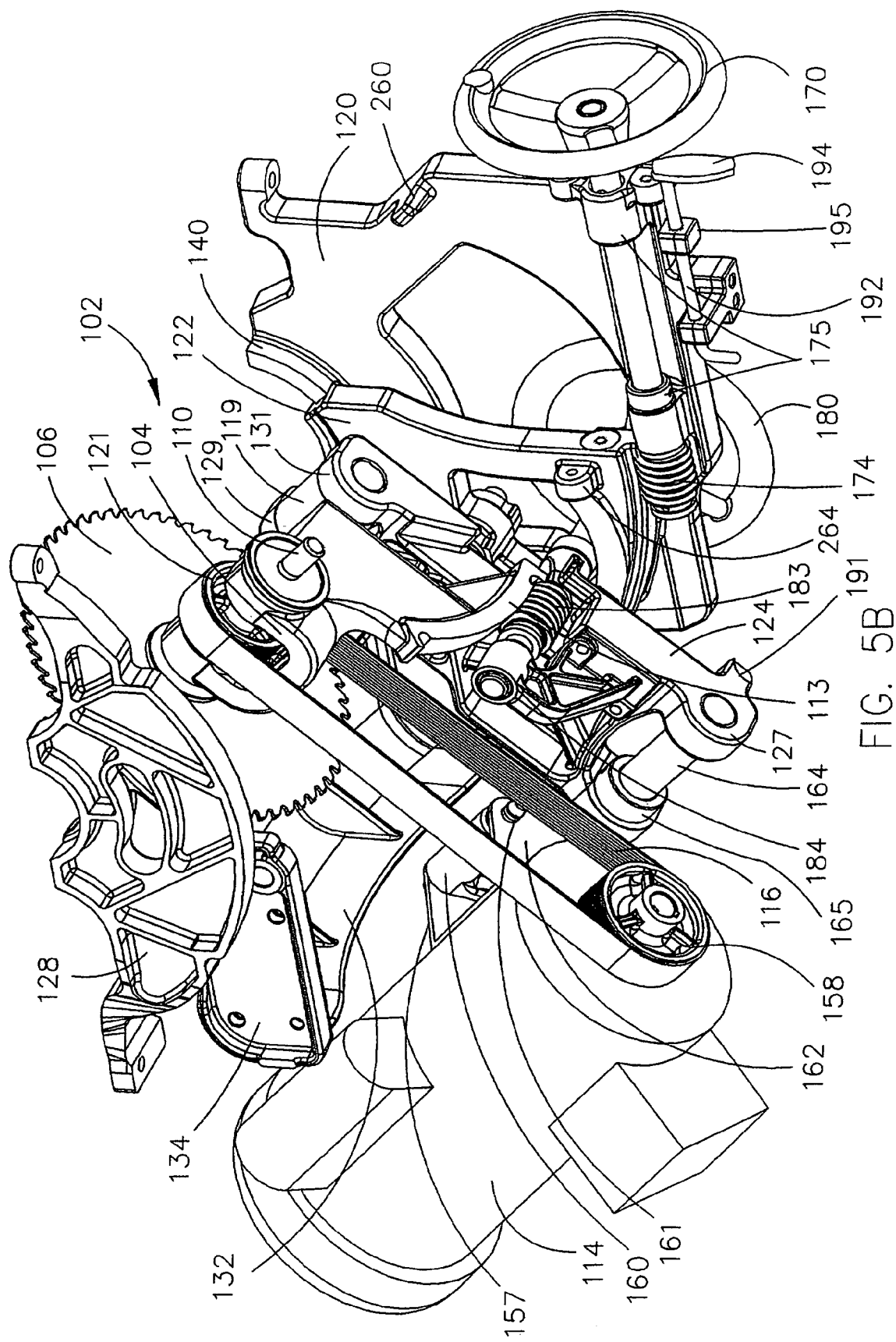
FIG. 5B is a back-side isometric view of the beveling assembly in the forty five degree left tilt position in accordance with the exemplary embodiments of the present invention.
Figure 5C:
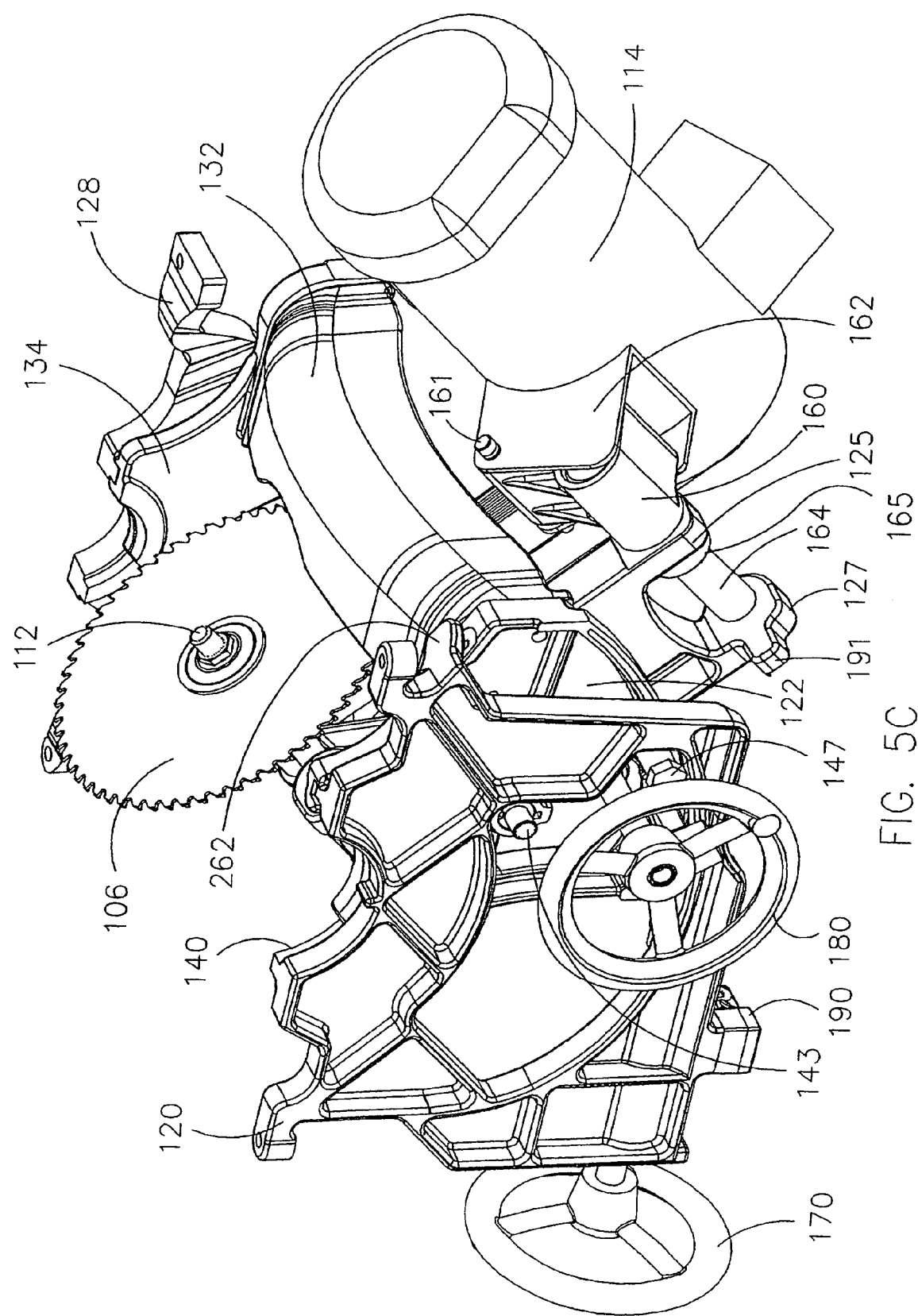
FIG. 5C is a front-side isometric view of the beveling assembly in the forty five degree left tilt position in accordance with the exemplary embodiments of the present invention.
Figure 6A:
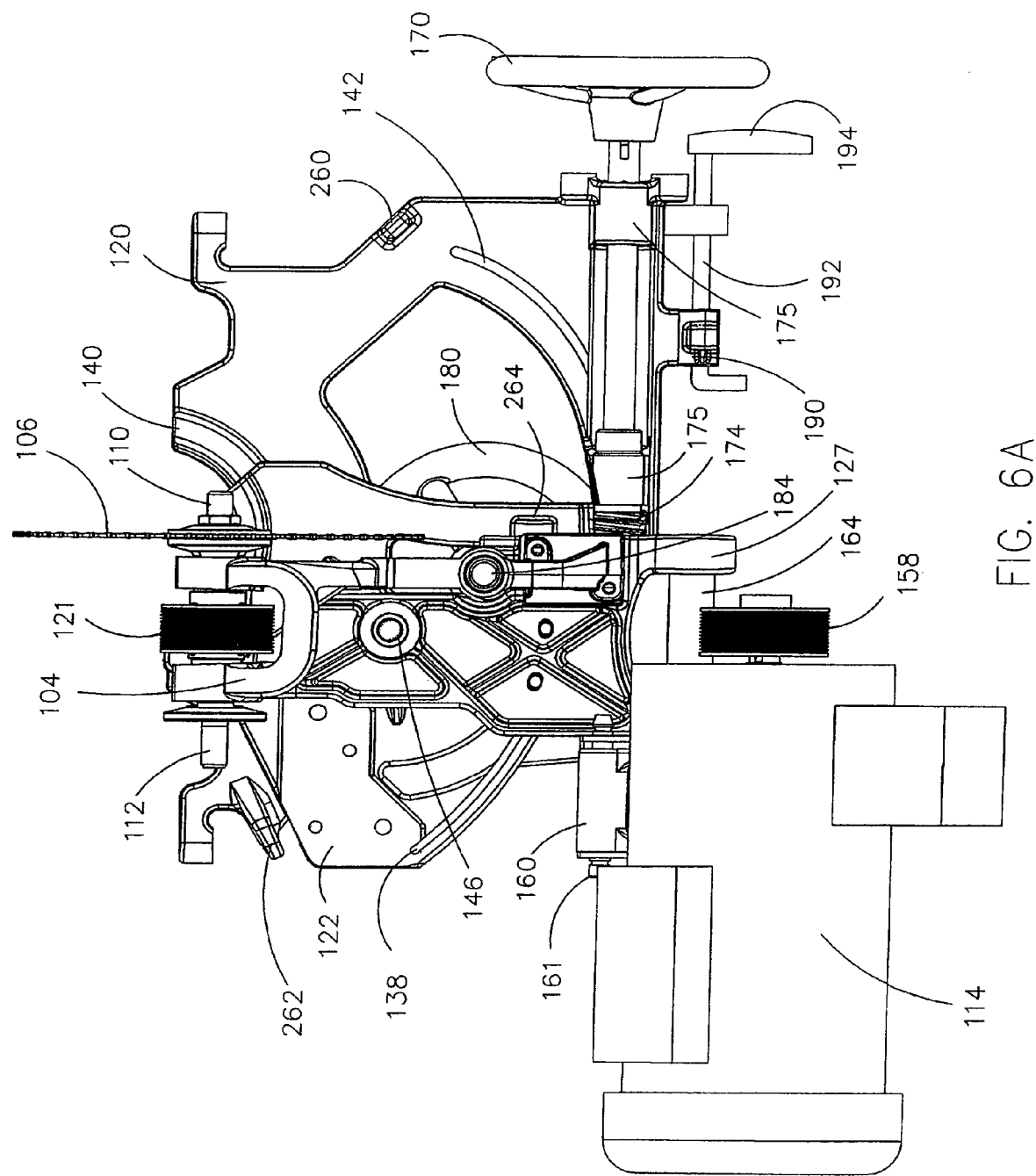
FIG. 6A is a back-side view of the beveling assembly in the zero degree right tilt position in accordance with the exemplary embodiments of the present invention.
Figure 6B:
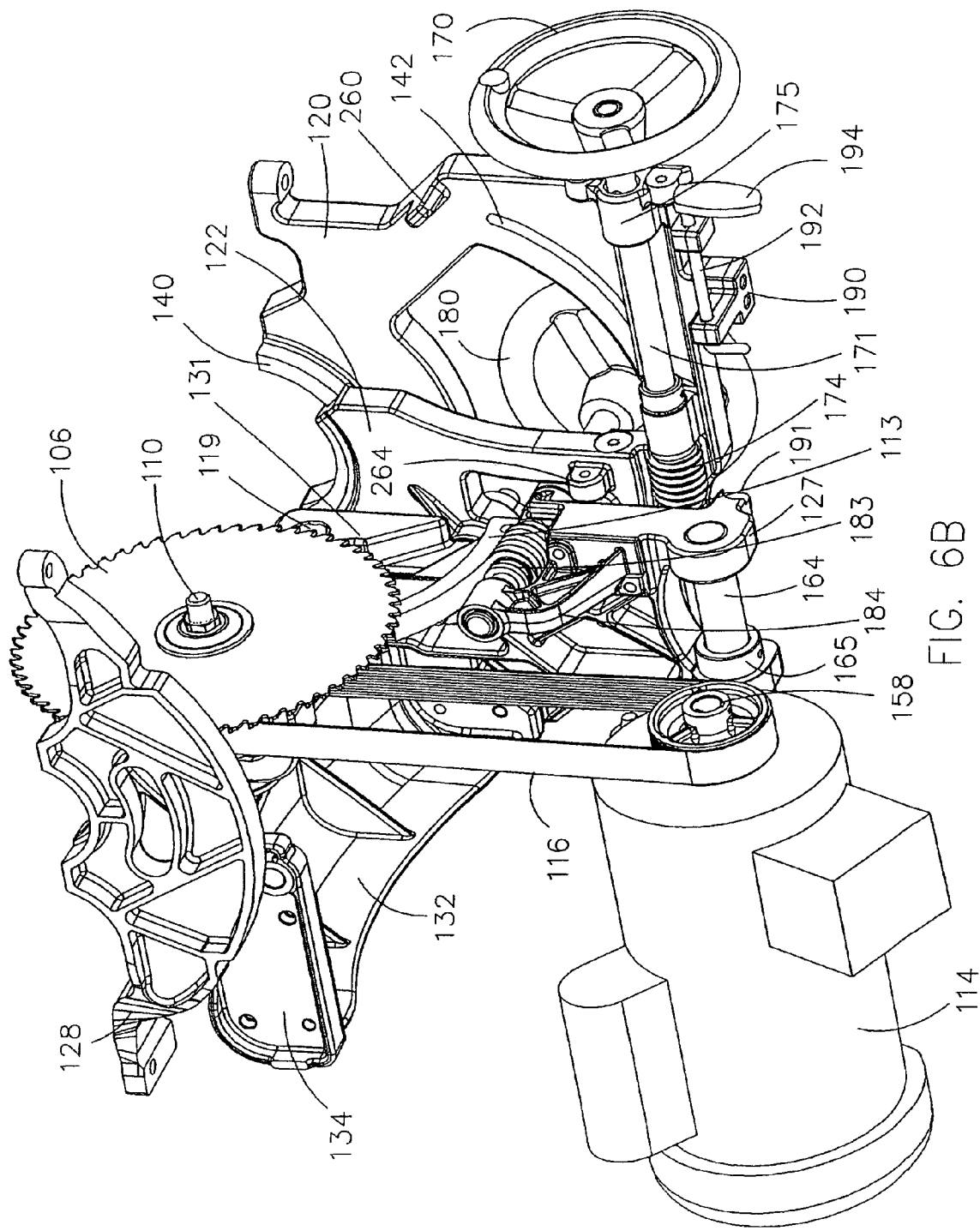
FIG. 6B is a back-side isometric view of the beveling assembly in the zero degree right tilt position in accordance with the exemplary embodiments of the present invention.
Figure 6C:
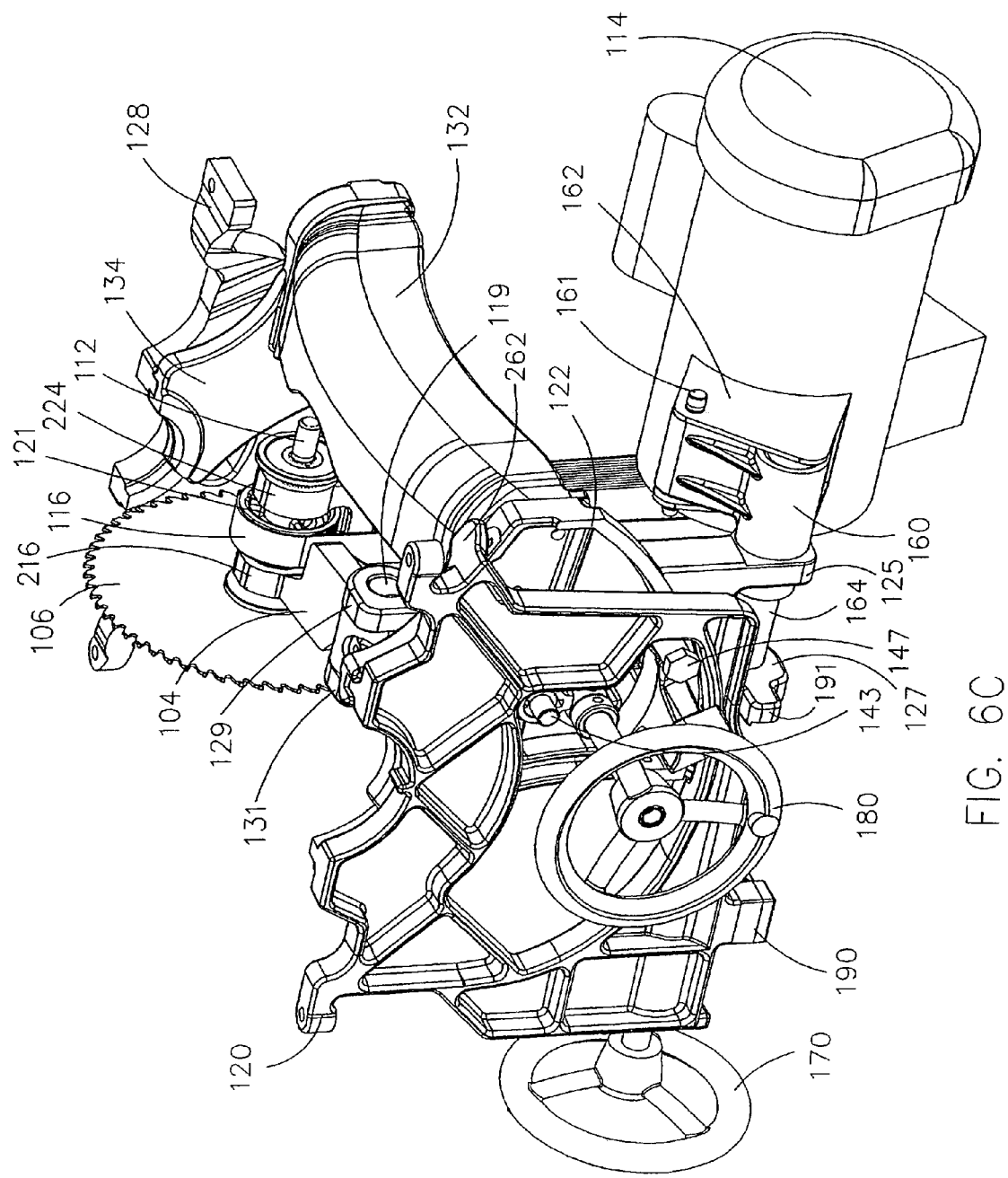
FIG. 6C is a front-side isometric view of the beveling assembly in the zero degree right tilt position in accordance with the exemplary embodiments of the present invention.
Figure 7A:
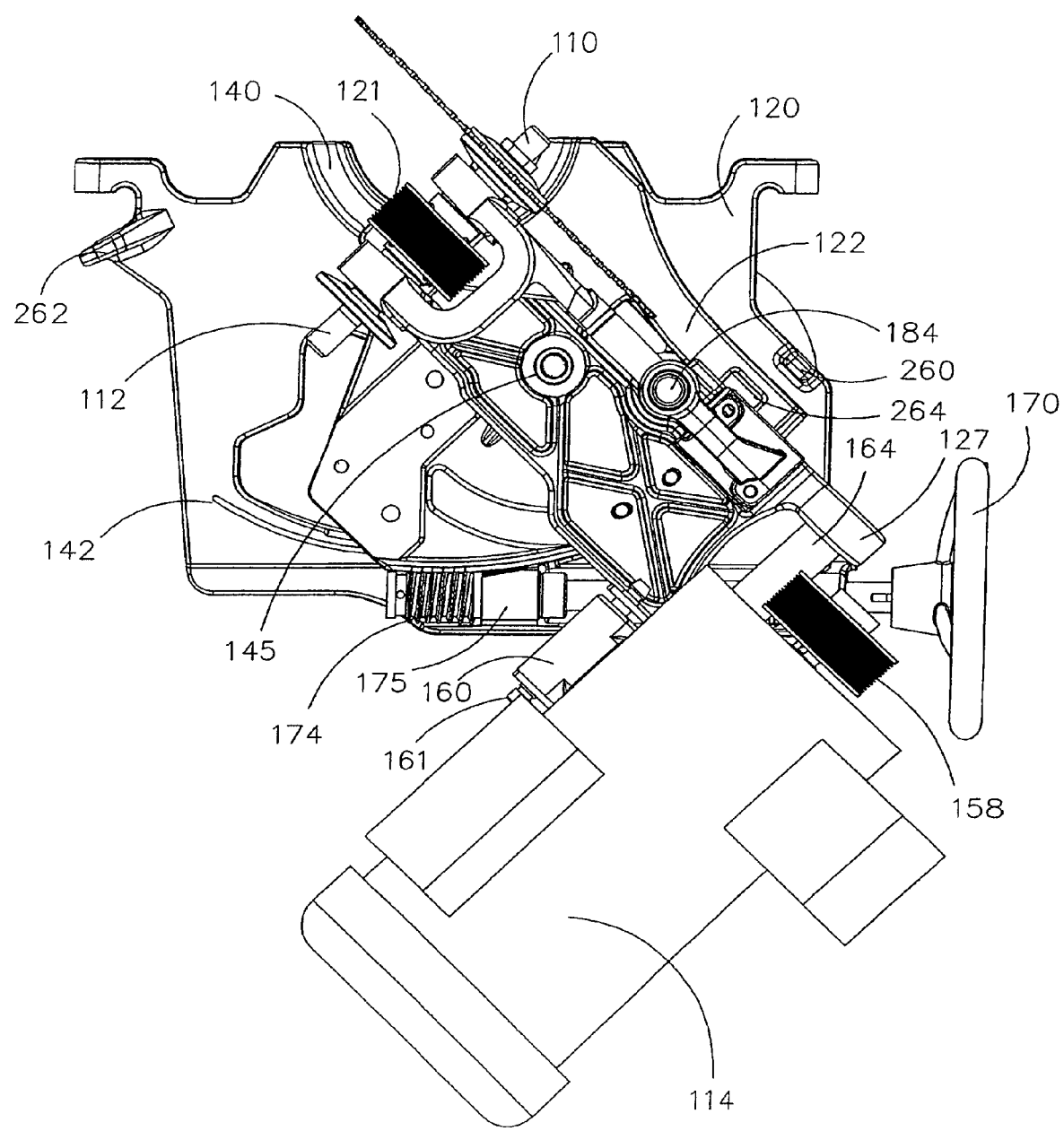
FIG. 7A is a back-side view of the beveling assembly in the forty five degree right tilt position in accordance with the exemplary embodiments of the present invention.
Figure 7B:
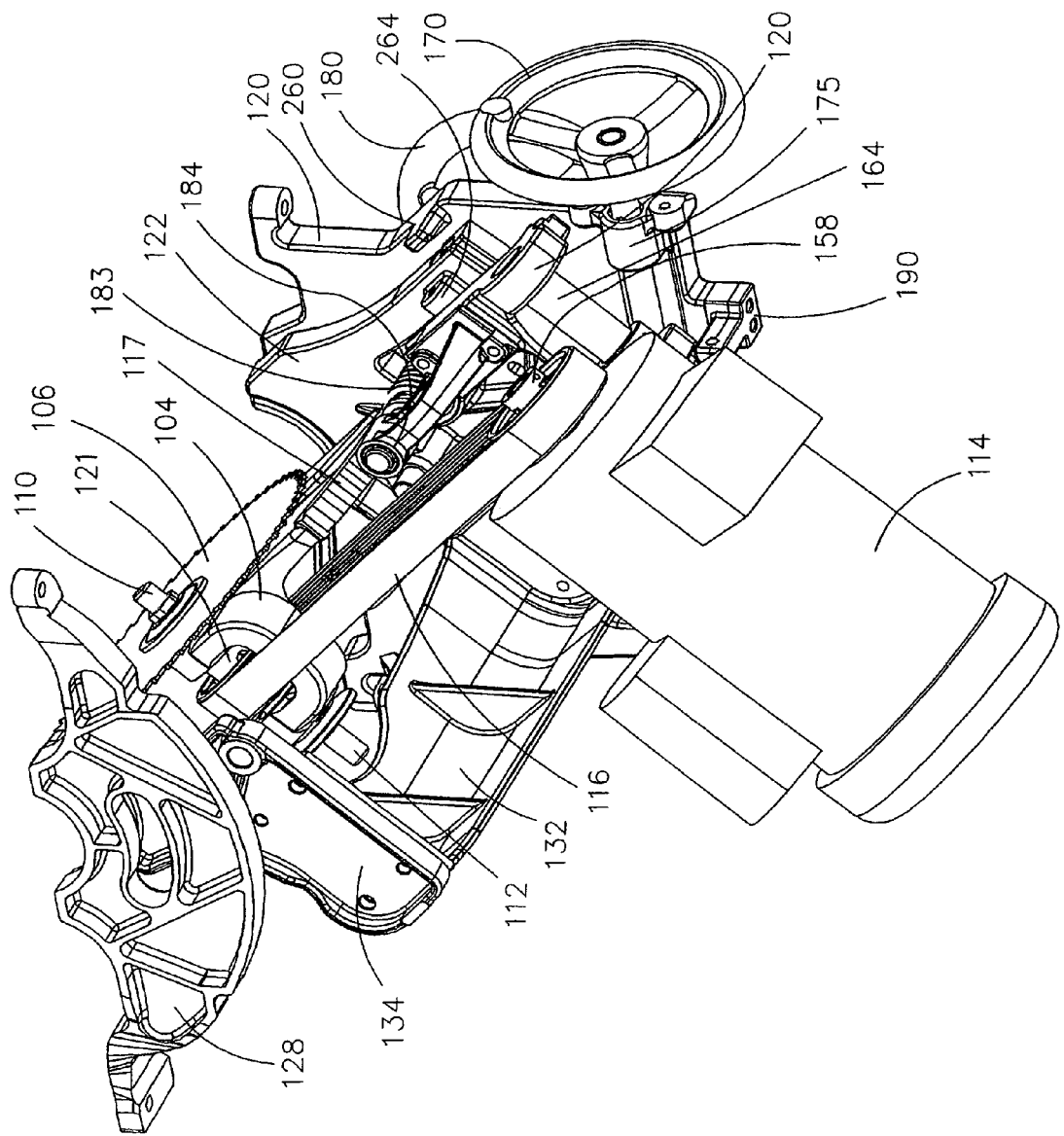
FIG. 7B is a back-side isometric view of the beveling assembly in the forty five degree right tilt position in accordance with the exemplary embodiments of the present invention.
Figure 7C:
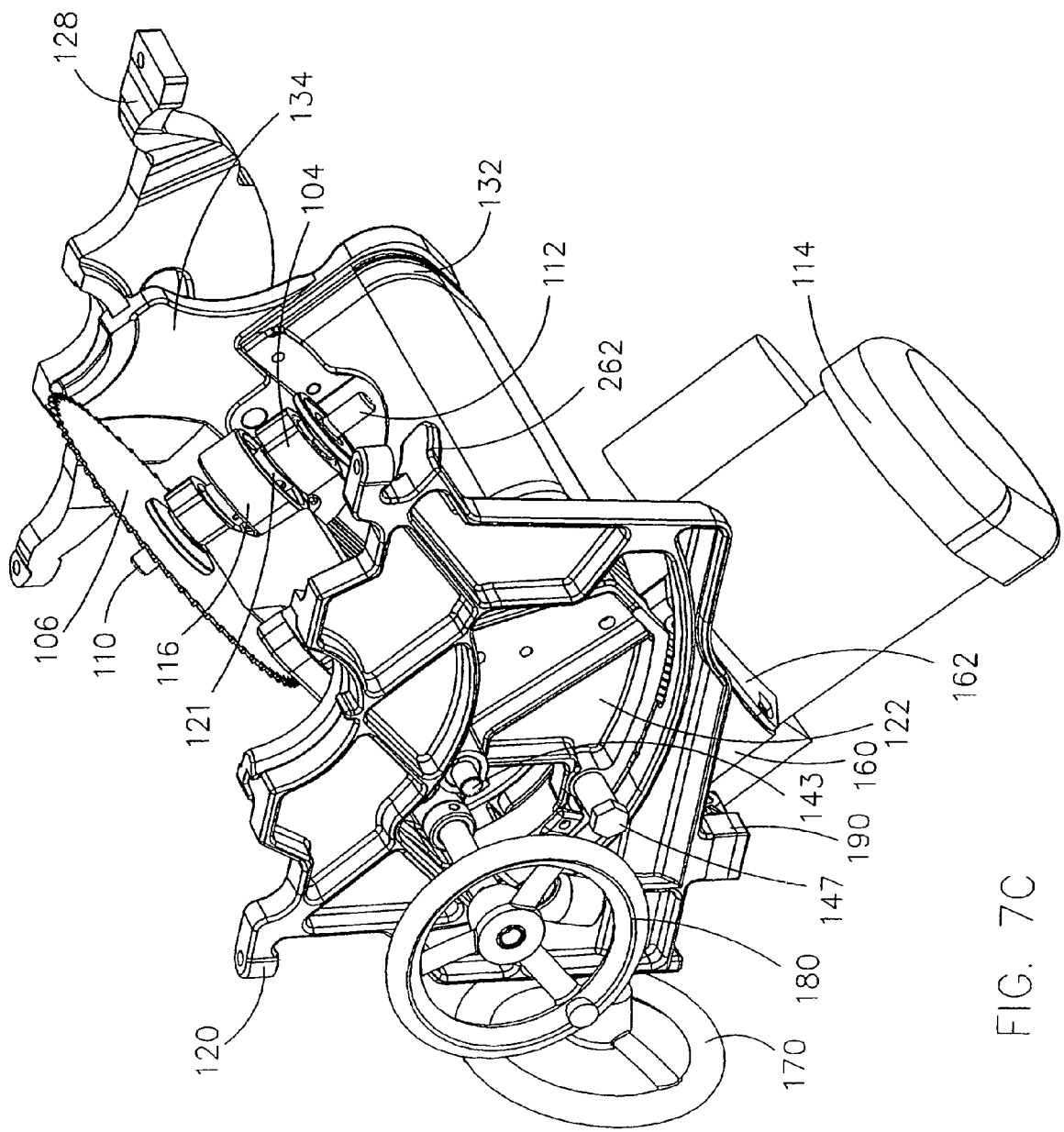
FIG. 7C is a front-side isometric view of the beveling assembly in the forty five degree right tilt position in accordance with the exemplary embodiments of the present invention.

Referring to FIG. 5B, the dual sided arbor assembly 102 is coupled to a motor 114 via a belt drive 116, which operationally engages around the arbor pulley 121 and a motor pulley 158, providing motive force for turning or spinning the saw blade 106. As shown in FIG. 11A, the arbor pulley 121 is disposed between the first and second height brackets of the arbor bracket 104. The motor 114 provides motive force for rotating the saw blade 106. In the present embodiment, an induction motor is utilized. In further embodiments other types of motors may be utilized such as universal motors and the like. The motor's weight may be used to maintain the desired tension in the drive belt 116. Referring to FIGS. 5B and 5C, in the present embodiment, the motor 114 is attached to a mounting flange 160 by a pin 164. The pin 164 engages through a motor mounting member 162 which receives the mounting flange 160. It is contemplated that various other mounting assemblies, as contemplated by those of ordinary skill in the art, may be employed. For instance, the mounting flange 160 may couple directly with the motor 114 without the use of the motor mounting member 162. Further, the motor 114 may include an integrated flange assembly for mounting to the dual bevel table saw 100.

Figure 8:
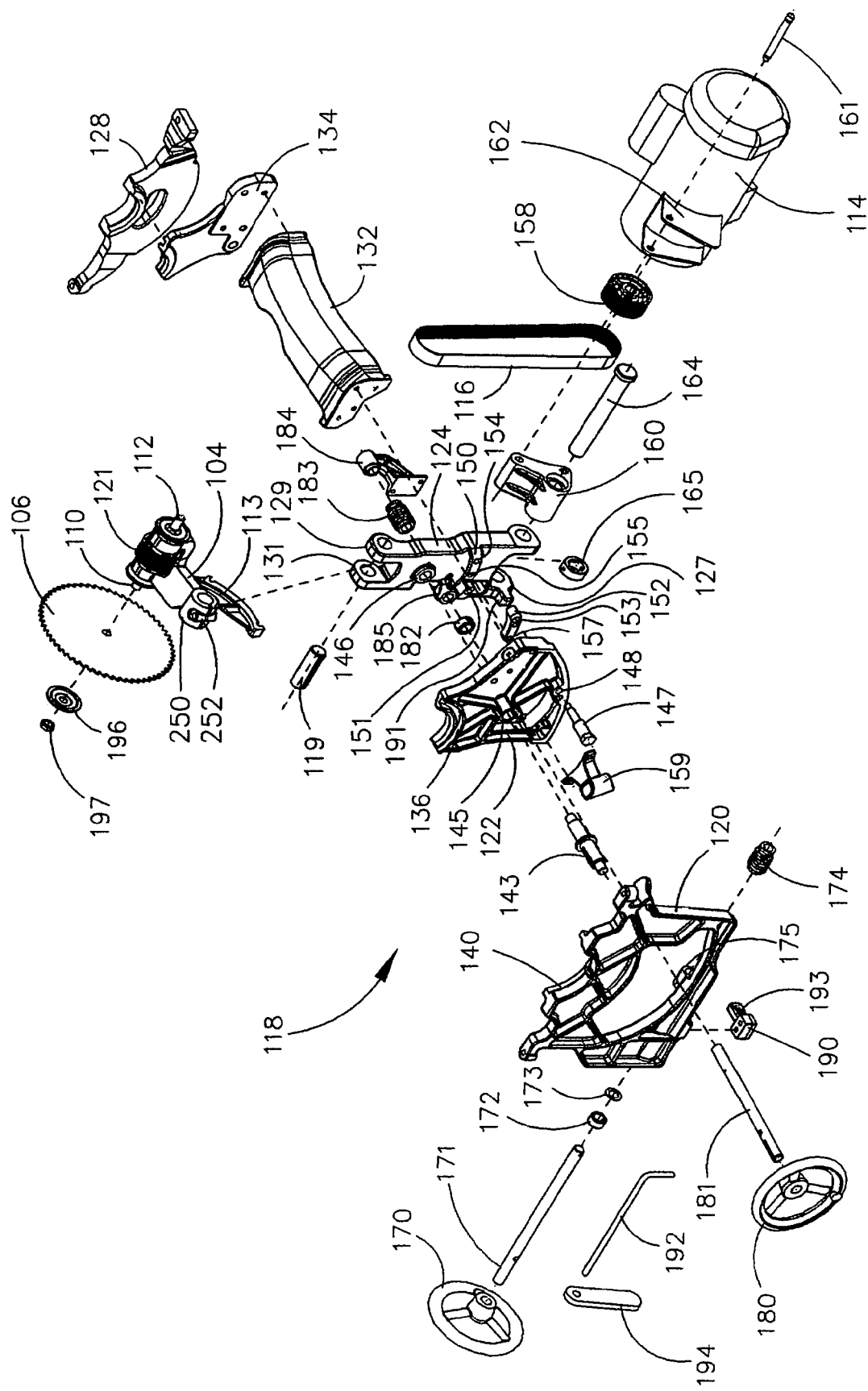
FIG. 8 is an exploded view of the beveling assembly.

Referring to FIGS. 5B, 5C, and 8, a mounting pin 160 adjustably couples the mounting flange 160 with a beveling member 124. The adjustable coupling enables the mounting pin 160 to assist in maintaining the optimum distance between the arbor pulley 121 and the motor pulley 158. In the present embodiment, the mounting flange pin 160 operationally engages through apertures included in a first arm 125 and a second arm 127 of the beveling member 124. Additionally, a mounting pin spacer 165 is engaged by the mounting pin 160 between the first arm 125 and the second arm 127. A mounting pin spacer may include a set screw for securing the spacer 165 to the mounting pin 160. The pin 164 and the mounting flange pin 160 allow the motor 114 to pivot so that the motor's weight is carried between the mounting pin 164 and a drive belt 116. It is contemplated that a tensioning member may be operationally engaged to couple the mounting flange 160 with the bevel member 124. For example, a torsion spring, tension rod, and the like, may be used to assist in maintaining the optimum tension on the drive belt between the arbor pulley 121 and the motor pulley 158. It is understood that other similar tensioning devices, such a compression lock system and the like may be utilized to provide the substantially similar functional capability.

The motor mounting member 162 may comprise various other features which may assist in the pivotal mounting of the motor 114 with the bevel member 124. For instance, the mounting member 162 may include a secondary fastening assembly where a screw or other similar fastening device may be fastened through a fastening point to securely position the motor 114 against the mounting flange 160 once the tension is set. Hence, in order to replace the drive belt 116, the user first unfastens the screw and rotates the motor 114 counter-clockwise, i.e., toward the dual sided arbor assembly 102. This removes all tension from the drive belt 116 so that the belt may be easily removed. After placing a new drive belt around the arbor pulley 121, the motor 114 is rotated clockwise until the motor pulley 158 couples with the drive belt 116. Then, the user can apply the desired tension to the drive belt 116 by pushing the motor 114 against the drive belt 116. When the desired tension is reached, the user simply fastens the screw into the mounting flange 160 to the desired extension.

Figure 10:
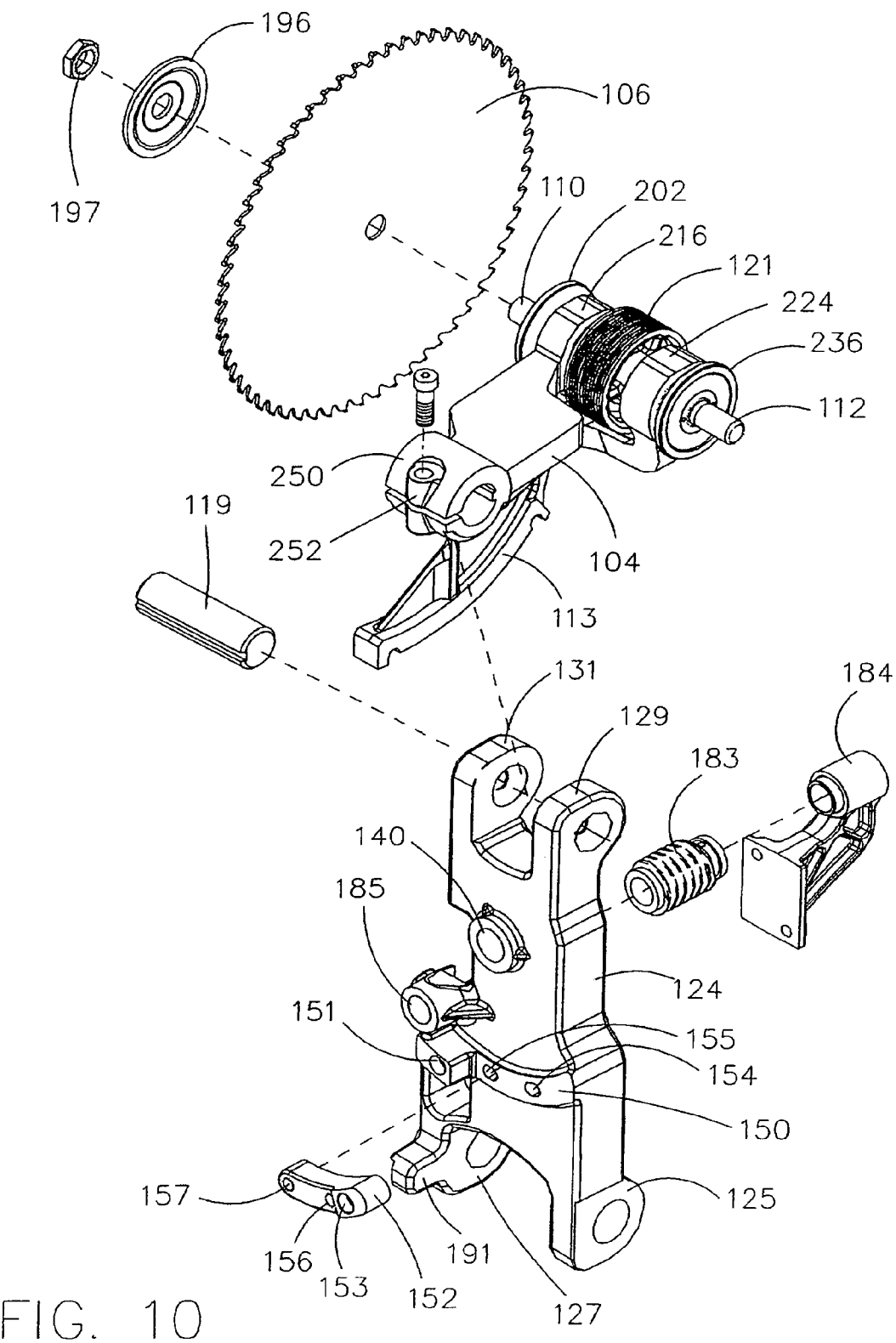
FIG. 10 is an exploded view of a dual sided arbor assembly.

Referring to FIGS. 10 and 11A, in a preferred embodiment, the arbor bracket 104 includes a gear segment 113 for varying the height of the arbor with respect to a support surface 108. The operational engagement of a gear segment 113 will be discussed below with respect to a saw blade height adjustment assembly.

The arbor bracket 104 may additionally include a mounting bracket 250 configured to be secured to an arbor pin 119 such as by clamping the mounting bracket substantially about the pin via a bolt or the like for tightening the mounting bracket. The mounting bracket 250 may be inserted between a third arm 129 and a fourth arm 131 of the bevel member 124. The mounting bracket 250 may be aligned within the aperture between the third and fourth arms. Upon alignment, an arbor pin 119 may be utilized as a pivot for adjusting the blade height. Preferably, a key system is utilized for securing the mounting to the pin such that the pin and the arbor bracket pivot about the apertures in the beveling member 124. The adjustable coupling of the arbor assembly 102 with the bevel member 124 further enables the height adjustment assembly which will be discussed below.

The dual sided arbor assembly 102 couples the saw blade 106 to the dual bevel table saw 100. In operation, to equip the dual bevel table saw 100 for left tilt operation, the user couples the saw blade 106 to the second end 112 of the arbor shaft 200. Accordingly, to equip the dual bevel table saw 100 for right tilt operation, the user couples the saw blade 106 to the first end 110 of the arbor shaft 200. Further description of the left and right tilt operations performed by the present invention is provided below. The dual sided arbor assembly 102 may be color coded to assist the user. For instance, the first end 110 of the arbor shaft 200 may be blue while the second end 112 of the arbor shaft 200 may be green. Hence, users may associate a color with a direction of beveled tilt. The saw blade 106 may couple to the first end 110 or the second end 112 of the arbor shaft 200 by tightening the threaded nut securing the outer removable flange 196 and saw blade 106. It is contemplated that the dual sided arbor assembly 102 may be designed to facilitate the use of a calibrated fence as described below.

Referring to FIGS. 8 and 9, the dual sided arbor assembly 102 is adjustably mounted to a bevel assembly 118. The bevel assembly 118 comprises a first or front mounting bracket 120, a first or front trunnion 122, a second or back mounting bracket, a second or back trunnion, and a beveling member 124, which bevels or tilts the saw blade 106. The beveling of the saw blade is further enabled by a bevel adjustment assembly, a selective rotational adjustment assembly, and a stop assembly, which are described below. In the exemplary embodiment shown, the first mounting bracket 120 includes a curvilinear interconnect such as a lip or rib for supporting a corresponding mechanical interconnect on a trunnion such as a groove. Alternatively other interconnects may be utilized as well. Further, the second trunnion and mounting bracket may be connected utilizing a similar configuration. A brace member 132 may extend between the first and the second trunnions for maintaining alignment.

The bevel assembly 118 allows the operator to select the bevel angle of the saw blade 106 by adjusting the assembly including the first and second trunnions and the bevel member to which the arbor assembly is mounted with respect to the table 108. The bevel assembly 118 includes an angular adjustment assembly. In the preferred embodiment, the angular adjustment assembly includes a worm drive assembly. The angular adjustment assembly may include a hand wheel 170 coupled with a shaft 171 having a bevel worm gear 174. Additionally, a spacer 172, a washer 173 may be implemented in the angular adjustment assembly. The shaft 171 extends through supports on the first mounting bracket for supporting the shaft 171 and bevel worm gear 174. In operation, the worm gear 174 engages with a gear segment 123 included on the first trunnion 122. Thus, as the hand wheel 170 is rotated the worm gear 174 pushes or pulls the gear segment 123 to the right or left, in relation to the first mounting bracket 120. It is further contemplated that other mechanisms such as a planetary gear system, or the like, may be utilized to rotate the first trunnion 122.

With continued reference to FIGS. 8 and 9, the trunnion 122 is adjustably coupled with the first mounting bracket 120. In a preferred embodiment, this adjustable coupling is further enabled by the trunnion 122 including a semi-circular groove 136. The semi-circular groove 136 engages with a semi-circular rib 140 included on the first mounting bracket 120. It is contemplated that the groove may be formed in the first mounting bracket while ribs are formed in the first trunnion 122. Preferably, the semi-circular rib 140 slides within the semi-circular groove 136 thereby allowing the first trunnion 122 to rotate through an arc with respect to the first mounting bracket 120. Similar rib and groove assemblies may be included on the second mounting bracket 128 and the second trunnion 134 which adjustably couple together in a manner similar to the first mounting bracket and the first trunnion. It is understood that alternative systems for adjustably coupling the first trunnion 122 with the first mounting bracket and the second mounting bracket 128 with second trunnion 134 may be employed without departing from the scope and spirit of the present invention.

Figure 9A:
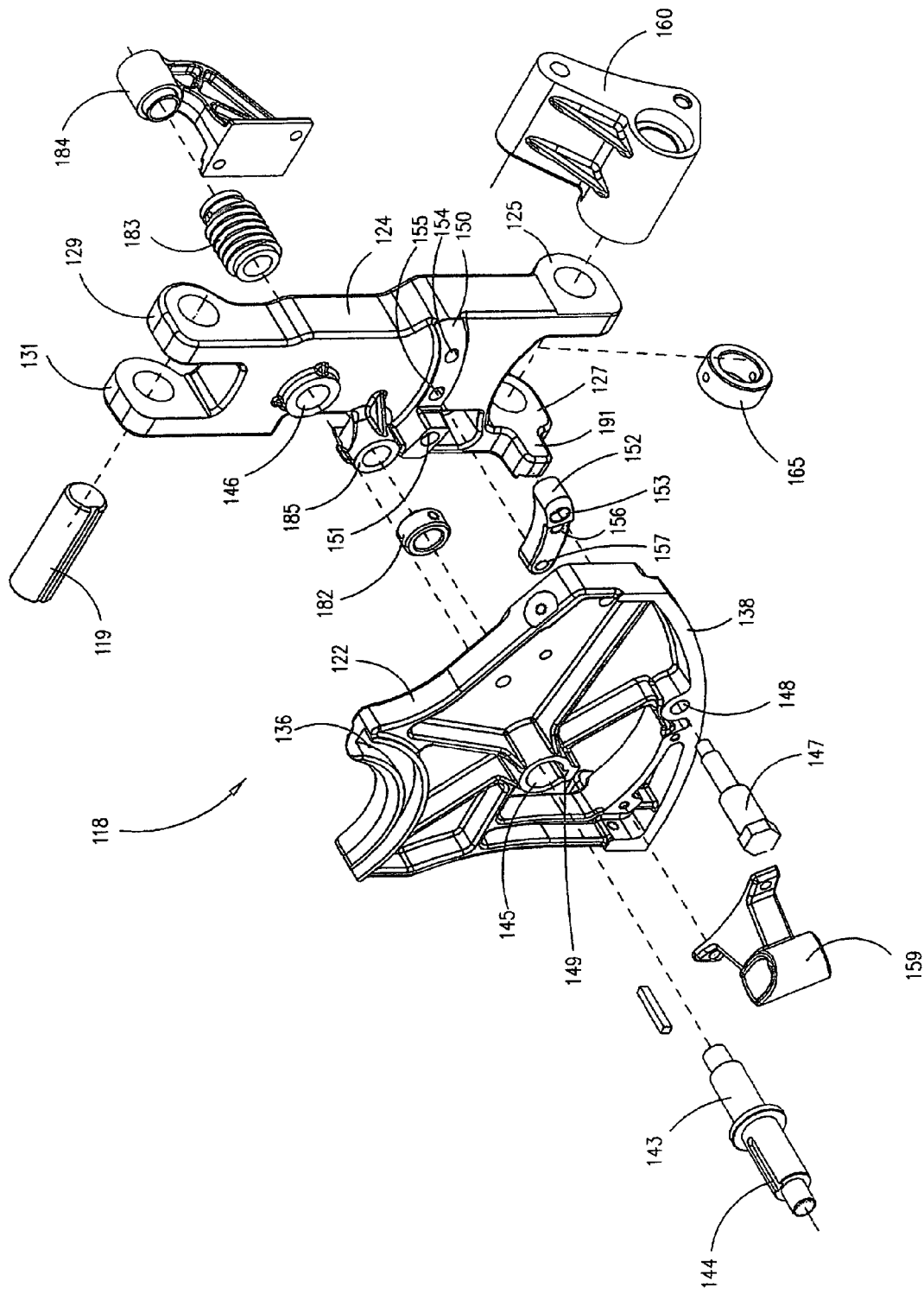

The first trunnion 122 may also be coupled with a laser mounting assembly 159, as shown in FIGS. 8 and 9A. The laser mounting assembly 159 provides a laser source which may be various assemblies, such as a LED assembly, and the like. The laser mounting assembly 159 may be secured to the first trunnion 122 using a fastener, such as a screw, clip, pin, and the like. Other fastening devices include snap lock assemblies, compression lock assemblies, and the like may be employed to secure the laser mounting assembly 159. The laser source is for emitting a visible beam of light which may be used for indicating the beveled angle of the saw blade when configured to contact a visual indicator such as an angle scale (indicating a range of angle orientations). Such a bevel indication assembly is described below in reference to FIG. 12. Power for the laser source may be provided through a connection with the power source of the dual bevel table saw 100 or through alternate sources, such as a battery and the like.

Referring to FIG. 9A, the bevel member 124, which supports the saw blade through an adjustable coupling with the arbor bracket 104, is coupled with the first trunnion 122 by a selective rotational adjustment assembly, which allows the bevel member 124 to pivot with respect to the first trunnion 122 through selective engagement with the first trunnion 122. The selective rotational adjustment assembly in a preferred embodiment includes a pivot pin 143 for coupling the first trunnion 122 with the bevel member 124 by engaging through the first trunnion at a first fastening point 145 and with the bevel member at a second fastening point. With regard to FIG. 9A, the pivot pin 143 includes a pivot pin key assembly 144. In operation the pivot pin key assembly 144 fixes the rotation of the pivot pin with the first trunnion 122. It is contemplated that the pivot pin key assembly 144 may be a tab for accomplishing fixing the rotation of the pivot pin 143 with the trunnion 122. Alternate configurations, such as a compression lock assembly and the like may be employed without departing from the scope and spirit of the present invention.

Figure 9B:
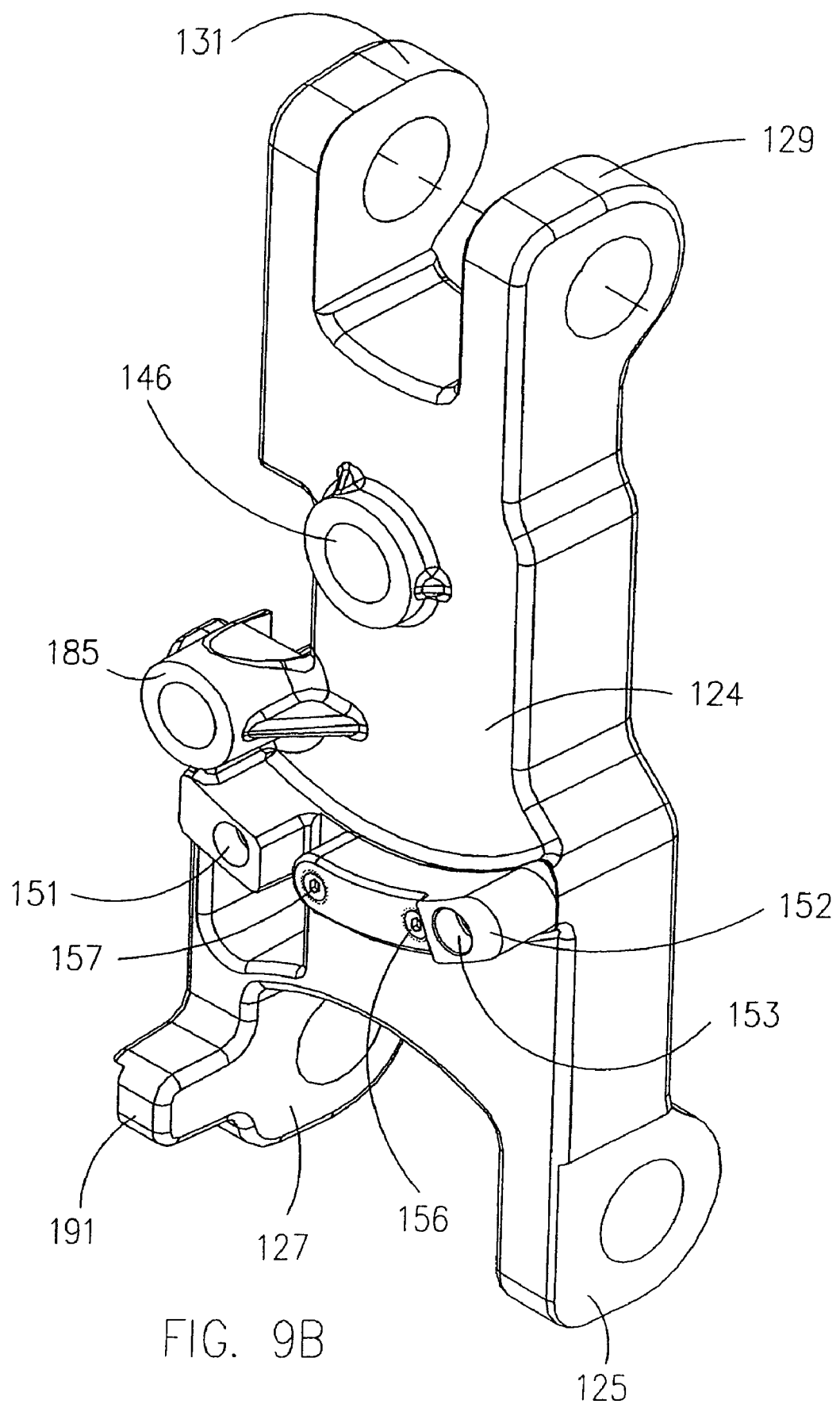

Referring to FIGS. 9A, 9B, and 10, in order to fix the beveling of the first trunnion 122 and the bevel member 124, relative to one another, a selective rotational adjustment assembly may include a removable pin 147 which is engaged with the first trunnion 122 and may selectively engage with the bevel member 124. In additional embodiments, the pin may be threaded or biased for quick release. The removable pin 147 engages with the first trunnion 122 through an aperture or fastening point 148. In the current embodiment, the removable pin 147 extends through the fastening point 148 to engage with the beveling member 124 by threading into a threaded recess, aperture or the like located at a second position 153 included on a stop 127 secured to the bevel member 124. Alternatively, the pin may directly connect to the bevel member (such as when the pin is connected in a threaded recess, aperture or the like located at a first position 151). Those of skill in the art will appreciate that various other positioning and securing systems may be implemented as well for securing the first trunnion and bevel member with respect to each other; it is the intention of this disclosure to encompass and include such variation. Preferably, the selective rotational adjustment assembly permits the removable pin 147 to engage in a first position 151 and a second position 153. The stop assembly comprises a stop for mounting on the bevel member 124. In preferred embodiments, a groove 150 and stop are shaped generally as an arc. This arc may be formed at various radii in alternate embodiments, in a preferred embodiment, the arc is centered such that the center point of the arc is located at the second fastening point 146 included in bevel member 124. The stop may be secured to the bevel member via pins, screws, bolts, clips, and the like, thereby securing the stop 152 within the groove 150. For example, the stop may be secured via screws extending through apertures in the stop and subsequently threaded into recesses included in the bevel member 124. The exact position of the apertures or fastening points may be varied to achieve various angular orientations and blade extensions.

For example, the removable pin 147 may be threaded into the first and second positions, 151 and 153 respectively. In a preferred embodiment, for right tilt operation, the removable pin 147 is engaged with the second aperture 153. For left tilt operation, the removable pin 147 is engaged with the first aperture 151. It is understood that the removable pin 147, when removed from engagement with the bevel member 124, allows the first and second beveling members to rotate independently of one another.

Referring to FIG.9A, in the preferred embodiment, the second fastening point 146 is the center point for measurement, the first threaded aperture 151 and the second threaded aperture 153 are located at forty five degrees apart from each other. In further embodiments the angular orientation may be varied as contemplated by one of ordinary skill in the art. However, it is contemplated that the first threaded aperture 151 and second threaded aperture 153 may be set apart from one another at various angles. For example, the present invention may provide user selectable alternative groove and stop configurations which may enable the removable pin 147 to engage with threaded apertures, disposed on the bevel member 124, which are set apart by angles ranging from ten degrees to eighty degrees. Further, the present invention may enable three or more positions which may be established by the removable pin 147 engaging with one of three or more threaded bores. It is further contemplated that the threaded bores and/or removable pin 147 may be alternatively configured as a quick connect system such as a compression lock system, a biased pin, or the like for rapidly securing the first trunnion 122 to the bevel member 124. Other assemblies for establishing the position of the bevel members relative to one another may be employed as contemplated by those of ordinary skill in the art.

In exemplary operation, to bevel the saw blade to the left or the right, an operator turns the hand wheel 170 to rotate the first trunnion 122 until the saw blade 106 is beveled to the desired angle. Preferably, the bevel assembly 118 is capable of beveling or tilting the saw blade 106 at angles between zero degrees (vertical) and forty five degrees both to the left and the right of vertical. Moreover, in preferred embodiments of the invention, the bevel assembly 118 may allow the user to select any angle within the range of movement of the bevel assembly 118 and thereafter hold the saw blade at the angle selected.

The beveling motion of the saw blade 106 of the dual bevel table saw 100 is illustrated in FIGS. 1 through 7 and FIGS. 9B through 9D. FIGS. 9B through 9D illustrate the adjustment capabilities enabled by the removable pin 147 with respect to the first trunnion 122 and bevel member 124. Disengagement of the removable pin 147 results in the bevel member 124 rotating independently of the first trunnion 122.

Left tilt operation is illustrated in FIGS. 2, and 4A through 5C. Left tilt is defined as the orientation of the blade 106 with respect to the first mounting bracket 120. The zero degree position (vertical position), shown in FIG. 2, for left tilt operation may be established with the removable pin 147 engaged into the first threaded aperture 151 of the bevel member 124 and the first trunnion 122 in its left most position relative to the first mounting bracket 120. In this orientation, the various saw components are configured to allow a full cut substantially at a forty-five degree bevel. For left tilt operation, the saw blade 106 is coupled with the second end 112 of the arbor shaft 200. As may be seen in FIG. 4B, tab 191 included on the second arm 127 of the bevel member 124 is engaged against the rod 192 of the secondary stop 190, when the bevel member 124 is in the zero degree position for left tilt operation. Thus, if the removable pin 147 is disengaged from the bevel member 124, the bevel member 124 may maintain a vertical position with respect to the table 108 and or the first mounting bracket 120. Further, the zero degree position (wherein the saw blade 106 extends ninety degrees from the support surface 108) for left tilt operation aligns the second end 112 of the dual sided arbor assembly 102 in a centered position with respect to the first mounting bracket 120. This position allows the saw blade 106 to extend through a throat plate assembly 103, maintaining the proper orientation of the saw blade 106 with respect to the table 108. For example, the dual bevel table saw of the present invention may allow a user to utilize a fence with a dedicated measuring system such that the saw blade is disposed in a fixed lateral position (with respect to the first mounting bracket 120) when on either end of the arbor for either left or right beveling. The throat plate assembly 103 may be removed making the second end 112 accessible so that the saw blade 106 may be secured in place using an outer removable flange 196 and nut 197 or removed from the second end 112. After the saw blade 106 is attached to the second end 112 the throat plate assembly 103 may be replaced.

In an alternative example, let us assume that the dual bevel table saw 100 is set up for right tilt operation. Thus, to configure the saw for left beveling, the saw blade 106 is removed from the first end 110 of the arbor shaft 200. Preferably, the bevel assembly 118 is set to the zero degree position thereby minimizing or eliminating pressure on the pin 147. The throat plate assembly 103 may be removed to allow access to the outer flange 196 and nut 197 coupling the saw blade 106 to the first end 110. After removing the flange 196 and nut 197 the saw blade 106 may be removed from the first end 110. Next, the removable pin 147 may be disengaged from its coupling with the bevel member 124. Thus, the bevel member 124 is enabled to rotate independently of the first trunnion 122. The amount of rotation may be limited by engagement of the bevel member against an approximation stop 264 disposed on the first trunnion 122.

In order to establish the zero degree position for left tilt operation, the first trunnion 122 is adjusted into its left most position with respect to the first mounting bracket 120 and the bevel member 124. This is accomplished through rotation of the hand wheel 170 which operationally engages the bevel worm gear 174 with the gear section 123 included on the first trunnion 122. As the first trunnion 122 is being rotated to its left most position the bevel member is being adjusted with respect to its position relative to the first mounting bracket 120 and is independently rotating with respect to the first trunnion 122. The bevel member 124 may be inclined to rotate past its vertical position as the first trunnion 122 rotates to its left most position and the approximation stop 264 disengages from the bevel member 124. To assist in establishing the bevel member 124 in its vertical position (when establishing the bevel assembly 118 in the zero degree position for left tilt operation) the rotation of the bevel member 124 is halted by the engagement of the tab 191 with the rod 192 of the secondary stop 190, as described above. The left most position is achieved when the first trunnion 122 engages against a third stop 260. Once established in the left most position, the removable pin 147 is aligned with and may be engaged with the aperture 151 defining the first position. The engagement of the removable pin 147 with the first aperture 151 enables the operator to bevel or tilt the saw blade 106 to the left through rotation of the hand wheel 170.

A dual bevel table saw 100 configured for right tilt operation is shown in FIGS. 3 and 6A through 7C. The zero degree position (vertical position), shown in FIG. 3, for right tilt operation may established with the removable pin 147 engaged into the second aperture 153 included in stop 152 and the first trunnion 122 in its right most position relative to the first mounting bracket 120 and the bevel member 124. The right most position of the first trunnion 122 may be established when the first trunnion 122 is engaged against a fourth stop 262 disposed upon the first mounting bracket 120. In this orientation, the position of the motor 114 is such that contact may be avoided with other components included in the dual bevel table saw 100 and thus a full range of right tilt bevel adjustment is enabled. For right tilt operation, the saw blade 106 is coupled with the first end 110 of the arbor shaft 200. It is seen that the bevel member 124 may be engaged against the approximation stop 264 in the zero degree position for right tilt operation. Thus, were the removable pin 147 disengaged from the bevel member 124 which allows the bevel member 124 to rotate, independently of the first trunnion 122, the bevel member 124 may maintain a generally vertical position. Further, the zero degree position for right tilt operation aligns the first end 110 of the arbor assembly 102 in a centered position to extend the saw blade 106 through the throat or slot included in the throat plate. This position allows the saw blade 106 to extend through the throat plate assembly 103, maintaining the proper orientation of the saw blade 106 with respect to the first mounting bracket 120 and the table 108. During operation the throat plate assembly 103 may be removed making the first end 110 accessible so that the saw blade 106 may be secured in place using the removable outer flange 196 and nut 197 or removed from the first end 110. After the saw blade 106 is attached to the first end 110 the throat plate assembly 103 may be replaced.

In an alternate example, when right tilt operation is desired. The operator may first bevel the saw blade 106 to its vertical position (e.g., to approximately zero degree bevel angle) for left tilt operation. Subsequently, the operator may release the removable pin 147 from engagement with the first aperture 151 (for left beveling) of the bevel member 124 thereby allowing the bevel member 124 to rotate which may cause the tab 191 to engage against the rod 192, thus establishing the bevel member 124 and the dual sided arbor assembly 102 in a substantially vertical position. Once the saw blade 106 is in the vertical position the throat plate assembly 103 may be removed for gaining access to the nut 197 and flange 196 which secure the saw blade 106 to the arbor shaft 200. The nut 197 and washer 196 and saw blade 106 may be removed from the second end 112.

With the removable pin 147 disengaged from the bevel member 124, the bevel member 124 is held in its vertical position by engagement of the tab 191 against the rod 192. To move the first trunnion 122 to its right most position the operator may begin to rotate the hand wheel 170 which may cause the worm gear 174 to rotate against the gear segment 123 and begin to push the first trunnion 122 to the right. As the first trunnion 122 rotates to the right the approximation stop 264 engages against the bevel member 124. With the bevel member 124 engaged against the approximation stop 264 the removable pin 147 may be aligned to engage with the second aperture 153 included on the stop 152. The operator may engage the removable pin 147 with the second aperture 153 at this time or may choose to wait until the first trunnion 122 is established in its right most position thereby establishing the zero degree position for right tilt operation. Once engaged against the approximation stop 264 the bevel member 124, whether engaged by the removable pin 147 or not, is moved or translated to the right, with respect to the first mounting bracket 120, along with the first trunnion 122, while remaining in its vertical orientation relative to the first trunnion 122. The operator may rotate the hand wheel 170 through its full range of motion to the right, thereby establishing the first trunnion 122 in its right most position which is the zero degree (vertical) position for right tilt operation. In the right most position, the fourth stop 262 may be engaged by the first trunnion 122 which assists in establishing the zero degree position for right tilt operation. Once the first trunnion 122 has reached the zero degree position for right tilt operation, the removable pin 147, if not already engaged with the second aperture 153 of the stop 152, is aligned with and may be operationally engaged with the second aperture 153.

The saw blade 106 may be placed on the first end 110 of the arbor shaft 200 and the throat plate assembly 103 replaced in the table 108. To tilt the saw blade 106 to the right the operator may rotate the hand wheel 170 such that the first trunnion 122 moves to the left. The bevel member 124, securely coupled in position relative to the first trunnion 122 by engagement of the removable pin 147 with the second aperture 153, is correspondingly rotated/tilted with respect to the first trunnion 122 and thus the saw blade 106 is tilted/beveled to the right.

The various stops such as the second, third, fourth, and approximation stops may assist in properly aligning the first trunnion 122 and the bevel member 124 when adjusting the desired beveling direction. Further, without the stops the first trunnion 122 may be difficult to align with the first aperture 151 or the second aperture 153 when configuring for left or right tilt operation. It is contemplated that these stop assemblies employed with the present invention may vary in configuration without departing from the scope and spirit of the present invention. It is further contemplated that the number and location of stop assemblies employed with the present invention may vary.

It is understood that the saw blade 106, whether positioned on the first or second end 110 or 112 of the arbor shaft 200, extends up and through the throat plate assembly 103 of the table 108 in a centered position. In the preferred embodiments, the saw blade 106 establishes an intersection point for both beveling directions. Preferably, the intersection point is established on the right of the saw blade 106 (for a fence disposed on the right hand side) when on the first or second ends of the arbor shaft 200. It is contemplated that the intersection point may vary to accommodate different blade thicknesses and configurations of the bevel assembly 118.

It is further understood that the movement/translation capabilities of the first trunnion 122 and bevel member 124 relative to the first mounting bracket 120 allows for the re-positioning of the first and second ends of the arbor shaft 200 in proper alignment for engagement by the saw blade 106 through the throat plate assembly 103 of the table 108. In the preferred embodiment, the translation capability is enabled by the rib and track assembly adjustably coupling the first mounting bracket 120 with the first trunnion 122 and the second mounting bracket 128 with the second trunnion 134. Further, the translation capability is enabled by the rotational adjustment assembly which adjustably couples the first trunnion 122 with the bevel member 124 via removable pin 147. Alternative configurations for providing the translational movement of the first trunnion and the beveling members with respect to the first mounting bracket 120 may be employed as contemplated by those of ordinary skill in the art.

It will be appreciated that the present invention is not limited to the embodiment illustrated. For example, the dual bevel table saw 100 may employ drives for coupling the arbor assembly 102 and the motor 114 other than the belt drive 116 shown in FIGS. 2 through 7 (i.e., a transmission, chain, etc.) to provide motive force for turning the saw blade 106 without departing from the scope and spirit of the present invention. Similarly, the bevel assembly 118 may be configured differently, and may be automated, depending on design preferences and the application for which the bevel assembly 118 is intended.

Preferably, the dual bevel table saw 100 equipped with a throat plate assembly 103 that provides a slot or throat through which the saw blade 106 extends above the support surface or table 108, as shown in FIGS. 1 through 11. Moreover, the dual bevel table saw 100, of the present invention, when used with a standard 10 inch blade may be configured to provide full height cutting capacity, which may extend to approximately $3^{1/2}"$ (three and a half inches) in both right and left tilt bevel operation, such as when beveled at 45° (forty-five degrees). Those of skill in the art will appreciate that the saw of the present invention may be variously configured without departing from the scope and spirit of the present invention.

The throat plate may consist of an inner throat plate 105 and an outer throat plate 107. In order to remove the inner throat plate 105, the user may lift the inner throat plate 105 by placing a finger, screwdriver, or similar device in an aperture 109 or recess included on the inner throat plate 105. After the inner throat plate 105 is removed, the outer throat plate 107 may be removed by engaging with an aperture or recess 111 or by simply grabbing its inner edge. When the blade 106 has been changed, both the inner throat plate 105 and the outer throat plate 107 may be returned to their original positions so that a work piece may be moved across the tabletop efficiently. It is further contemplated that the throat plate assembly 103 may include a single plate which may be removed and replaced into the table 108. In the alternative, the throat plate assembly 103 may be enabled with three or more separate and distinct plates with which an operator of the dual bevel table saw 100 may engage. Furthermore, a leveling mechanism may be included in the table or the outer throat plate for leveling the outer throat plate or the inner throat plate as applicable.

The height adjustment assembly includes a worm drive which comprises a hand wheel 180 coupled with a shaft 181. The shaft 181 operationally engages through a height adjustment flange 185 disposed upon the bevel member 124. The shaft 181 extends through the height adjustment flange 185 and is coupled with a height worm gear 183. The shaft 181 further extends through the height worm gear to couple with a support member 184 for supporting the worm gear 183. The support member 184 may increase the stability of the height worm gear 183 engagement with a gear segment 113 included on a arbor bracket 104. Through rotation, in either direction, of the hand wheel 180, the worm gear 183 pushes or pulls the gear segment 113, either towards or away from the first mounting bracket 120. This has the effect of pushing and pulling the gear segment 113 which is coupled with the arbor bracket 104 (in the present example the gear segment is unitary with the arbor bracket 104) which in turn is coupled with the saw blade 106. Thus, when the gear segment 113 is pushed away from the first mounting bracket 120, it results in the arbor assembly 102 being raised and therefore the saw blade 106 is extended through the table 108. When the gear segment 113 is pulled towards the first mounting bracket 120, it results in the arbor assembly 102 lowering and therefore the saw blade 106 is lowered relative to the table 108. It is further contemplated that other mechanisms such as a planetary gear system, or the like, may be employed to achieve the height adjustment of the arbor assembly 102.

Changing saw blades may decreases efficiency and lead to user dissatisfaction. In an embodiment shown in FIG. 12, a dual bevel table saw 1200 may assist in ameliorating this problem by the addition of a companion saw assembly, which may be configured for commonly reoccurring cuts or the like. Preferably, the companion saw may be of limited functionality so as to minimize cost. In further embodiments, the companion saw may be configured substantially similar to the table saw 100 described in FIGS. 1 through 11.

The companion saw blade 1214 may be located proximal to a right side 1220 of the table 1202 of the dual bevel table saw assembly 1200, in the present embodiment. A second cabinet 1226 may house the various component for operating the companion saw. In the present embodiment, a hand wheel 1228 for enabling a height adjustment assembly disposed within the second cabinet 1226 may allow an operator to adjust the height of the companion saw blade 1214. In embodiments a companion saw may function as a dual bevel table saw, a right tilt saw, or a left tilt saw. It is further contemplated that the companion saw blade 1214 may not tilt in either direction, thus minimizing cost. It is contemplated that the companion saw assembly may be equipped with any useful blade as contemplated by ordinary users in the art without departing from the scope and spirit of the present invention.

Figure 12:
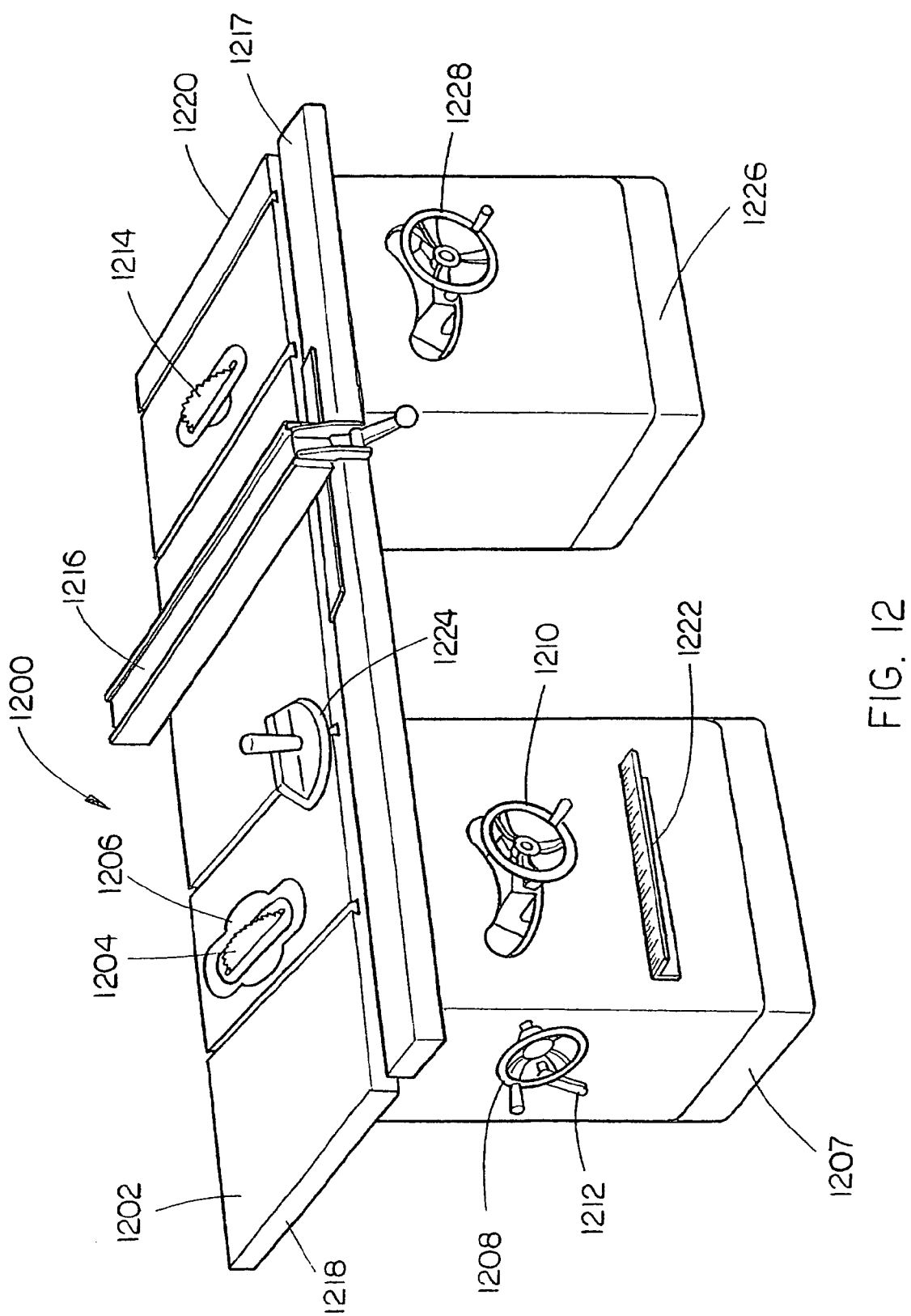
FIG. 12 is an isometric illustration of a second exemplary dual bevel table saw assembly including a companion saw assembly, laser indicator assembly, and a fence assembly.

The dual bevel table saw assembly 1200, of FIG. 12, is also equipped with a fence 1216 coupled with a rail 1217, the fence 1216 allows a straight cut to be made at a precise distance from the fence 1216. As mentioned above, the dual sided arbor assembly coupled with the saw blade 1204 may be designed to facilitate operation of the fence 1216. For instance, the dual sided arbor assembly may be designed to rotate the saw blade 1204 around a common pivot point while operating both in the right tilt and the left tilt configuration. With a common pivot point, the fence 1216 remains the same distance from the saw blade 1204 regardless of whether the first end or the second end of a dual arbor shaft is being used. This may provide users with the option to use the same fence 1216 to measure the distance to the saw blade 1204 regardless of dual bevel table saw 1200 configuration. In this manner, the dual sided arbor assembly of the present embodiment allows users to use common fence system for either left or right beveling. As shown in FIG. 12, the fence 1216 in the present embodiment is adjustably positionable along rail 1217. It is contemplated that two rails positioned on the front and back side of the table 1202 may couple with the fence 1216. A locking mechanism 1219 prevents the fence 1216 from moving once the fence 1216 is positioned at the desired distance from a saw blade.

Referring to FIG. 12, in the current embodiment, the dual bevel table saw assembly 1200 is equipped with a bevel indication assembly indicated by a visual marker 1222 mounted generally perpendicular to the first cabinet 1207. The bevel indication assembly includes a laser source for emitting a visible laser beam which may be observed upon the visual marker 1222. In exemplary embodiments, the laser source is coupled to a first trunnion, similar to that shown and described above in reference to FIGS. 1 through 11. In the present embodiment, the first trunnion rotates in a manner directly proportionate to the saw blade, which allows the laser source to track with the changes made in the bevel angle of the saw blade 1204 and to accurately indicate the angle of the saw blade 1204. The perpendicular positioning of the visual marker 1222 allows for easier viewing from multiple positions around the dual bevel table saw 1200. Such as for a user utilizing handle wheel 1208 to bevel the saw blade. In the current embodiment, the visual marker 1222 is positioned on the side of the table saw where the hand wheel 1210 for adjusting the blade height is located.

For a dual bevel table saw, the visual marker 1222 may be equipped with two scales positioned side by side for beveling in either direction. Each scale may read from zero degrees to forty five degrees. However, in the present embodiment one scale begins with zero degrees while the other begins with forty five degrees. The scale in the present embodiment must be configured as such because the position of the first trunnion for zero degrees during left tilt operation coincides with the forty five degree position when configured for right tilt operation. It is contemplated that, to make reading the scale more convenient, the scale may be color-coded which would allow users to associate a color with each direction of tilt. For instance, the scale for right tilt operation may be blue while the scale for left tilt operation may be green. While it is contemplated that the scale may read from zero degrees to forty five degrees in the present embodiment, the scale may display other ranges without departing from the scope and spirit of the present invention. It is also contemplated that the visual marker 1222 may be angularly configured -for mounting with the first cabinet 1207. For example, the visual marker 1222 may form an arc. The arc may increase the precision of the readings obtained from the visual marker.

It is further contemplated that the visual marker 1222 may be enabled in a triangular form with two separate scales disposed on two sides of the triangle. One side provides zero to forty-five degree readings for left tilt operation while the other accomplishes the same for right tilt operation. The triangular visual marker by be coupled with the first cabinet 1207 in a manner which allows a user to adjust the triangle to show the side with the appropriate scale for the direction of tilt of the saw blade. It is also contemplated that the bevel indication assembly, including the triangular visual marker, may automatically adjust the display side of the triangular visual marker to coincide with the direction of tilt intended for the saw blade.

The user may obtain a read-out from the bevel indication assembly by first rotating the saw blade. In order to rotate the saw blade, the user may simply rotate the hand-wheel 1210 that is coupled to the first trunnion. (The manner in which this rotation is achieved is similar to that described above for dual bevel table saw assembly 100.) The first trunnion is coupled to the saw blade and also the laser source. Therefore, when the first trunnion rotates, the laser source also rotates and emits the laser beam onto the visual marker 1222. Where the laser beam is emitted on the visual marker 1222 is dependent on the angular position of the first trunnion. Hence, the visual marker 1222 may be coupled to the dual bevel table saw on the exact position that allows the laser beam to highlight the angle that corresponds to the actual angle of the saw blade. The laser beam may be visible from a variety of positions about the table saw. Also, the visual marker 1222 may be placed perpendicular to the front wall of the table saw cabinet, to increase visibility. Increased visibility is especially useful when vibrations in the table saw cause the blade to rotate slightly out of position during use. When this happens, the laser indicator can notify the user even when a work piece is hanging slightly over the front edge or when the user is standing on a distant side of the table saw.

Alternatively, the bevel indication assembly may include a visual marker which is remotely located with respect to the table saw assembly. In this embodiment the visual marker may take the form of a rollout mat which includes indicators for identifying angular positions. The mat is positioned on the floor of the user's work area so that the laser source emits the laser beam on the indicator which identifies the angle that corresponds to the actual angle of the saw blade. By providing a means to position the visual marker on the floor, a much larger scale may be employed without restricting the user's workspace. The larger scale may increase the resolution quality making it easier to read from a variety of positions around the table saw and with larger workpieces hanging over the top of the table saw. In an alternative embodiment, the rollout mat may be enabled to self-illuminate when contacted by the laser beam. For example, the indicators may include self-illuminating assemblies so that when the laser beam contacts one of them, that indicator may light up to display to the operator the angle of the saw blade. Various self-illuminating assemblies may be employed as contemplated by those of ordinary skill in the art.

In general, the major portion of the table on the dual bevel table saw assembly is immobile. However, it is contemplated for the embodiments shown and described in FIGS. 1 through 12, that the left-most portion of the table 1202 may be enabled as a sliding tabletop. The sliding tabletop is positioned on a roller assembly. The roller assembly may consist of small ball bearings positioned inside a track coupled to the tabletop. The track is suitable for accepting a rail member coupled to the sliding table. In an alternative embodiment, it is further contemplated that the sliding tabletop may achieve its motion by being coupled with a variety of similar assemblies such as a shaft and thrust bearing mechanism or the like. The sliding tabletop allows a large workpiece such as a piece of large plywood to be moved across the tabletop with ease. This will assist the user in performing a large variety of cuts ranging from cross-cuts to rip-cuts.

Figure 13A:
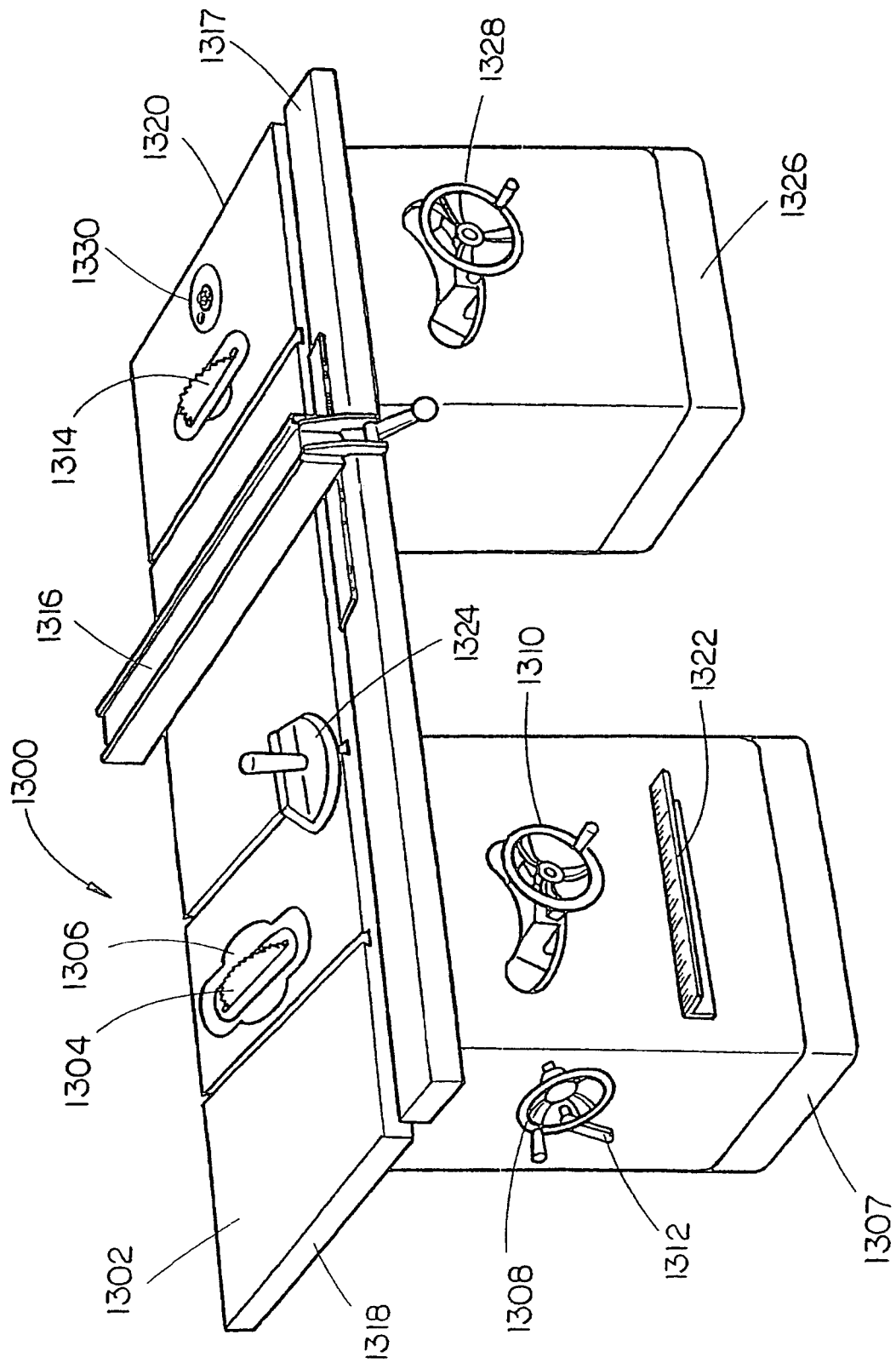
FIGS. 13A and 13B illustrate a third exemplary dual bevel table saw assembly including a companion saw assembly, router station, laser indicator assembly, and a fence assembly.

Referring now to FIG. 13, a dual bevel table saw 1300 is shown. The dual bevel table saw 1300 is similar in every respect to the dual bevel table saw assembly 1200 except that the dual bevel table saw 1300 further includes a router station 1330. The router station 1330 enables a router to be mounted to the table 1302. Thus, an operator is provided the additional functionality of the router. In the current embodiment, the router is disposed within the second cabinet 1326. It is contemplated that depth adjustment capabilities may be included within the router station to allow an operator to adjust the height of a router bit relative to the table 1302.

Figure 13B:
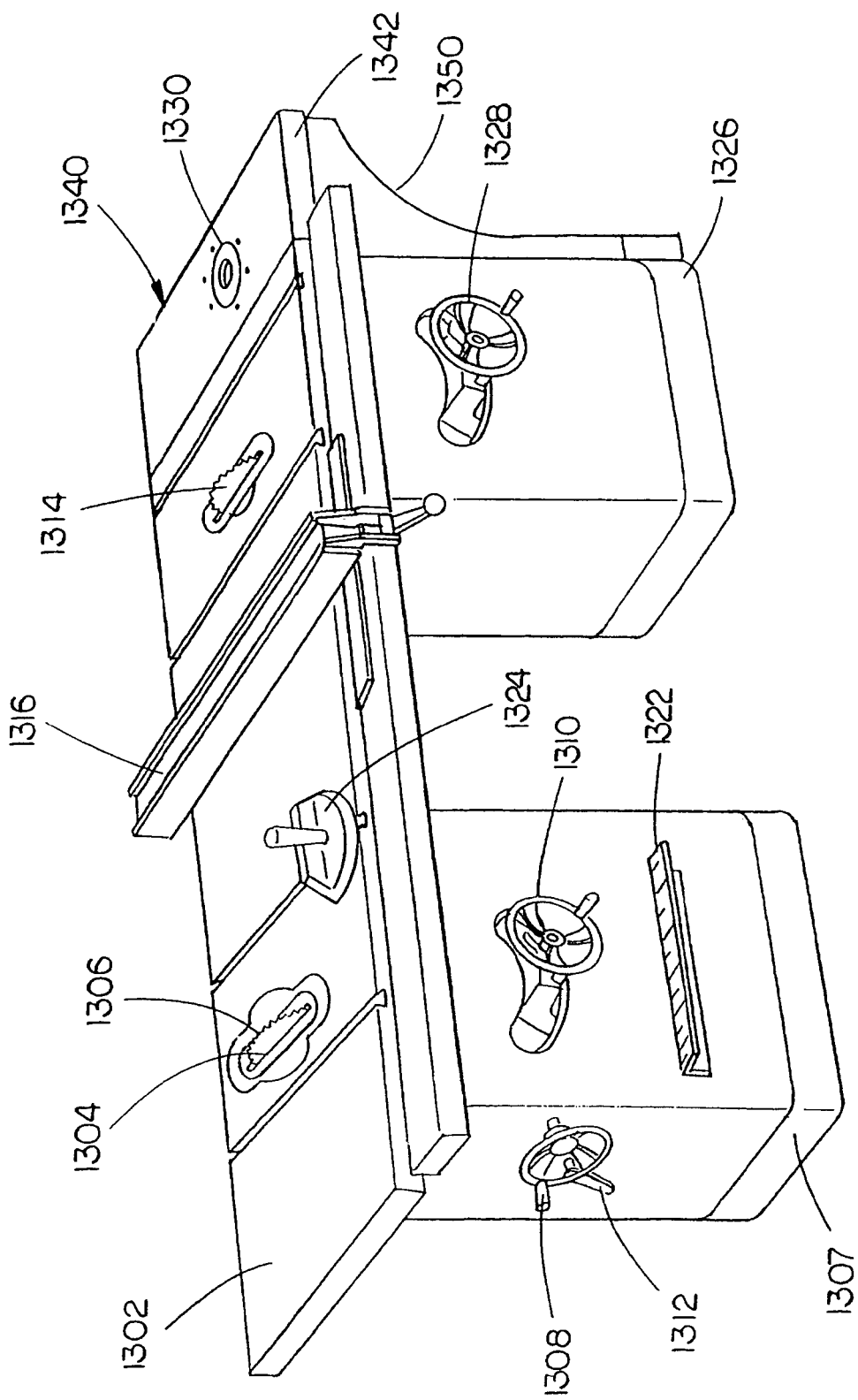
Figure 14:
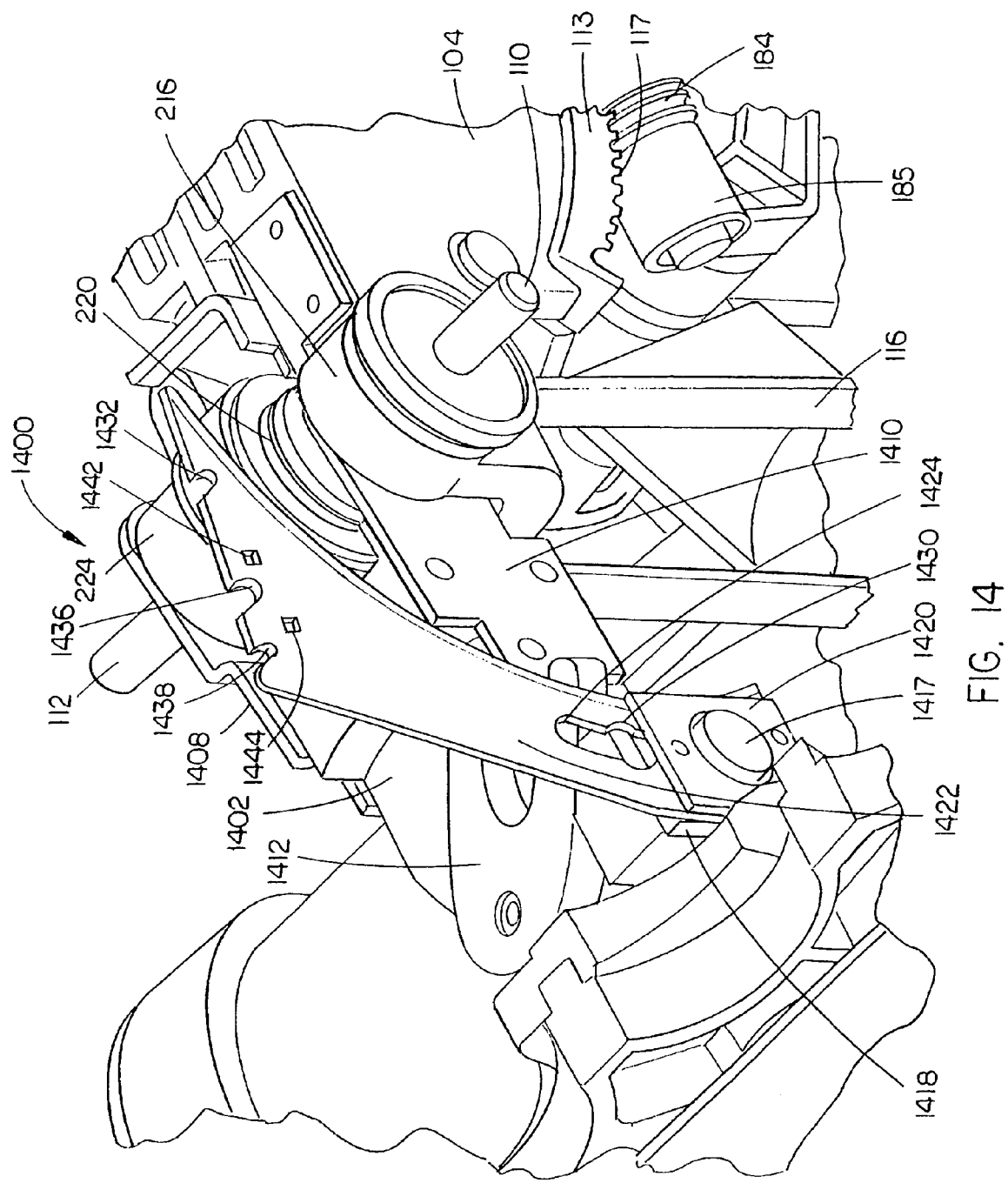
FIG. 14 is an isometric illustration of an exemplary riving knife assembly, engaged with the table saw assembly including the beveling assembly, in accordance with the present invention.

In an alternative embodiment, shown in FIG. 13B, the router station may be included within a router extension 1340. The router extension 1340 may comprise a router station 1330 disposed within a table 1342 which is coupled with a support assembly 1350. The router extension 1340 may be coupled with the table 108, 1202, and/or 1302, in a manner which allows it to be removed when no longer needed.

Figure 15:
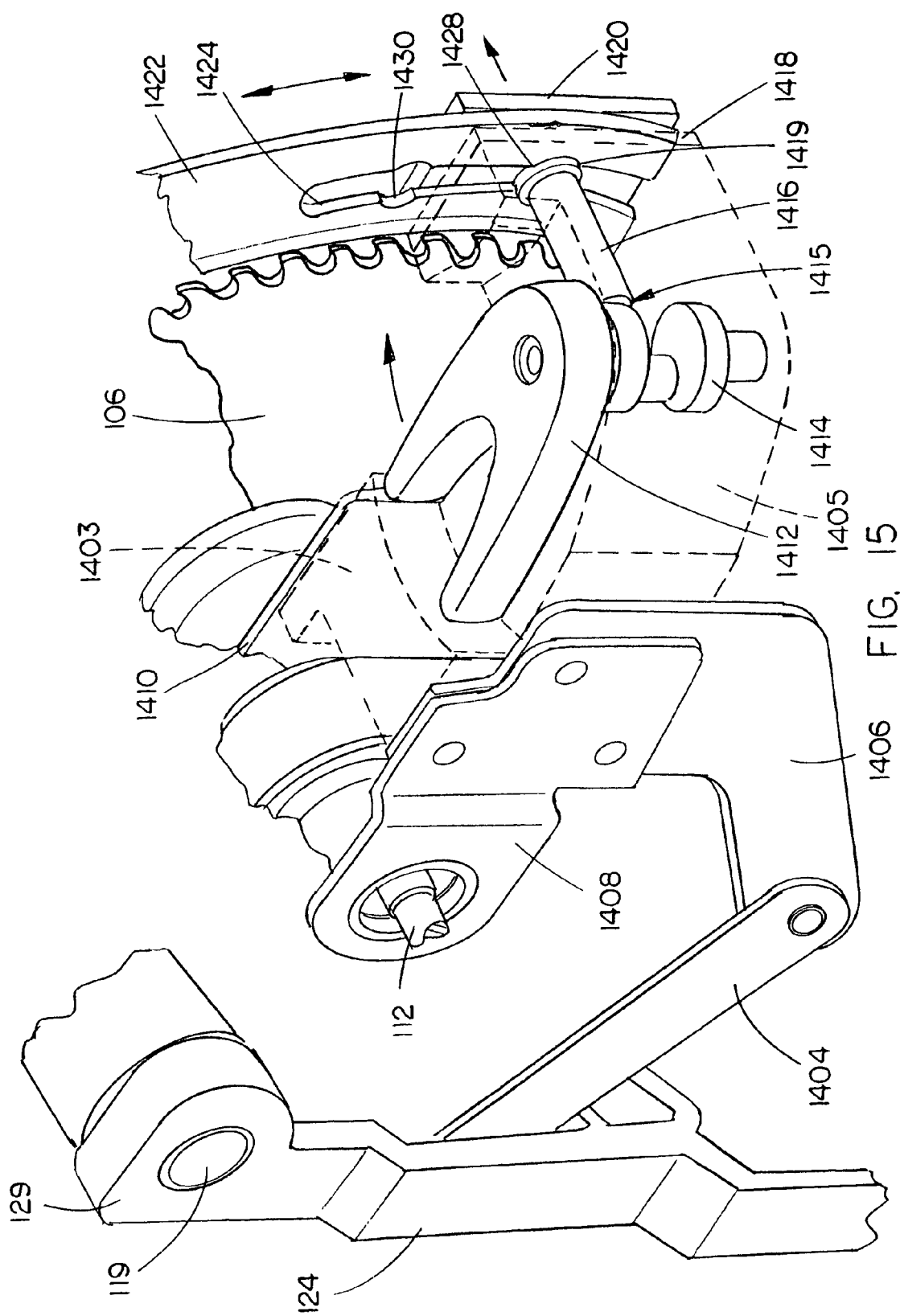
FIG. 15 is a perspective view illustrating the riving knife assembly of FIG. 14.
Figure 16:
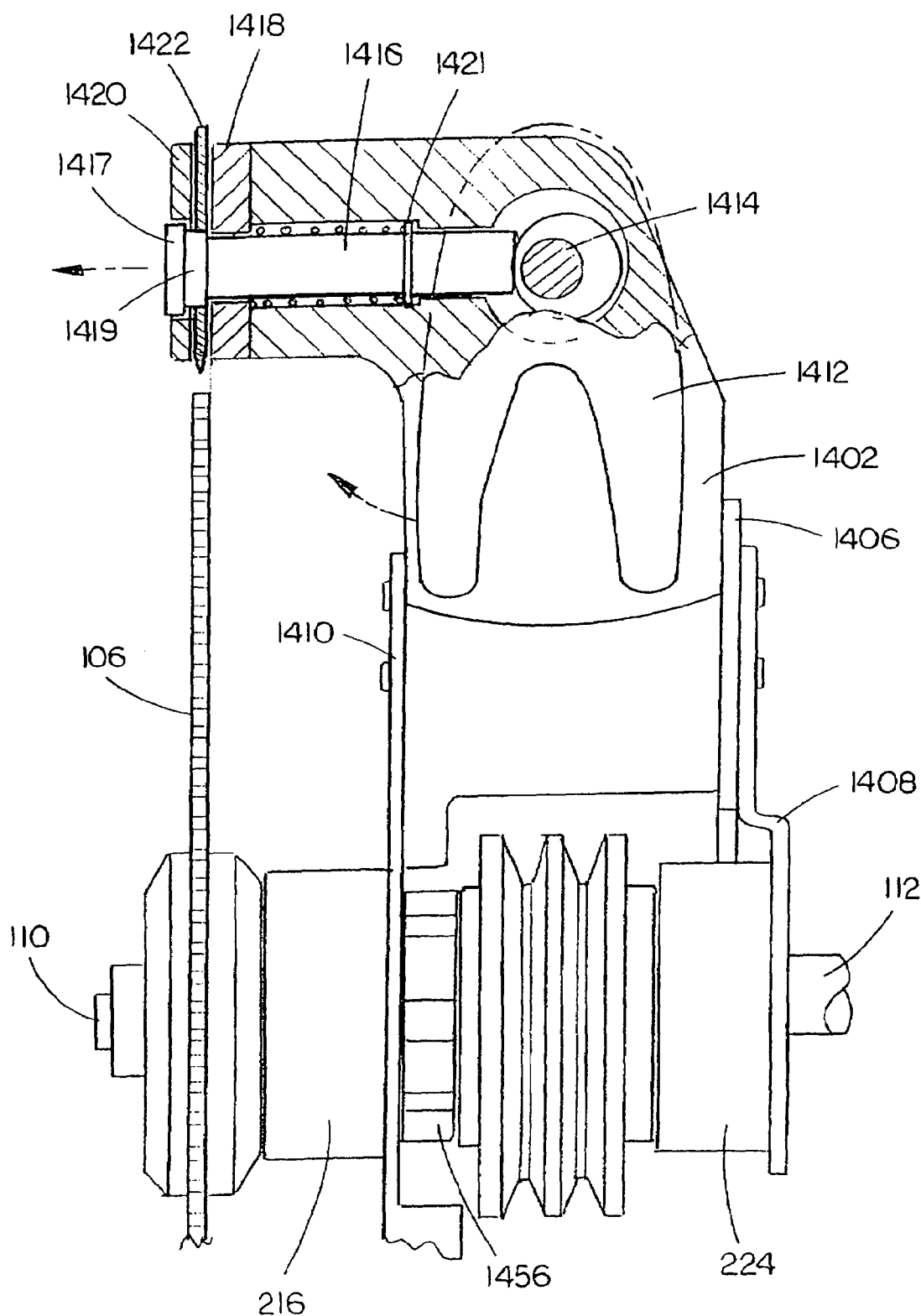
FIG. 16 is a top plan view of the riving knife assembly of FIG. 14 further illustrating a spring loaded locking pin assembly in accordance with an exemplary embodiment of the present invention.

In a further aspect of the invention, a riving knife assembly 1400 is shown in FIGS. 14 through 22. The riving knife assembly 1400 may be coupled with the dual bevel table saw shown and described above in reference to FIGS. 1 through 13. The riving knife assembly 1400 may include a first mounting member 1402 coupled with a first armature 1404 (FIG. 15) and a second armature 1406. (FIG. 15). The first armature 1404 couples with the beveling member 124 (FIG. 15) and the second armature 1406. The coupling of the first and second armature may be an adjustable coupling allowing for rotational movement between the first and second armatures. The second armature 1406 couples with the first armature 1404 and the first mounting member 1402. The first and second armature enable the riving knife assembly 1400 to adjust its vertical position in relationship with any height adjustment made to the saw blade 106.

The second armature 1406, in its coupling with the first mounting member 1402, further couples with a first riving bracket 1408. The first riving bracket 1408 further couples with the bearing retaining nut 232 (FIG. 11B) of the dual arbor assembly 102. (FIG. 11B) It is understood that the coupling of the first riving bracket 1408 with the bearing retaining nut 232 may be an adjustable coupling. A second riving bracket 1410 couples with the first mounting member 1402 and with the inside of the first bore 217 (FIG. 11B) of the first height bracket 216. (FIG. 11B) It is understood that the coupling of the second riving bracket 1410 with the first height bracket 216 may be an adjustable coupling. The first mounting member 1402, first armature 1404, second armature 1406, first riving bracket 1408, and second riving bracket 1410 are preferably coupled to enable them to remain in the horizontal plane while the raising/lowering of the saw blade 106 occurs.

The first mounting member 1402 is further disposed with a quick release assembly. The quick release assembly comprises a quick release handle 1412 coupled with an eccentric shaft 1414. (FIG. 15) The eccentric shaft 1414 operationally couples with a locking pin 1415. (FIG. 15) The locking pin 1415 comprises a locking pin body 1416 (FIG. 15) engaged with the eccentric shaft 1414, a second mounting member 1418, and a head member 1417 coupled with a sheathing member 1420. The locking pin includes a spring loaded assembly enabling the head member 1417 and a circular engagement member 1419, disposed on the locking pin body 1416 proximal to the head member 1417 of the locking pin 1415 to be set in a locked position and a release position relative to the second mounting member 1418, the sheathing member 1420, and a riving knife 1422. In the preferred embodiment, the spring loaded assembly comprises a compression spring disposed within the locking pin body 1416 and engaging on one end with a retaining member 1421 (FIG. 16) and on the other end with the head member 1417. The compression spring is biased to an original position which maintains the head member 1417 in the locked position.

Figure 17:
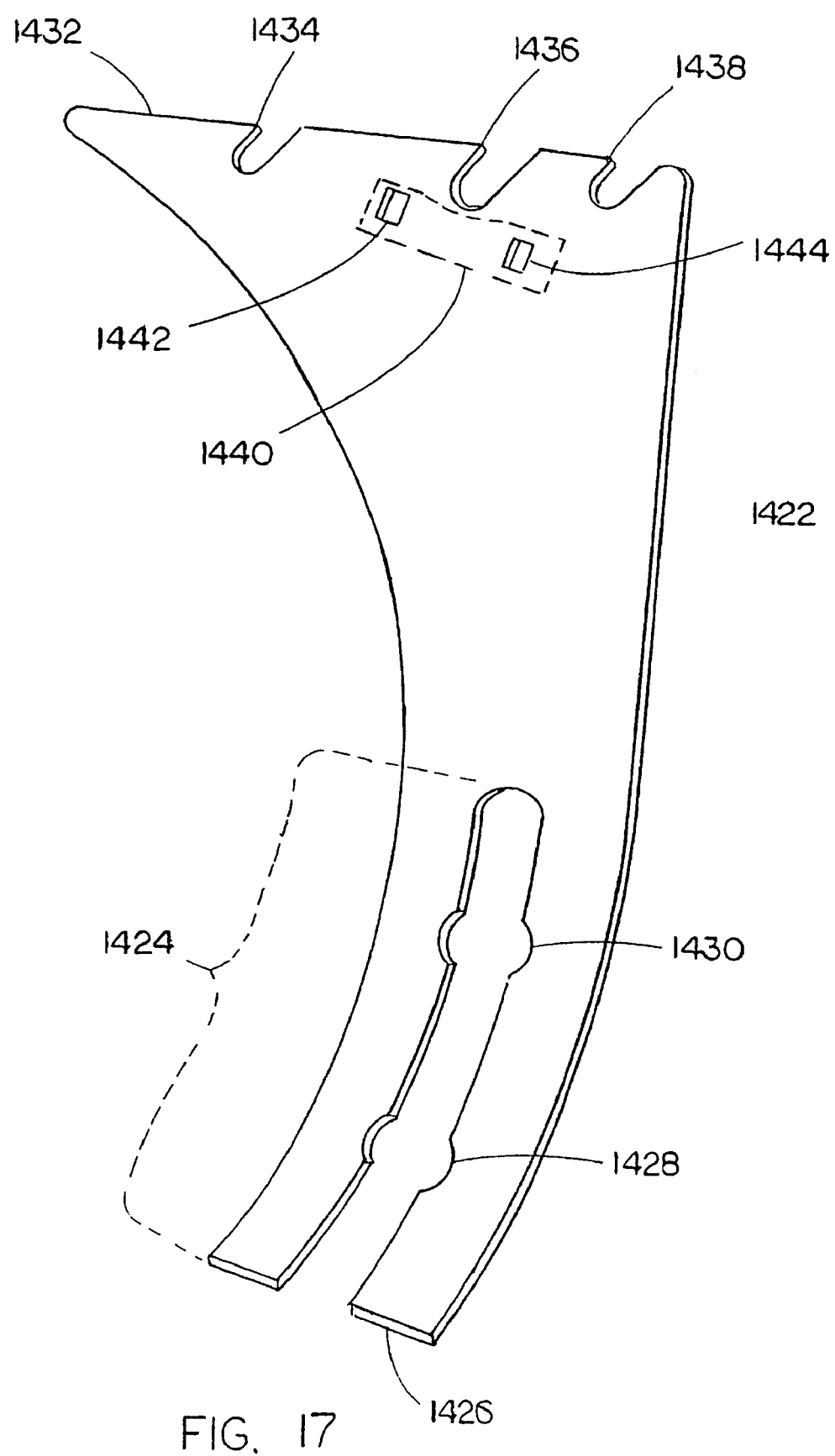
FIG. 17 is an isometric illustration of a riving knife employed with the riving knife assembly of the present invention.

The locking pin 1415, second mounting member 1418, and the sheathing member 1420, are configured to engage the riving knife 1422. The riving knife 1422 includes an engagement assembly 1424 extending at least partially along the length of the riving knife 1422. In the preferred embodiment, the engagement assembly 1424 is a slot defining a recess within the riving knife 1422, beginning at a first end 1426 (FIG. 17) of the riving knife 1422. The slot of the engagement assembly 1424 further defines a first locking assembly 1428 (FIG. 17) and a second locking assembly 1430 (FIG. 17). In the current embodiment, the first and second locking assemblies are circular apertures which allow the circular engagement member 1419 of the locking pin 1415 to engage in preset locations and securely establish the position of the riving knife 1422.

In a preferred embodiment, operation of the riving knife assembly 1400 is enabled by the removal capabilities of the throat plate assembly 103. By removing the throat plate assembly 103 (FIG. 1D) the operator may access the quick release handle 1412. The operator may establish the quick release handle 1412 in the release position by manually positioning the quick release handle 1412. The release position biases the eccentric shaft 1414 engaging it with the compression spring disposed within the locking pin body 1416. The release position of the eccentric shaft 1414 pushes against the compression spring of the locking pin body 1416 which translates this force into a pushing force against the head member 1417 and circular engagement member 1419. The pushing force of the spring forces the head member 1417, including the circular engagement member 1419, and the sheathing member 1420 away from the second mounting member 1418. It is understood that the position of the quick release handle 1412 may be affixed once the desired position has been set or the quick release handle 1412 may be spring loaded requiring a force to maintain a position, such as the release position.

In the release position the first end 1426, including the engagement assembly 1424, of the riving knife 1422 may be inserted between the second mounting member 1418 and the sheathing member 1420. The slot of the engagement assembly 1424 allows the locking pin 1415 to slidably engage within. The operator determines the desired setting of the riving knife 1422 using the first and second locking assemblies. Once the desired position is determined, the operator engages the circular engagement member 1419 within one of the cut outs of the first and second locking assemblies, by adjusting the quick release handle 1412 into the locked position. The lock position disengages the eccentric shaft 1414 from the compression spring of the locking pin 1415, thereby allowing the spring to return to its original position which forces the head member 1417, circular engagement member 1419, and the sheathing member 1420 against the riving knife 1422. The force of the compression spring translated through the head member 1417, circular engagement member 1419, and the sheathing member 1420 may securely affix the position of the riving knife 1422 relative to the saw blade 106.

It is contemplated that the engagement assembly may be configured in a variety of manners. For example, the engagement assembly may include a plurality of preset positioning members. Further, the engagement assembly may be one or more tabs disposed on the outer edges of the riving knife which are engaged within a sleeve established by the locking pin 1415, second mounting member 1418, and sheathing member 1420. It is further contemplated, that the adjustment of the riving knife 1422 may be enabled by various mechanisms, such as a worm drive assembly, ratchet assembly, and the like.

It is understood that the position of the riving knife assembly may be enabled to accommodate a switch in the position of the saw blade 106 as necessitated by the desired tilt operation to be performed. Thus, it is contemplated that the first mounting member 1402 may be adjustably coupled with the second armature 1406, the first riving bracket 1408, and the second riving bracket 1410. This adjustable coupling enables the first mounting member 1402 to re-position the locking pin 1415, the second mounting member 1418, and the sheathing member 1420. The re-positioning of these components thereby enabling the riving knife 1422 to be positioned behind the saw blade 106 whether configured for left tilt or right tilt operation.

In an alternative embodiment, it is contemplated that the first mounting member 1402 may be removed from engagement with the second armature 1406, the bearing retaining nut 232 and the inside of the first bore 217. The first mounting member 1402 may then be rotated one hundred eighty degrees and reconnected with the second armature 1406, the bearing retaining nut 232, and the inside of the first bore 217. It is further understood that the quick release handle 1412 may be removed from engagement with a first end of the eccentric shaft 1414 and, after rotation of the first mounting member 1402, reconnected with a second end of the eccentric shaft. The quick release handle 1412 and the eccentric shaft 1414 maintain their operational capabilities, respectively, regardless of the rotational position of the first mounting member 1402.

It is further contemplated that the first mounting member 1402 may be comprised of a first section 1403 and a second section 1405. (FIG. 15) The first section 1403 may be coupled with the first and second riving brackets and the second armature 1406. The second section 1405 may be removed from the first section 1403 rotated one hundred eighty degrees and then re-connected with the first section 1403. Thus, the quick release handle 1412, the eccentric shaft 1414, the locking pin 1415, the second mounting member 1418, and the sheathing member 1420, are repositioned one hundred eighty degrees from an original position. Such a rotational and connective enablement allows the riving knife 1422 to be positioned behind the saw blade 106 whether it is being tilted to the left or to the right. Various other mechanisms for enabling the riving knife 1422 in such a manner as that described above may be employed without departing from the scope and spirit of the present invention.

It is understood that the quick release handle 1412 may be engaged through various mechanisms. For example, a hexhead wrench may engage with the quick release handle 1412 allowing an operator to establish the quick release handle 1412 in the release or lock position. A hex-head wrench enabled quick release handle 1412 may allow the wrench to be inserted through a connector in the table 108 of the dual bevel table saw assembly 100. This may enable the quick release handle 1412 to be used without removing the throat plate assembly 103. This may be advantageous for the operator of the dual bevel table saw assembly 100 who wishes to quickly remove the riving knife 1422 without having to undue the throat plate assembly 103.

The riving knife 1422 may further include a plurality of slots disposed along a second end 1432. (FIG. 17) In the preferred embodiment, the second end 1432 is disposed with a first slot 1434, a second slot 1436, and a third slot 1438. In addition, the riving knife 1422 may include a connection assembly 1440 having a first connector 1442 and a second connector 1444 disposed through the riving knife 1422 proximal to the second end 1432. The plurality of slots 1434 through 1438 and the connection assembly 1440 may be employed for the attachment of various other components for use with the dual bevel table saw 100.

Figure 18:
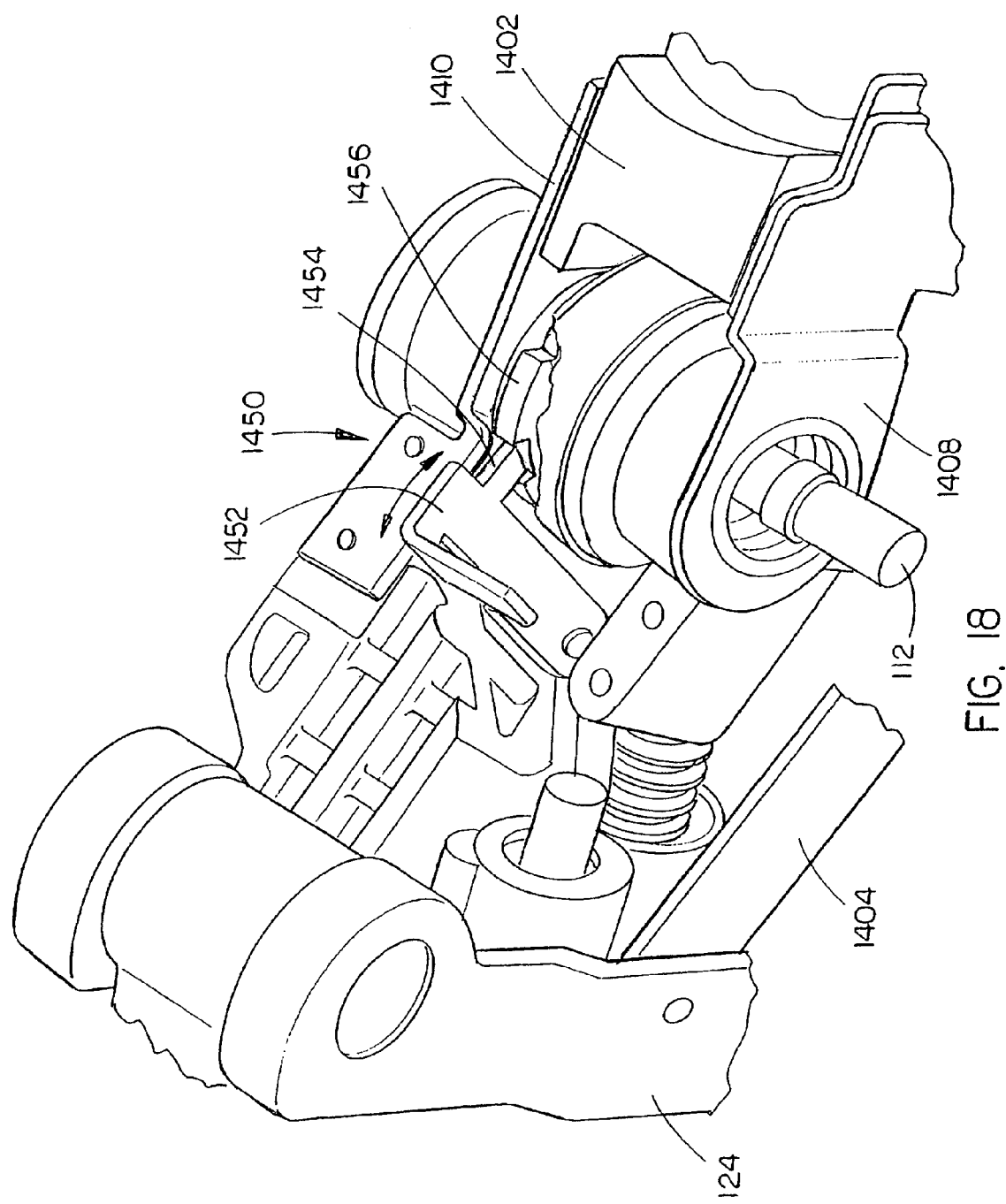
FIG. 18 is an isometric view of an arbor lock assembly employed with the riving knife assembly, engaged with the table saw assembly including the beveling assembly, in accordance with the present invention.
Figure 19:
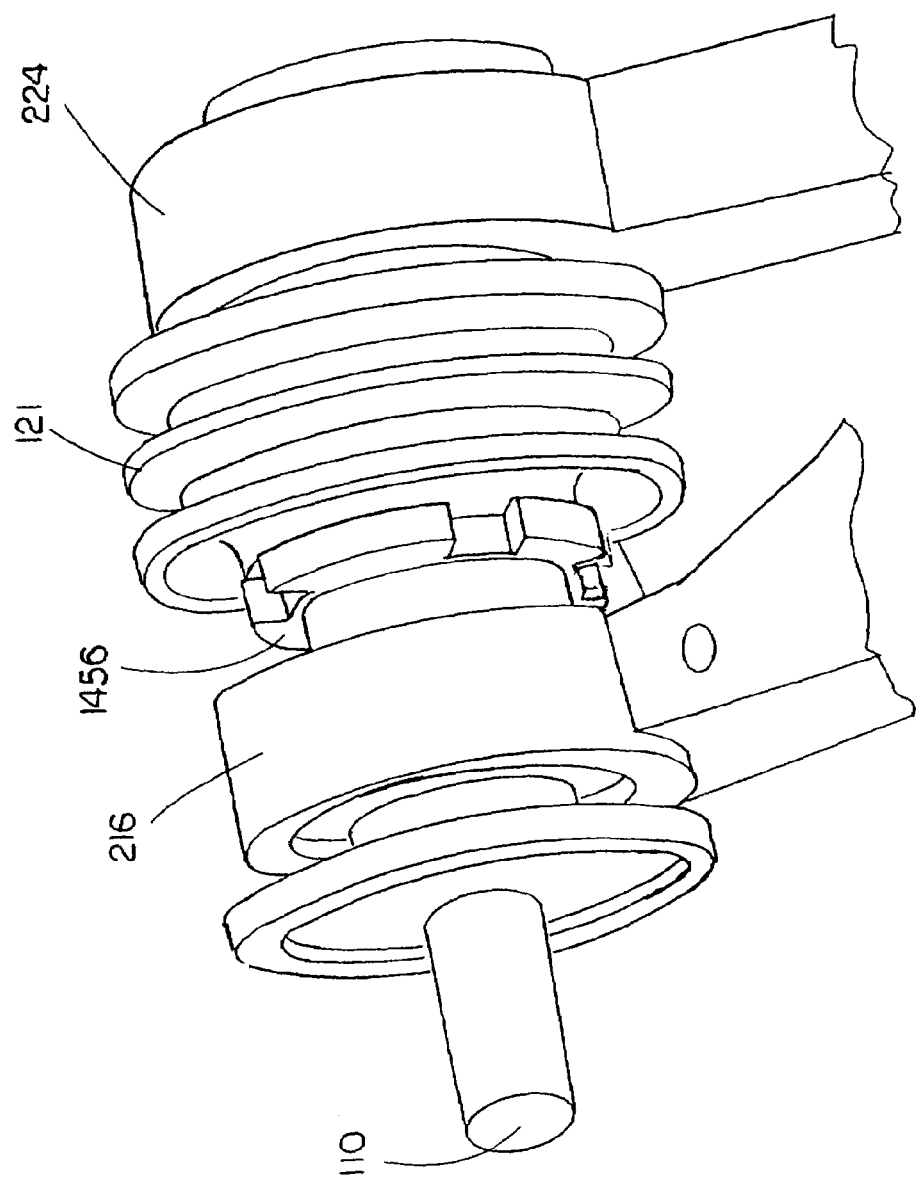
FIG. 19 is a perspective view of an arbor lock spacer of the arbor lock assembly operationally engaged with the dual sided arbor assembly of the present invention.

An arbor lock assembly 1450, shown in FIGS. 18 and 19, may be further included with a dual bevel table saw which may or may not include the riving knife assembly 1400. The arbor lock assembly includes an arbor lock member 1452 including a finger 1454 which engages with an arbor lock spacer 1456, which is configured to provide similar functionality as the first spacer 220 of the dual arbor assembly 102. The arbor lock spacer 1456 provides a plurality of slots within which the finger 1454 of the arbor lock member 1452 may engage. It is contemplated that the spacer 1456 may include a key assembly for affixing its position to the arbor shaft 200. The arbor lock assembly 1450 provides a mechanism whereby the position of the arbor shaft 200 may be fixed. This may be advantageous when changing the position of the saw blade or accessing the dual bevel table saw assembly for other reasons.

Figure 20:
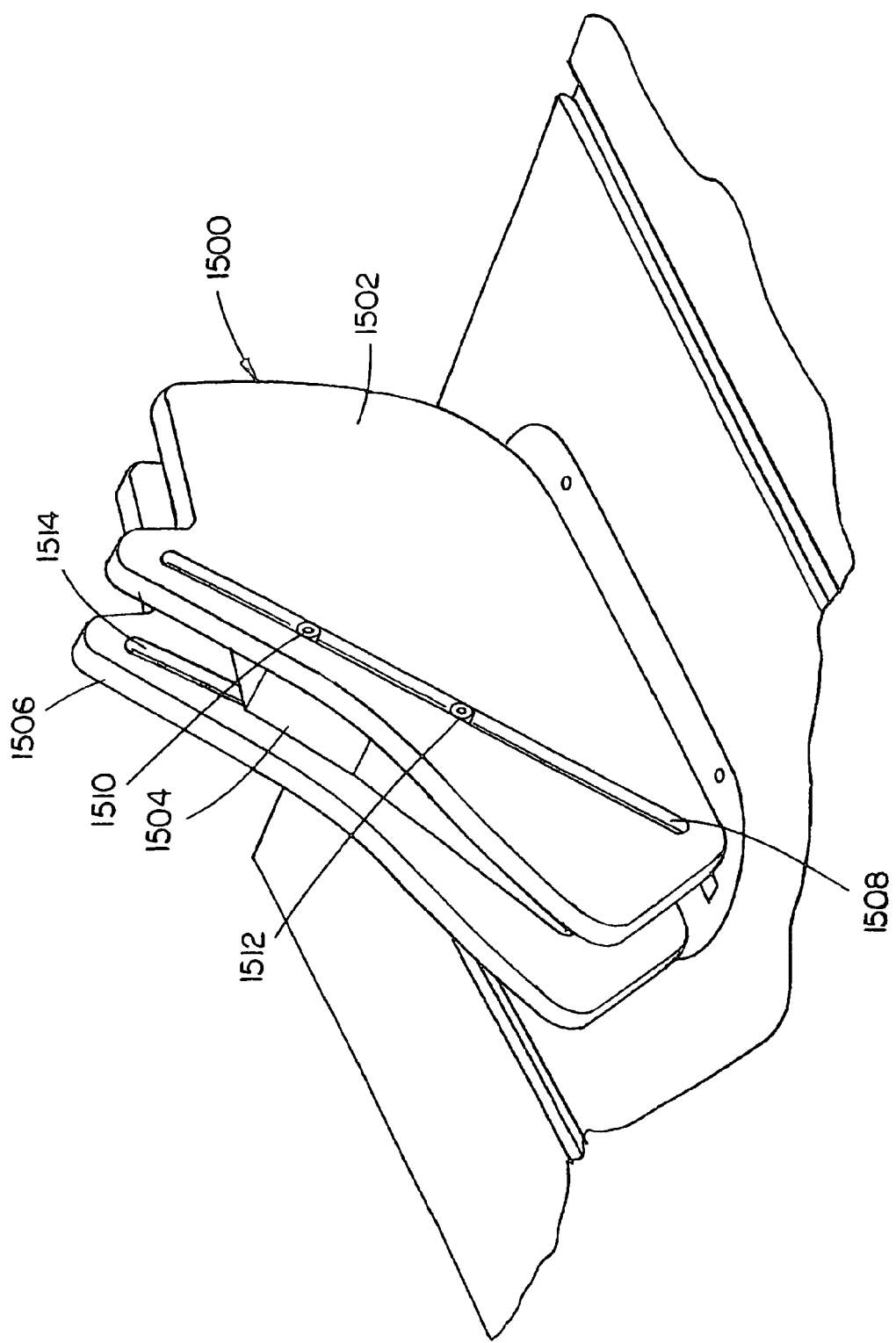
FIG. 20 is an isometric illustration of a guard assembly coupled with the riving knife assembly of FIG. 14.

The riving knife assembly 1400 may further include a guard assembly which may be removably coupled with the riving knife assembly. Such a riving knife guard assembly 1500 is shown in FIG. 20. In the preferred embodiment, the guard assembly comprises a first guard 1502 coupled with a center member 1504 which is further coupled with a second guard 1506. The center member 1504 may be securely affixed to the second end of the riving knife 1422. It is contemplated that the center member 1504 may couple with at least one of the plurality of slots 1434 through 1438 disposed on the second end 1432 of the riving knife 1422 and/or at least one of the connectors 1442 or 1444 disposed proximally to the second end 1432. The center member 1504 may be rigidly affixed in position, relative to the riving knife 1422, or the center member 1504 may be adjustably coupled with the second end 1432 of the riving knife 1422. The center member 1504 may be configured to substantially encompass the saw blade. Alternatively, the center member 1504 may be configured to encompass various sections of the saw blade.

In the preferred embodiment, the first guard and second guard 1502 and 1506 are adjustably coupled with the center member 1504. The first guard 1502 includes a first engagement assembly 1508. The first engagement assembly is a slot through the first guard 1502. The slot engages with a first bushing 1510 and a second bushing 1512 both of which are disposed upon a first side 1505 (not shown) of the center member 1504. The first and second bushings provide a bearing surface for the first guard 1502 to slide up and down upon. The second guard 1506 includes a second engagement assembly 1514 comprising a second slot through the second side 1506. The second slot engages with a third bushing 1516 and a fourth bushing 1518 (not shown) both of which are disposed upon a second side 1507 (not shown) of the center member 1504 and provide a bearing surface for the second guard 1506 to slide up and down on. The engagement of the bushings within the slots of the first and second guards enables the first and second guards to move independently of one another. In operation, as the blade is raised or lowered, or a workpiece is fed through the saw blade, the first and second guards will move up and down relative to the center member 1504. It is understood that the configuration and coupling of the components of the riving knife guard assembly 1500, as described above, may vary without departing from the spirit and scope of the present invention.

It is further contemplated that an over arm guard assembly may be coupled with dual bevel table saw assemblies of the present invention. The over arm guard assembly may comprise a guard bracket which substantially extends over and at least partially encompasses the saw blade. The over arm guard assembly is configured to assist in protecting against unwanted contact between the operator and the saw blade. The guard bracket may be coupled with the table 108 in a position proximal to the saw blade in order to enable the functionality of the guard bracket. It is understood that the guard bracket may be variously configured as contemplated by those of ordinary skill in the art.

Figure 21:
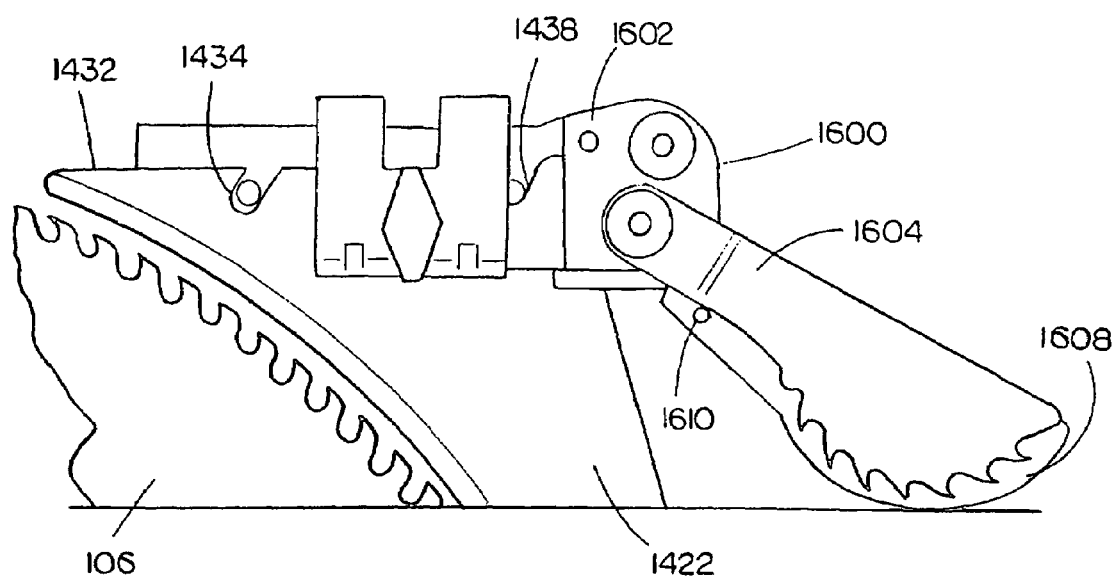
FIG. 21 is a side elevation view illustrating a kickback finger system coupled with the riving knife of the riving knife assembly of FIG. 14 wherein the saw blade of the dual bevel table saw assembly is in a first lowered position.
Figure 22:
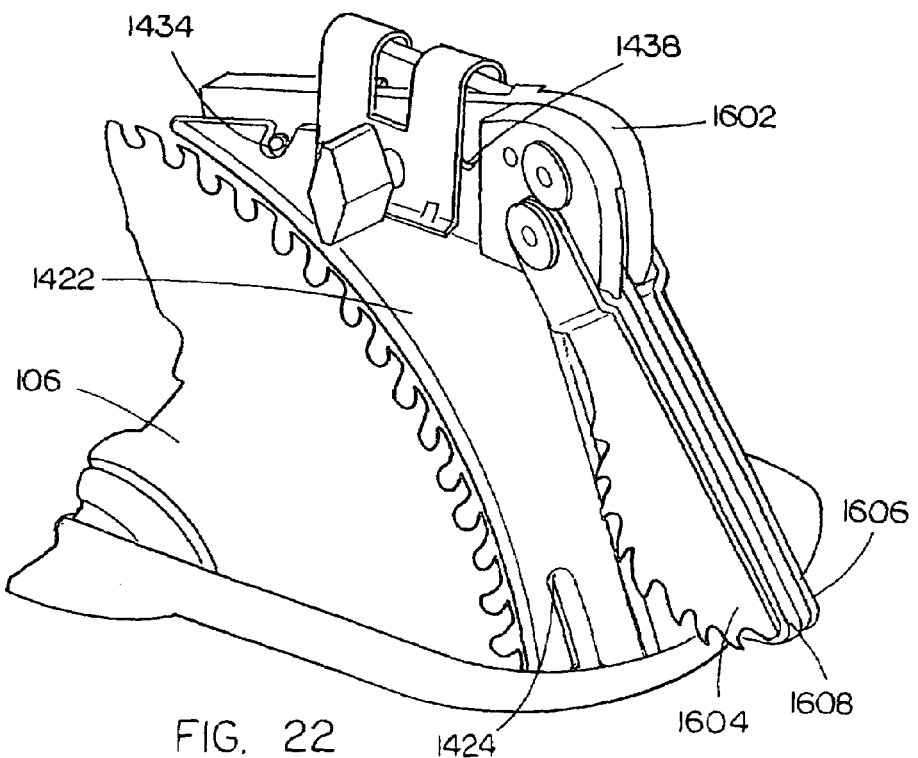
FIG. 22 is a perspective view of the kickback finger system of FIG. 21 wherein the saw blade of the dual bevel table saw assembly is in a second raised position.

The riving knife assembly 1400 may be further coupled with a kickback finger system 1600 as shown in FIGS. 21 and 22. The kickback finger system 1600 may be coupled with the second end 1432 of the riving knife 1422 and be removable from the second end 1432. The kickback finger system 1600 may couple with at least one of the plurality of slots disposed on the second end 1432 and/or at least one of the connectors 1442/1444 disposed proximally to the second end 1432. A mounting member 1602 is coupled with the second end 1432 of the riving knife 1422. The mounting member is adjustably coupled with a first kickback finger assembly 1604, a second kickback finger assembly 1606 and a follower 1608. The follower 1608 is further disposed with a kickback stop pin 1610. In the preferred embodiment, the follower 1608 slides on the table surface of the dual bevel table assembly, and may establish the height of the kickback fingers. As the blade is raised and lowered, the follower raises and lowers the first and second kickback finger assemblies. This may assist in avoiding the kickback fingers digging into the table during operation. For example, as the wood is pushed through the saw, causing the follower 1608 to raise up, the first and second kickback finger assemblies raise up to accommodate the thickness of the wood, but the first and second kickback finger assemblies may be unable to drop below the kickback stop pin 1610.

It is understood that the dual bevel table saw assembly 100, 1200, and 1300, may be enabled with the riving knife assembly 1400, and the riving knife guard assembly 1500 and/or the kickback finger system 1600. It is further understood that the riving knife assembly 1400 may include the arbor lock assembly 1450 or may be configured without the arbor lock assembly 1450.

In still further alternative embodiments, the dual bevel table saw assemblies may include an emergency stop control assembly. The emergency stop control assembly may be disposed upon the table saw assembly, for instance, upon the housing of the table saw assembly. Alternatively, the stop control assembly may be located in various positions between a power transfer device, such as a power cord, from the table saw and the power outlet, such as a wall plug, located remotely from the table saw assembly. In such an exemplary set up, the stop control assembly may be enabled to control a plurality of tools which are receiving power from the power outlet. The emergency stop control assembly may be configured for manual control by the operator, such as through manual engagement with a selector assembly which directs the operation of the emergency stop control assembly. Alternatively, the emergency stop control assembly may be configured for remote control by the operator. In such an embodiment, the emergency stop control assembly may include one or more wireless remote control devices engaged by the operator and one or more wireless stop control devices operationally engaged with the table saw assembly. The one or more wireless remote control devices may transmit the commands of the operator to the one or more wireless stop control devices which may control the operation of the table saw assembly.

The dual bevel table saw assembly 100, 1200, and 1300 may be enabled with a non contact power tool control assembly as described in U.S. patent application Ser. No. 10/445,290, filed on May 21, 2003, U.S. patent application Ser. No. 10/463,206, filed on Jun. 16, 2003, U.S. patent application Ser. No. 10/632,559, filed on Jul. 31, 2003, and U.S. patent application Ser. No. 10/632,560, filed on Jul. 31, 2003. The U.S. patent application Ser. Nos. 10/445,290, 10/463,206, 10/632,559, and 10/632,560 are herein incorporated by reference in their entireties. The non contact power tool control assembly may include a housing, disposed with a computing assembly coupled with a laser source, coupled to the topside of the fence. The laser source emits a beam of light toward the saw blade to determine the saw blade's height and distance from the fence. These measurements are then displayed to the user on a display screen coupled with the computing assembly. In an alternative embodiment, the non contact power tool control assembly may also be equipped to measure the angle of the saw blade. It is also contemplated that the laser source may emit a plurality of beams to increase the accuracy of the measurements. It is still further contemplated that the non contact power tool control assembly may only indicate to the user one of the three measurements discussed in the previous embodiment. For instance, the display screen coupled with the computing system may only display a height measurement or a distance measurement.

It is contemplated that a non contact power tool control assembly may be powered by a battery pack. However, it is further contemplated that the non contact power tool control assembly may be supplied with AC or DC electric power from a remote power source such as a residential power outlet or from the table saw's electrical system. The non contact power tool control assembly provides an accurate measurement to the user so that the dual bevel table saw assembly 100, 1200, and 1300 may make repeatable cuts more efficiently.

Figure 23:
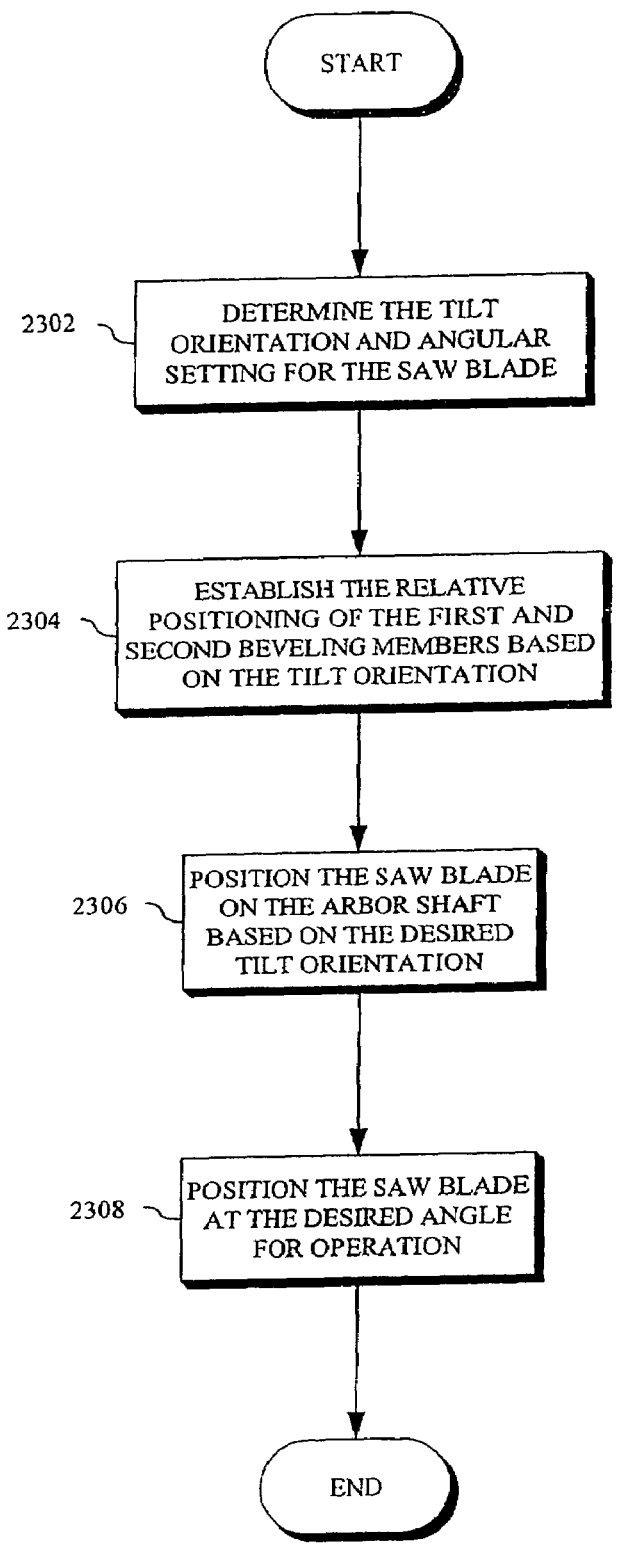
FIG. 23 is an exemplary method of establishing an angular setting for a saw blade using the dual bevel table saw assembly of the present invention.
Figure 24:
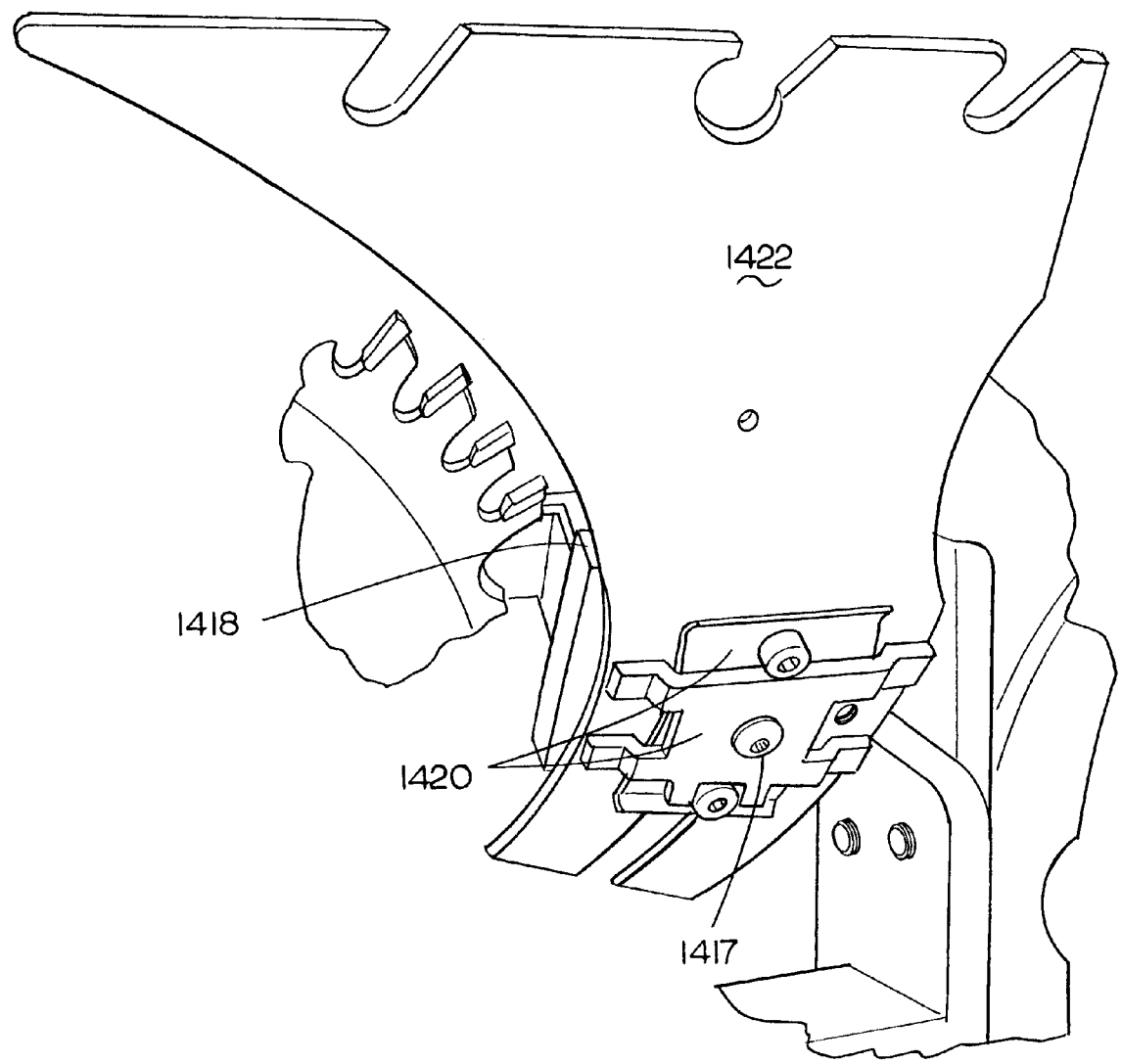
FIG. 24 illustrates engagement of an engagement assembly of a riving knife within a sleeve in accordance with an exemplary embodiment of the present invention.

A method of establishing an angular setting in a left tilt orientation or a right tilt orientation for a saw blade, is shown in FIG. 23. In a preferred embodiment, the saw blade is operationally coupled with a motor and operationally engaged with a table of a dual bevel table saw assembly. In the first step 2302 the operator determines whether the saw blade is to be established in a right tilt orientation or a left tilt orientation. This is based on the desired cut to be performed upon a work piece by the saw blade. Once the tilt orientation is determined then the operator determines the angular setting for the saw blade in the right or left tilt orientation. In step 2304 the first trunnion is positioned relative to the second beveling member based on the desired tilt orientation to be established for the saw blade. Using the angular adjustment assembly and the selective engagement assembly the position of the first trunnion and the second beveling member may be established. The relative positioning of the first and second beveling members allows the operator to couple the saw blade with the proper end of the arbor shaft and establish an initial position of the two beveling members which enables the full beveling functionality of the bevel assembly. After the operator has completed this step, the operator positions the saw blade on the arbor shaft in step 2306. As described in detail above in FIGS. 1 through 11, the saw blade may be coupled with the first or second end of the arbor shaft based on the tilt orientation to be established for the cut to be performed. Once the relative positions of the first and second beveling members are established and the saw blade is coupled with the arbor shaft, the operator may then engage the angular adjustment assembly and the saw blade height adjustment assembly, in step 2308, to position the saw blade in the desired angular setting. This final step affixes the position of the saw blade at the desired angle, allowing a cut to be performed upon the work piece by the saw blade.

It is understood that the specific order or hierarchy of steps in the method disclosed is an example of exemplary approaches. Based upon design preferences, it is understood that the specific order or hierarchy of steps in the method may be rearranged while remaining within the scope and spirit of the present invention.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A riving knife assembly for a dual bevel table saw, comprising:
    a first armature configured for coupling with a beveling member;
    a second armature adjustably and rotatably coupled with the first armature;
    a first mounting member coupled with the second armature;
    a first riving bracket coupled with the second armature and configured for adjustably coupling with a bearing retaining nut of a dual arbor assembly;
    a second riving bracket coupled with the first mounting member and configured for adjustably coupling with the inside of a first bore of a first height bracket;
    a quick release handle disposed upon the first mounting member;
    an eccentric shaft coupled with the quick release handle;
    a locking pin having a locking pin body, a second mounting member, a head member coupled with a sheathing member, and a spring loaded assembly, the locking pin operationally coupled with the eccentric shaft; and,
    a riving knife configured with an engagement assembly for engaging with the locking pin;
    wherein the spring loaded assembly enables the head member and a circular engagement member disposed on the locking pin body proximal to the head member of the locking pin to be set in a locked position and a release position relative to the second mounting member, the sheathing member and the riving knife;
    wherein the locked and release positions are established by manipulation of the quick release handle.

2. A riving knife assembly as claimed in claim 1, wherein the first mounting member, the first armature, the second armature, the first riving bracket, and the second riving bracket are coupled in a manner which allows them to remain in the horizontal plane while raising/lowering of a saw blade occurs.

3. A riving knife assembly as claimed in claim 1, wherein the spring loaded assembly comprises a compression spring disposed within the locking pin body, the compression spring engaging on one end with a retaining member and on its opposite end with the head member, the compression spring biased to an original position which maintains the head member in the locked position.

4. A riving knife assembly as claimed in claim 1, wherein the engagement assembly is a slot defining a recess within the riving knife beginning at a first end of the riving knife, the slot further defining first and second locking assemblies, the first and second locking assemblies being circular apertures which allow the circular engagement member of the locking pin to slidably engage within preset locations and secure the position of the riving knife.

5. A riving knife assembly as claimed in claim 1, wherein the first mounting member is adjustably coupled with the second armature, the first riving bracket and the second riving bracket to allow for re-positioning of the locking pin for either right or left tilt operation of a dual bevel table saw assembly.

6. A riving knife assembly as claimed in claim 1, wherein either of two opposing sides of the first mounting member are configured for being removably coupled with the second armature, the bearing retaining nut and the inside of the first bore.

7. A riving knife assembly as claimed in claim 1, wherein the quick release handle is configured for being removably coupled from either of two opposing ends of the eccentric shaft.

8. A riving knife assembly for a dual bevel table saw, comprising:
    a first armature configured for coupling with a beveling member;
    a second armature adjustably and rotatably coupled with the first armature;
    a first mounting member coupled with the second armature;
    a first riving bracket coupled with the second armature and configured for adjustably coupling with a bearing retaining nut of a dual arbor assembly;
    a second riving bracket coupled with the first mounting member and configured for adjustably coupling with the inside of a first bore of a first height bracket;
    a quick release handle disposed upon the first mounting member;
    an eccentric shaft coupled with the quick release handle;
    a locking pin having a locking pin body, a second mounting member, a head member coupled with a sheathing member, and a spring loaded assembly, the locking pin operationally coupled with the eccentric shaft; and,
    a riving knife configured with an engagement assembly for engaging with the locking pin and further configured with a plurality of slots for engaging with a guard assembly;
    wherein the spring loaded assembly enables the head member and a circular engagement member disposed on the locking pin body proximal to the head member of the locking pin to be set in a locked position and a release position relative to the second mounting member, the sheathing member and the riving knife;
    wherein the locked and release positions are established by manipulation of the quick release handle.

9. A riving knife assembly as claimed in claim 8, wherein the first mounting member, the first armature, the second armature, the first riving bracket, and the second riving bracket are coupled in a manner which allows them to remain in the horizontal plane while raising/lowering of a saw blade occurs.

10. A riving knife assembly as claimed in claim 8, wherein the spring loaded assembly comprises a compression spring disposed within the locking pin body, the compression spring engaging on one end with a retaining member and on its opposite end with the head member, the compression spring biased to an original position which maintains the head member in the locked position.

11. A riving knife assembly as claimed in claim 8, wherein the engagement assembly is a slot defining a recess within the riving knife beginning at a first end of the riving knife, the slot further defining first and second locking assemblies, the first and second locking assemblies being circular apertures which allow the circular engagement member of the locking pin to slidably engage within preset locations and secure the position of the riving knife.

12. A riving knife assembly as claimed in claim 8, wherein the first mounting member is adjustably coupled with the second armature, the first riving bracket and the second riving bracket to allow for re-positioning of the locking pin for either right or left tilt operation of a dual bevel table saw assembly.

13. A riving knife assembly as claimed in claim 8, wherein either of two opposing sides of the first mounting member are configured for being removably coupled with the second armature, the bearing retaining nut and the inside of the first bore.

14. A riving knife assembly as claimed in claim 8, wherein the quick release handle is configured for being removably coupled from either of two opposing ends of the eccentric shaft.

15. A riving knife assembly as claimed in claim 8, wherein a guard assembly is coupled with the riving knife via the slots, the guard assembly including first and second guards slidably coupled with opposing sides of a center member, the center member adjustably coupled with the riving knife via the slots, the center member configured to substantially encompass a saw blade.

16. A riving knife assembly as claimed in claim 15, wherein the first and second guards are configured to move independently of each other and in a vertical position relative to the center member.

17. A riving knife assembly for a dual bevel table saw, comprising:
   a first armature configured for coupling with a beveling member;
   a second armature adjustably and rotatably coupled with the first armature;
   a first mounting member coupled with the second armature;
   a first riving bracket coupled with the second armature and configured for adjustably coupling with a bearing retaining nut of a dual arbor assembly;
   a second riving bracket coupled with the first mounting member and configured for adjustably coupling with the inside of a first bore of a first height bracket;
   a quick release handle disposed upon the first mounting member;
   an eccentric shaft coupled with the quick release handle;
   a locking pin having a locking pin body, a second mounting member, a head member coupled with a sheathing member, and a spring loaded assembly, the locking pin operationally coupled with the eccentric shaft; and,
   a riving knife configured with an engagement assembly for engaging with the locking pin, further configured with a plurality of slots and one or more connectors for coupling with a kickback finger system;
   wherein the spring loaded assembly enables the head member and a circular engagement member disposed on the locking pin body proximal to the head member of the locking pin to be set in a locked position and a release position relative to the second mounting member, the sheathing member and the riving knife;
   wherein the locked and release positions are established by manipulation of the quick release handle.

18. A riving knife assembly as claimed in claim 17, wherein the first mounting member, the first armature, the second armature, the first riving bracket, and the second riving bracket are coupled in a manner which allows them to remain in the horizontal plane while raising/lowering of a saw blade occurs.

19. A riving knife assembly as claimed in claim 17, wherein the spring loaded assembly comprises a compression spring disposed within the locking pin body, the compression spring engaging on one end with a retaining member and on its opposite end with the head member, the compression spring biased to an original position which maintains the head member in the locked position.

20. A riving knife assembly as claimed in claim 17, wherein the engagement assembly is a slot defining a recess within the riving knife beginning at a first end of the riving knife, the slot further defining first and second locking assemblies, the first and second locking assemblies being circular apertures which allow the circular engagement member of the locking pin to slidably engage within preset locations and secure the position of the riving knife.

21. A riving knife assembly as claimed in claim 17, wherein the first mounting member is adjustably coupled with the second armature, the first riving bracket and the second riving bracket to allow for re-positioning of the locking pin for either right or left tilt operation of a dual bevel table saw assembly.

22. A riving knife assembly as claimed in claim 17, wherein either of two opposing sides of the first mounting member are configured for being removably coupled with the second armature, the bearing retaining nut and the inside of the first bore.

23. A riving knife assembly as claimed in claim 17, wherein the quick release handle is configured for being removably coupled from either of two opposing ends of the eccentric shaft.

24. A riving knife assembly as claimed in claim 17, wherein a kickback finger system is coupled with the riving knife via the slots and connectors, the kickback finger system including a mounting member, a first kickback finger assembly, a second kickback finger assembly and a follower, the follower being disposed with a kickback stop pin.

25. A riving knife assembly as claimed in claim 24, wherein the mounting member is removably coupled with the riving knife and adjustably coupled with the first kickback finger assembly, the second kickback finger assembly and the follower, the follower adjusting its vertical position to correspond with the vertical position of a saw blade, thereby establishing the vertical position of the kickback finger assemblies and not allowing the kickback finger assemblies to drop below the kickback stop pin.

\* \* \* \* \*